United States Patent Office 3,083,118
Patented Mar. 26, 1963

3,083,118
METHOD OF DEPOSITING A POLYMER OF OLEFINICALLY UNSATURATED MONOMER WITHIN A POLYMERIC MATERIAL AND THE RESULTING PRODUCT
Douglas J. Bridgeford, Chicago, Ill., assignor to Tee-Pak, Inc., a corporation of Illinois
No Drawing. Filed Mar. 4, 1958, Ser. No. 718,995
98 Claims. (Cl. 117—47)

This invention relates to a novel process for the formation and deposition of polymers within and/or upon other polymeric materials having ion exchange capacity, and to the composite polymeric products produced by said process.

ADVANTAGES OF THIS INVENTION

Efforts have been made in the past to effect changes in the physical and chemical characteristics of polymeric films, fibers, filaments and other articles by in situ formation and deposition of polymers both on the surface and within the interior regions of such articles. Success has not been great, due at least in part to an inability to control satisfactorily the nature and extent of the polymer deposition on or in the article being treated.

Now, by use of the method of the present invention, it is possible for the first time to restrict the deposition of a polymer substantially to a desired portion of the interior and/or surface of a polymeric film, individual fiber or filament, or article of any shape or form, so long as the material being treated possesses ion exchange capacity.

The method of this invention also makes it possible in appropriate cases to achieve substantially uniform distribution of deposited polymer throughout the region in which deposition is produced.

Use of the present invention gives rise to substantially less waste of monomer by polymerization of monomer in the reaction solvent or phase exterior of the host material than is the case with deposition methods of the prior art.

SUMMARY OF THE INVENTION

The method of this invention includes a step in which controlled placement of part or all of a polymerization catalyst system in a predetermined or preselected region within and/or upon the material to be treated is effected primarily if not solely through ion exchange bonding, and other steps in which the material is impregnated with an olefinic monomer and any remaining components of the catalyst system to bring about formation and deposition of a polymer of the monomer throughout the predetermined region in which the catalyst is present.

To achieve the controlled placement just mentioned, an ionic material adapted to provide at least a part of a polymerization catalyst is chemically fixed in a host polymeric starting material, by ion exchange with ion exchange groups located in a preselected region of the starting material, to form a salt compound. The salt compound thus formed is treated in any order, with the olefinically unsaturated monomer to be polymerized and with anything additional required to render said chemically fixed material catalytically active. As a result, the guest monomer is polymerized and deposited only in the preselected region of the host material.

STARTING MATERIALS WITH WHICH METHOD OF INVENTION MAY BE USED

The present method is applicable to the treatment of any polymeric materials, whether natural or synthetic, which possess a naturally occurring ion exchange capacity. The process is likewise applicable to the treatment of polymeric materials which have been modified by the artificial introduction of ion exchange capacity into the material or onto the surface thereof by chemical reactions which are well known in the art. Alternatively, chemical substances capable of binding ions may be impregnated into the polymeric materials to be treated, or introduced into the raw materials from which the articles to be treated are formed.

Reactions by which ion exchange capacity may be artificially introduced include, for example: oxidation, sulfonation, amination, esterification, etherification, and a number of like processes well known in the art.

The polymeric starting material to be treated should possess at least gelatinous solidity. Thus, these polymeric starting materials may be solid (such as dry cotton fiber); they may be a gel (such as gelatin); or they may include both a solid and a gel phase (such as viscose rayon fiber).

CHANGES IN CHARACTERISTICS OF MATERIALS TREATED WITH THIS METHOD

Depending upon the type of starting material, the monomer used for polymerization, the temperature and time period for the process, the polymerization catalyst used, and other things, the polymer-modified materials resulting from use of the method of this invention display many chemical and physical characteristics which are different from those of the corresponding untreated materials.

In many cases, the treated material displays markedly reduced solubility in its ordinary solvents, increased rot resistance, increased acid resistance and a reduced rate of moisture regain. In contrast to the last mentioned result, it is interesting to note that deposition of certain polymers produces an opposite result, making the treated material more hydrophilic instead of more hydrophobic.

Under some conditions, the method of this invention makes the treated material flame retardant. Variations in the hand and extensibility of sheets or fabrics formed of fibers treated by the method of this invention may also be observed.

When wood fibers, for example, are treated by the method of this invention, they may become thermally moldable. Such fibers may, if desired, be ground or otherwise reduced in particle size to produce a molding powder.

If the material treated by the method of this invention is wood pulp of certain types, the resulting polymer-modified material will be suitable for use as improved reinforcing agents in plastics, tile, nonwoven textiles, wall boards, specialty papers, etc.

The slower moisture regain of many types of materials treated by this method makes them less sensitive to transient changes in relative humidity than are the corresponding unmodified materials.

In many cases the increased resistance of materials treated in accordance with this invention to flame, acid attack, and microbiological attack or rot will suggest other applications in batts, insulation, shock absorbers, etc.

CATALYST PLACEMENT IN "DEPOSITION REGION" THROUGH ION EXCHANGE BONDING

In the method of this invention, the polymeric material which is to be treated is contacted with a catalyst, or part of a catalyst system, for effecting polymerization of the monomer or monomers to be deposited within the material, which catalyst or part of a system is also capable of forming a salt compound through ion exchange with chemical groups of the material to be treated.

The ion exchange involved may be either cationic exchange with the hydrogen or cation associated with chemical groups of the material being treated, or anionic exchange with anions of chemical groups of the material used. In some cases, both cationic and anionic exchange may be present at the same time.

The ion exchange step is carried out with the catalyst concentration, pH, and other reaction conditions such as to produce ion exchange between the catalyst and the polymeric starting material. As a result, the catalyst is held by ion exchange bonding with chemical groups of the starting material within a region in the interior and/or upon the exterior of the material that may be called a "deposition region." In other words, a salt compound which is the chemical reaction product of the host polymeric starting material and the ion constituting a part of the polymerization catalyst system is formed throughout that region.

The term "deposition region" is used to describe the region in which the polymerization catalyst is chemically bonded in the manner just described to the material being treated, because in the remaining steps of the method of this invention a polymer is formed and deposited in the same region. In this specification and claims, the material being treated by the method of the invention is sometimes referred to as the "polymeric starting material," "polymeric host material," "host polymer," or similar terms, while the polymer which is added to the starting material is sometimes referred to as the "guest polymer."

The conditions of pH, cation or anion source concentration, and the like, at which ion exchange will proceed between ion exchange groups in the polymeric starting material and ions in the polymerization catalyst vary greatly with the particular starting or host material and the particular ion source employed. The general conditions for producing ion exchange are well known in the art; the particular conditions required for particular reagents can be developed from available knowledge by any persons skilled in the art. Among other sources, one determining the necessary conditions for ion exchange in a particular situation may consult the principles set forth at page 25 of Ion Exchange Resins, Kunin and Meyers, Wiley, New York, 1951.

DETERMINATION OF BOUNDARIES OF DEPOSITION REGION

The "deposition region" in a given polymeric starting material may be, for example, the entire interior of the individual articles—such as individual fibers, films, filaments, sheets, webs, chips, granules, particles, or the like—being treated with the method of this invention. However, if desired, it may be restricted to only that portion of the article, including the surface thereof and extending inwardly from the surface substantially a uniform distance, which in effect forms a sheath about the article. Or, if it is preferred, the deposition region may be localized at the core of each of the articles being treated, such as, for example, individual fibers.

There are at least two methods by which the polymerization catalyst may be chemically bonded to the ion exchange groups of the material being treated in a sheathlike deposition region restricted to the outer portions of the article. First, ion exchange groups may be introduced to only the outer portions of the interior of the article. The topo-chemical reaction between fibrous cellulose and sodium chloracetate is an example. Second, if ion exchange groups are initially present throughout the interior of the material to be treated, ultimate bonding of the catalyst to the starting material by formation of a salt compound may be limited to only the outer portion of the interior. An example of this method would be to contact cellulose derived from wood (which contains carboxyl groups) with a solution of almost neutral ferrous iron for a very short time so that only the carboxyl groups in the outer portions of the interior of the cellulose are converted by ion exchange to the iron salt.

In order to restrict the deposition region to the center or core only of the article being treated, the article may be treated so as to exchange all the ion exchange groups in the interior of the article, with the thus treated article thereafter being passed through an oxidizing or reducing agent for a period of time that is sufficiently short that only the catalyst in the outer portions of the article is destroyed. In this way, catalyst placement is restricted to a deposition region that occupies only the center of the article being treated, and polymer formation and deposition will be similarly restricted in the other steps of the method of the invention.

DISTRIBUTION OF CATALYST WITHIN DISPOSITION REGION

No matter whether the deposition region formed by controlled placement of the polymerization catalyst extends throughout the entire interior of the article being treated, or constitutes only a sheath around the article, or constitutes only a central core, the distribution of the catalyst throughout the region involved corresponds substantially to the distribution within the deposition region of the ion exchange groups by means of which the catalyst is bound to the polymeric starting material.

Now, in any given case a particular catalyst will be bound to the chemical groups of the polymeric starting or host material by exchange of ions having a particular sign, i.e., either plus or minus. Hence the distribution of catalyst within the deposition region will be substantially similar to the distribution within the region of ion exchange groups of a given sign contained in the host.

DISTRIBUTION OF POLYMER WITHIN DEPOSITION REGION

When a suitable olefinic monomer is contracted with the polymeric host material containing polymerization catalyst distributed within the deposition region as just described, and the other necessary conditions for polymerization are present, a guest polymer will be formed and deposited in the vicinity of the ion exchange groups of the host to which the catalyst is bound.

The reason for this is that the decomposition of the catalyst or the reaction of the catalyst produces very reactive species in the near neighborhood of the bound ionic species. These reactive species may be excited states of ions or molecules, or free radicals. Whatever they are, they are usually so reactive that they cannot diffuse an appreciable distance (relative to molecular dimensions) before they react further in any of a number of ways, some of which are:

(*a*) Reaction with atoms or atom groupings of the host material.

(*b*) Reaction with the solvent in the host.

(*c*) Reaction with substances dissolved in the imbibed liquid in the host.

(*d*) Reaction with other active species.

(*e*) Unimolecular transformation to more stable species.

(*f*) Reaction with a monomer molecule to convert it to a free radical or other species that can propagate the growth of a polymer by monomer molecule addition.

In most common olefinic polymerization processes the growth of the polymer molecule is complete in a small fraction of a second or the growing polymer is so large that its diffusion rate is very slow. Thus the polymer is necessarily placed in the near locus of the bound catalyst. In addition, physical entanglement of the guest molecule among the host molecules as well as intermolecular attraction further retards or prevents change in position of the guest molecule.

It follows from this that the concentration of the deposited polymer in the materials resulting from use of this invention is greatest in the vicinity of the ion exchange groups to which the polymerization catalyst is bound in the catalyst placement step of the invention. Likewise, the distribution of the deposited polymer within the deposition region is substantially the same as the distribution within the region of ion exchange groups of a given sign contained in the host.

In many instances the ion exchange groups of the host polymer are distributed uniformly throughout any deposition region in which they are found. Thus in these instances the ultimate polymer deposition will extend uniformly throughout the deposition region within the polymeric article that has been treated. Staining with various reagents, such as iodine, that will selectively stain the deposited polymer with a dark color and the unmodified polymeric starting material with a light color if at all, gives experimental evidence that in any such instance the deposited polymer in the final material resulting from use of this invention is distributed uniformly throughout the deposition region.

GRAFT COPOLYMERIZATION

Because of the intimate molecular mixture of the polymeric host material and the monomer introduced into the deposition region, the deposited polymer and the host polymer form an intimate mixture. In addition, the physical properties of the resulting polymer-modified material are consistent with at least a partial graft copolymerization of the host and guest polymers.

Since a radical or other active species is created very near the host molecule, this species can attack many types of host polymeric materials and produce a radical or other active site on the polymeric host molecule itself. This active site may react with monomer molecule and initiate a polymerization so that a graft copolymer of the host and guest is produced.

Alternatively, the growing polymer species may attack the host material and become attached to it or remove an atom to create an active site so that a polymer branch is initiated on the host material molecules.

As an example of the essentially permanent fixation of location of the deposited guest polymer, polymer-cellulose films four years old showed no migration of the polymer when the polymer deposition had been restricted to the outer layers of one side of the film. The guest polymer could not be extracted with several good solvents for the bulk polymer. These data are consistent with chemical interaction between host and guest polymers, although not all deposited polymer need be reacted.

STERIC CONSIDERATIONS

It is clear that in the method of this invention the host material must be permeable to both the catalyst ion that is to be bound with it and to the monomer molecule that is to be polymerized in the vicinity of the bound catalyst. Alternatively, the colloidal surfaces upon which the ion-binding groups are located must be accessible to the ion exchange. One may adjust the catalyst used so that its ion size is small enough, or one may swell the host material to permit entrance of catalyst and monomer, all in accordance with principles well known to persons skilled in the art.

With regenerated cellulose film with a swelling value of 2.1, for example, the entrance of vinyl stearate into the cellulose film substance is very slow, with resulting hindrance to polymerization. A more dilute system than wet regenerated cellulose, however, has larger interstices between the molecules and thus permits vinyl stearate to diffuse into the bound catalyst site where it may be polymerized.

The chemically bound catalyst of this invention can be considered in some instances as a new heterogeneous catalyst system and the guest monomer molecule may have to adopt a limited range of orientations at the bound catalyst locus to form the "activation complex" or other intermediate species with the catalyst. This adoption of an orientation requires space that may not be available with particular combinations of host material and catalyst.

In the case of native cellulose, the deposition of polyacrylonitrile into the fiber appears to be restricted to the "amorphous regions" as defined by X-ray diffraction studies of the polymer-modified cotton fiber. This may mean that acrylonitrile monomer cannot diffuse into the crystal lattice with appreciable speed, that catalyst cation could not diffuse into the crystalline regions, that no ion binding groups are present in the crystalline regions, or that the monomer cannot orient properly in a restricted space lattice.

COORDINATE VALENCE BONDING

In addition to the bonding of catalyst to the polymeric starting material through salt linkages produced by ion exchange in the catalyst placement step of the method of this invention, the catalyst is in some cases bound at least in part through so-called "coordinate valence bonding."

Such bonding utilizes at least some of the coordinative capacity of the host material and of the metal ion, for example, which is a part of the catalyst system. The bond so formed is between structural groups in the host material such as carboxyl, amino, nitro, etc., and electrons in the inner shell of the associative ion such as the metal ion just mentioned. Bonds of this type may be present in addition to ion exchange linkages, in which case both bonds assist in anchoring the polymerization catalyst in place within the deposition region in the interior and/or upon the external surfaces of the material being treated.

The cobaltous ion provides an example of a catalyst ion that may be bound in part to the polymeric host material through coordinate valence bonding. The cobaltous ion in aqueous solution is usually written $Co^{++}$ but it is actually an aquo ion in water, i.e., the cobaltous ion has several molecules of water bound to it within its coordination sphere. When this ion (which can serve as part of a polymerization initiating catalyst in the method of this invention) diffuses into a wet cellulose film it can bring its associated water molecules with it. When the cobaltous ion solution is of such concentration and has been adjusted to such pH that the cobaltous ion can "exchange" with the cation already associated with the negative ion exchange groups (mainly carboxyl or carboxylate) of the cellulose, the cobaltous cation is in such close spatial relation to the cellulose that hydroxyl groups on the same or adjacent cellulose molecules may take part in the coordination sphere of the cobaltous cation or displace water molecules already associated therewith.

In a host article of more complex chemical structure such as a protein the possibility for coordinative participation in the linkage of the bound catalyst cation or anion is even more obvious.

The mechanism of coordinate valence bonding does not neutralize the attached ion, which is left electrolytically charged. However, the ion attached to the host material through this type of bonding can be neutralized by association of still other ions. Thus, for example, a nickel ion might associate itself through coordinate valence bonding with the carbonyl groups in a host material that has relatively few such groups. Such a nickel ion might then of its own right provide part of a polymerization catalyst system. Or the nickel ion might be neutralized by association with a sulfite or persulfate ion, thereby changing the category of catalytic behavior of the total catalyst system (cation plus anion) anchored in the polymeric host material.

POLYMERIZATION CATALYST

The polymerization catalyst employed in the method of this invention may be a single compound which by itself is capable both of ion exchange bonding with the material being treated and of initiating polymerization of the monomer or monomers to be polymerized and deposited in the starting material. Or it may be a multiple component catalyst system, such as a so-called "redox couple," one part of which is incapable by itself of initiating polymerization. In such case one component of the catalyst system may if desired be introduced into the starting material separately through an ion exchange reaction which chemically binds it to the individual articles being treated, with the remainder of the system being introduced into the material thereafter to complete the catalyst.

The remaining steps of the method of this invention are to contact the material being treated with a monomer or monomers, preferably in solution, and to continue such contact to form and deposit a polymer or copolymer of the monomer throughout the deposition region defined by the controlled catalyst placement step of the method.

ORDER OF STEPS

In the case of a multiple component catalyst system, the preferred order of steps is to (1) introduce the first component of the catalyst into the polymeric starting material by ion exchange, (2) then contact the material with the monomer, and (3) thereafter contact the material with the remaining component or components of the catalyst system.

However, if desired, the order of these steps may be varied. For example, the starting material may be first contacted with the monomer and then successively with the two components of the catalyst system. The two components of the catalyst may be applied in succession, followed within a short time by the monomer. If desired, the monomer and one component of the catalyst system may be applied simultaneously, followed by the remainder of the catalyst system. Alternatively, either of the components of the catalyst system may be applied first, followed by simultaneous application of the monomer and the remainder of the catalyst system. If the polymerization catalyst system is a so-called "redox couple," the reducing and oxidizing agents may be applied, in the steps just listed, with either one of the two agents introduced first.

Ion exchange with the host polymeric starting material containing ion exchange groups can take place in the same solution that contains the monomer, and the catalyst which is thus bound may subsequently initiate polymer deposition at a low temperature, or the temperature may be raised to start decomposition of the catalyst and to deposit the guest polymer in the host material. Preferably, however, as indicated above the monomer solution containing one ionic member of the catalyst system is used to steep the host material containing ion exchange groups into which the guest polymer is to be deposited, and the other member of the catalyst system is added thereafter.

SPEED OF POLYMERIZATION

The speed of polymer formation with the bound catalyst has been found to be higher in some cases, and lower in others, than would be the case with a homogeneous polymerization using the same catalyst species and the same catalyst concentration. Thus the bound catalyst, in place within and/or upon the host polymer, is acting as a new catalyst system.

In these cases, the chemically bound catalyst in place within the host polymer is acting in effect as a heterogeneous catalyst. The limitation in space available for polymer growth or the configuration of the force field around the growing guest molecule may impose limitations on direction and nature of polymer growth and even the steric (L or D) configuration of the guest. Depending upon the circumstances, this fact may either increase or decrease the rate of formation and deposition of polymer.

MONOMERS THAT MAY BE USED WITH METHOD OF THIS INVENTION

The classes of monomers that may be used with the method of this invention include olefinic monomers such as vinyl, vinylidene, allyl and diene monomers.

Some of the specific monomers that may be employed with the method of this invention include methyl methacrylate, ethyl methacrylate, butyl methacrylate, methyl acrylate, ethyl acrylate, butyl acrylate, octyl acrylate, vinyl acetate, vinylidene chloride, styrene, acrylonitrile, 4-vinyl pyridine, acrylamide, N-vinyl pyrrolidone, acrylic acid, methacrylic acid, itaconic acid, allyl methacrylate, allyl acrylate, methallylacrylate, vinyl methacrylate, p-chlorostyrene, bis-B-choroethyl vinyl phosphonate, 4-vinylcyclohexene, vinyl methacrylate, calcium acrylate, crotonic acid, B-aminoethylacrylate, disodium fumarate, methacrylamide, 2-N-morpholinoethyl acrylate, acrolein, styrene sulfonic acid, 2,5-dichlorostyrene, N,N-dimethylaminoethyl acrylate acetate, N,N-dimethylaminoethylocrylate base, pentachlorophenoxyacrylate, methylene bis-acrylamide, 2-vinyl pyridine, N-vinyl carbozole, allyl methacrylate, 2-ethylhexyl acrylate, vinyl chloride, vinyl stearate, butadiene, chloroprene, maleic anhydride, methyl 2-chloroacrylate, methylstyrene, diethyl maleate, methacrylonitrile, tetra fluoroethylene, divinylbenzene, and many others.

Mixtures of such monomers may also be employed, in many such cases resulting in formation and deposition of copolymers. If desired, the polymeric starting material may be treated first with one of these monomers and then with another.

VARIOUS REACTION CONDITIONS

While water is the cheapest solvent or dispersion medium for the ion exchange and the polymer deposition steps of this method, other solvents and mixtures of solvents such as alcohols, dioxan, acetone and the like may be used. As a matter of fact, if desired the solvent may be omitted altogether and the polymerization reaction carried out by use of pure monomer.

The deposition may be carried out under air, nitrogen, an inert gas, a volatile monomer itself, or under steam from the refluxing solution as the blanket. The deposition may be carried out at room temperature or elevated temperature, and at atmospheric pressure or above.

The various reagents employed in the method of this invention, such as the polymerization catalyst or the monomer to be polymerized, may be introduced into the host or starting material by spraying, printing, doctoring, rolling, dipping or other methods in addition to steeping. Dusting of a water soluble salt catalyst on a wet surface may also be employed.

While it is generally desirable, in order to minimize undesired polymerization in the aqueous or other external phase, to wash out the catalyst which has not become chemically combined with the polymeric film, filament, fiber or other article being treated, this is not always necessary. For example, if the polymeric article is immersed in a rather dilute catalyst solution it can frequently remove almost all the ionic species from the solution by ion exchange, with almost no catalyst being absorbed within the material without being chemically combined with the ion exchange groups within the polymeric material being treated.

It should be noted that in the case of a multiple component catalyst system, the catalyst is considered to be "chemically combined" with the polymeric host or starting material when an ion of one component of the catalyst system, such as $Fe^{++}$ in the $Fe^{++}$—$H_2O_2$ system, is bound to the ion exchange groups of the host material by a salt bond.

The rate of the polymerization reaction in the method of this invention may be increased by use of any of various catalyst promoters, such as cupric ion, dextrose, etc., which are well known in the art.

The method of this invention may be carried out even in the presence of a quantity of polymerization inhibitor, if the inhibitor is a part of the catalyst system employed or it is neutralized by excess catalyst present. An inhibitor may be naturally present, for example, in the polymeric starting material. In some instances it may be necessary to remove any such inhibitor from the starting material before employing the method of this invention.

EXAMPLES

Before specific examples to illustrate the method of this invention are set forth, a summary will be given of at least some of the matters they exemplify. The examples listed below illustrate, among other things, the indicated aspects of the present invention:

*Various host materials.*—Examples 1, 3, 6, 13, 14, 46, 49, 51, 74, 76, 80, 87, 88, 95, 98, 100, 112, 113, 129, 139, 140, 142, 144, 151, 154, 173, 174, 180. Also see the discussion following Example 99.

*Catalyst systems.*—See the discussion following Example 159, and Examples 1, 6, 7, 11, 12, 13, 17, 36, 37, 58, 72, 73, 108, 109, 127, 128, 133, 139, 142, 143, 164–7.

*Monomers.*—Examples 1, 2, 4, 5, 9, 15, 18, 24, 25, 27, 29, 36, 39, 41, 50, 54, 64, 86, 87, 103, 104, 107, 127, 135–7, 146, 148, 150, 165, 167, 181.

*Various reaction conditions.*—Examples 10, 24, 25, 32, 45, 67, 155, 160, 168, 169.

*Use of nonaqueous media.*—Examples 17, 20–23, 146, 147, 171.

*Deposition within a preselected region.*—Examples 8, 16, 26, 33, 34, 38, 42, 44, 53, 55–7, 59, 61, 62, 64, 65, 67–9, 74, 77, 87–96, 173, 177, 178.

*No monomer waste.*—Examples 1, 13, 14, 54, 87f, 89, 101, 142.

*End products having various characteristics.*—Examples 2, 4, 5, 6, 17, 18, 19, 24, 27, 28, 35, 35a, 36, 41, 42, 54, 66, 71, 140, 156, 166, 170, 173–6.

*Chemical modification of guest polymer after deposition.*—Examples 8, 29, 33, 39, 41, 42, 55, 149. Also see discussion following Example 35a.

*Polymer modified cotton and rayon.*—Examples 80 to 86 and 88 to 97.

*Deposition into fibrous casings.*—Examples 87 to 87f.

*Deposition into wood and components thereof.*—Examples 100 to 138.

The above list is intended simply to make it more convenient to consult specific examples which illustrate particular aspects of the present invention. The listing is not intended to be exhaustive. Thus, there may be additional examples besides those listed which exemplify any given aspect of the invention. By the same token, any given example may illustrate other aspects of the invention besides those to which attention is called for that example in the above list.

Unless otherwise stated, the "solutions" referred to in these examples are aqueous solutions. Where a particular temperature of steeping is not specified, it is room temperature, namely, between about 23° C. and 26° C.

*Example 1*

This example shows the speed of polymer deposition that can be achieved by use of the method of this invention. It also shows that no waste of monomer in aqueous phase polymerization occurs with this method. In contrast to the results in the prior art, there is uniform deposition of polymer in the material treated in this example.

Fifteen pieces of regenerated cellulose film made by the viscose process, and containing 0.025 milliequivalent of cation exchange capacity per gram of dry cellulose, about five mils thick in the gel state, and weighing about one gram were subjected individually to the following process:

The film was immersed at 25° C. for one minute in a solution of 0.7% ferrous ammonium sulfate at pH 5.5. The film was then washed in deionized water until no test for iron in the washings could be made, and then placed in 400 ml. of 0.003% hydrogen peroxide in water at 100° C., the water containing 10 ml. of pure methyl methacrylate. Polymerization was continued for five minutes under reflux and was terminated by pouring the contents into cold water. No clouding in the aqueous solution was observed. After extraction of the film in acetone overnight and drying at 105° C. for several hours, the films were found to have increased in weight by 48%. The films were a slight yellowish brown in color and were quite flexible. Mullen burst tests on the films indicated no decrease in strength as compared to control films, and were slightly over 6 pounds per mil per square inch of film area. The tenacity was about 3 grams per square mil as measured by the Scott test. Elongation had been decreased about one third as compared to a control film.

*Example 2*

This example shows that polymerization and deposition of a hydrophobic monomer may be used to render a hydrophilic material hydrophobic.

About 1 gm. of a thin film (1 mil) of regenerated cellulose was treated with the ferrous solution as above described and washed to immobilize the ferrous iron catalyst by ion exchange. The film was then placed in a 0.003% hydrogen peroxide solution at 100° C., the solution having on its surface ten ml. of pure styrene. The solution was refluxed for one hour and polymerization stopped as in Example 1.

After extraction of the film with toluene overnight and drying, the average gain in weight of several films was 36%. The films were slightly yellow, more brittle than the ones in which polymethyl methacrylate had been deposited, and more rigid. The surface was more hydrophobic than normal cellulose films.

*Example 3*

This example shows use of host natural fibers which have a complex mixed composition. In a cellulose "host," ion exchange groups do not have to be attached to the cellulose backbone. In a mixture of host polymer molecules, one or more than one may act as the ion binder.

Small sheets of manila paper were used in this experiment. They were of very closely equal weight, and contained 0.1 milliequivalent of cation exchange capacity per gram. The papers were immersed in 0.7% ferrous ammonium sulfate solution at pH 5.4 for one minute, washed, and added to a solution of 0.003% hydrogen peroxide containing 20 ml. of pure methyl methacrylate per liter of solution. The polymerization was continued at reflux for five minutes. Polymerization was stopped as in Example 1.

The paper was dried and found to have increased in weight by 90%. It was a cream color, somewhat rigid, its dry Mullen strength was only about half that of the original paper, and its wet Mullen strength was about one and a half times its dry Mullen strength.

*Example 4*

Internal deposition for permanent plasticization of the "host" material is shown in this example.

Manila paper was treated as in Example 3, except that a monomer solution of butyl acrylate instead of methylmethacrylate was used. Polymerization time was twenty minutes.

The film increased in weight by 44%, and was quite flexible even after having been dried at 110° C. overnight. A few of the sheets exhibited some adhesiveness.

*Example 5*

Rot proofing of cellulose film is disclosed in this example.

Cellulose film containing 0.019 milliequivalent of exchange capacity per gram was dipped into 0.8% ferrous ammonium sulfate at pH 5.5 for one minute. It was rinsed to remove catalyst not chemically combined, and placed in a solution containing 0.03% hydrogen peroxide and 5% acrylonitrile at 100° C. and refluxed for one hour.

After removal of the film and drying, it was found to have increased in weight by 30%.

*Example 6*

Synthesis of an amphoteric film that will contain 0.02 meq./gm. cation exchange and 0.15 meq./gm. anion exchange capacity is shown in this example. The film contains a weak base group of known nature, which is used for catalyst binding. A single component catalyst was used.

Amino groups were introduced into cellulose by steeping the film in aqueous 2-chloroethylamine hydrochloride, blotting, and placing in 50% sodium hydroxide solution at 100° C. for five minutes, according to the procedure of Guthrie, J. D., Textile Research J. 17, 625 (1947). The films were then washed with deionized water until neutral, and were found to contain 0.15 milliequivalent of anion exchange capacity per gram.

Persulfuric acid was made by passing ammonium persulfate through an Amberlite 1R-120 cation exchange resin in its acid form. The cellulose containing the amino groups was then steeped in the persulfuric acid for two minutes, washed to remove the uncombined catalyst, and then placed in 300 ml. of water containing 20 ml. of acrylonitrile at 50° C. for thirty minutes.

After drying, the films had increased in weight by 23%.

*Example 7*

In this example a redox couple is used to initiate deposition with an anion comprising one member of the redox couple is bound to the host material.

Amino cellulose, produced as in Example 6, was steeped in 1% persulfuric acid for two minutes and washed free of excess uncombined persulfate at room temperature. A solution of 400 ml. of water containing 20 ml. of pure methyl methacrylate and 0.3 gm. of sodium bisulfite was prepared and heated to 50° C. The persulfate treated film was then added and the system heated under air at 60° for fifteen minutes.

After drying, the resulting films showed an average increase in weight of 65%.

*Example 8*

This example gives an illustration of the chemical modification of the guest polymer after it has been deposited in the host or starting material. It also discloses proof of controlled localization to one side of a cellulose film of a polymer corresponding to the locus of the bound catalyst.

A four foot long tube of regenerated cellulose film about four mils thick and three inches in diameter was tied at both ends. The tube was immersed for three seconds in a 0.7% solution of ferrous ammonium sulfate at a pH of 4.5 and 25° C., and then washed in deionized water to remove iron not chemically combined with the cation binding groups of the film. The film was then immersed in two liters of 0.003% hydrogen peroxide containing 25 ml. of pure methyl methacrylate, the solution being at the boiling point and kept at the boiling point under reflux for fifteen minutes. Polymerization was stopped by dumping into cold water. The film was then washed in hot water for several hours to remove excess monomer.

Pieces of the film were cut out and the side of the film exposed to the ferrous catalyst solution was marked for identification. Several of the films were dehydrated in acetone and in alcohol. The methyl methacrylate polymer within the film was then converted to the acid hydrazide derivative by refluxing the film for seventeen hours with ten times its weight of hydrazine hydrate. The film was then washed for several hours in warm distilled water to remove the excess reagent.

Several pieces of film were placed in a sensitive Tollens reagent contained in an actinic glass vessel, pieces of film removed at intervals, and microscopic slides made of cross sections of the film. The films varied in color with time from a yellow to a deep red-brown. The cross sections showed that silver had been deposited within the film to a depth of only one fourth of the thickness of the film and from the side of the film which had been exposed to the catalyst.

Furthermore, other samples of the same pure cellulose film exposed to the same catalyst solution for three seconds, washed in deionized water to remove excess iron, dropped into 1% sodium sulfide for twenty minutes, dehydrated, and cross sections made, showed the green color of ferrous sulfide precipitation penetrating into the film about the same distance as the band of precipitated colloidal silver metal. The film contained 0.031 meq./gm. exchange capacity.

*Example 9*

Deposition of polyvinyl acetate is disclosed in this example.

A solution was prepared, containing 400 ml. of water, 10 ml. of pure vinyl acetate and enough hydrogen peroxide to give the solution a 0.006% content of hydrogen peroxide. The solution was brought to 100° C. About 1.8 gm. of thin cellulose film containing 0.024 milliequivalent exchange capacity per gram of cellulose was steeped in 0.7% ferrous ammonium sulfate at a pH of 4.2 and washed to remove the uncombined iron. It was then dropped into the above solution and the solution was refluxed for five minutes.

The equal increments of film were removed, dried after washing overnight at a temperature of 110° C., and had increased in weight by 2.3%.

*Example 10*

This example shows that if the exchange capacity of the polymeric host material is relatively high and the catalyst solution relatively dilute, absorption of the catalyst into the host is relatively complete and very little, if any, uncombined catalyst is present within the starting material which has been treated with catalyst. Thus, if desired, in this situation the washing step of the above examples can be omitted.

Two mil thick cellulose film containing 0.06 me. of exchange capacity per gram was used. The carboxyl in the films was in the acid form, i.e. the film had been treated with acid to convert any carboxyl present as salt into the free acid. About one gram was placed in a solution of 0.025% ferrous ammonium sulfate at pH 4.4. Within a minute the pH had dropped to 3.6 because of ion exchange. The film was removed, blotted, and immediately dropped into a boiling solution of 400 ml. of 0.003% hydrogen peroxide containing 10 ml. of pure methyl methacrylate. The solution was allowed to reflux for fifteen minutes.

After stoppage of polymerization, the dry film weighed 90% more than originally. No turbidity arose in the aqueous phase, thus indicating that there was no escape of catalyst ions.

*Example 11*

In both this example and Example 12, the initial ion which was combined with the cellulose was thereafter converted by a chemical reaction into another species, not necessarily ionic, whose locus was determined by the initial ion exchange reaction and which acted as the catalyst for the polymerization and deposition of the guest polymer.

Cellulose films about 14 mils thick and containing 0.026 meq./gm. exchange capacity were dipped into 0.05 M cupric acetate at 25 degrees for five minutes. The excess uncombined copper was washed out and the films then immersed in a 0.05 M solution of sodium hydrosulfite for two minutes. The film became purple due to colloidal copper. The films were then washed in warm water to remove the excess reagent, and immersed in a solution containing 20 ml. of pure methyl methacrylate and 1 g. of ammonium persulfate in 400 ml. of water. The film was left there at 25° C. for fifteen minutes, during which time the purple color of the film was gradually removed and the film became only slightly translucent.

When the film had been washed and dried, it was found to have increased in weight by 12%.

*Example 12*

The same type film as in Example 11 above was immersed in 0.01 N silver nitrate for five minutes. It was washed free of uncombined silver and immersed in 0.1% hydrazine hydrate in water for five minutes. Metallic silver was precipitated. The film was then washed and dropped into the same monomer system as in Example 11 and left to stand for fifteen minutes.

The film was decolorized in about seven minutes and the film after washing and drying overnight at 110° C. had gained in weight by 2.2%.

*Example 13*

This example shows deposition into an amphoteric host in which the oxidizing member of the redox couple is bound to the host.

Five samples of hygrostated wool varying in weight from 0.5–0.8 gram were steeped in a 0.8% solution of persulfuric acid for twenty minutes at room temperature. The wool was washed to remove uncombined persulfuric acid. The washed wool was then placed in 400 ml. of water saturated with methyl methacrylate and also containing 0.3 gram of ferrous ammonium sulfate hexahydrate. The wool was left in the solution at 25° C. for nineteen hours.

The wool fabric pieces were then removed, washed in water and dried. They had gained in weight by 111%. The wool samples were brownish in color and had a stiff and harsh feel. No polymerization had occurred in the aqueous phase although some turbidity due to hydrolyzed ferrous ion was evident. Microscopic examination showed that the scales of the wool had been largely covered with polymer.

*Example 14*

This example illustrates the deposition of a polymer into a gel as the host material.

U.S.P. agar agar was used to make up a 4% gel in hot water. The gel solution was kept just above its liquefaction range of temperature while small amounts were poured into Petri dishes and allowed to solidify for about 30 minutes at room temperature. The thin disk of gel was removed from the dish and immediately weighed. The disk were between 1 and 3 millimeters thick and of such size that they contained from 0.3 to 0.7 gram of the dry agar agar. The disks were then broken up into four pieces and stirred for twenty minutes with 200 ml. of a freshly prepared 0.7% ferrous ammonium sulphate solution which was 0.1% in ferrous iron. The disks were then removed from the ferrous solution and washed four times, for ten minutes each time, in cold deionized water.

The disks were then dropped into 200 ml. of dilute hydrogen peroxide containing 10 ml. of pure methyl methacrylate monomer. Polymerization was allowed to continue for various times, the results of polymerization at 24° C. and in the presence of 0.012% hydrogen peroxide being shown in Table 1 below. The results of polymerization with the same concentration of monomer and 0.006% hydrogen peroxide are shown in Table 2 below.

TABLE 1—DEPOSITION OF POLYMETHYLMETHACRYLATE INTO AGAR AGAR GELS [1]

| Agar agar weight, gm. | Polymerization time, hr. | Agar agar plus polymer weight, gm. | Gain in weight, percent |
|---|---|---|---|
| 0.4512 | 3 | 1.4317 | 214 |
| 0.5282 | 3 | 0.9690 | 83 |
| 0.4785 | 3 | 0.8687 | 82 |
| 0.3312 | 4 | 1.4890 | 350 |
| 0.4085 | 2 | 1.0492 | 190 |
| 0.3065 | 2 | 0.6714 | 121 |
| 0.2608 | 1.5 | 0.5780 | 122 |
| Blanks: | | | |
| 0.4306 | 2 | 0.4012 | |
| 0.5900 | 17 | 0.5112 | |

[1] Solution at 24° C. containing 5 percent monomer and 0.012 percent hydrogen peroxide.

TABLE 2—DEPOSITION OF POLYMETHYLMETHACRYLATE INTO AGAR AGAR GELS [1]

| Agar agar weight, gm. | Polymerization time, hr. | Agar agar plus polymer weight, gm. | Gain in weight, percent |
|---|---|---|---|
| 0.5338 | 0.83 | 0.6980 | 31 |
| 0.5002 | 1.50 | 0.9721 | 73 |
| 0.5358 | 2.00 | 1.1753 | 119 |
| 0.6830 | 2.67 | 1.6889 | 147 |
| 0.6713 | 3.17 | 1.4099 | 110 |
| 0.4961 | 50.00 | 4.7240 | 851 |
| 0.4529 | 50.00 | 3.6280 | 701 |
| 0.3875 | 50.00 | 2.6385 | 580 |
| Blank: 0.5908 | 50.00 | 0.5172 | |

[1] Solution at 24° C. containing 5 percent monomer and 0.006 percent hydrogen peroxide.

The ion exchange capacity of the particular agar agar sample used was determined by steeping several thin gels of known agar agar content in 2 N hydrochloric acid, washing to a pH of 5.5 with deionized water and titrating the acid form of the gel in the presence of 10% sodium chloride solution. A dilute standard, 0.021 N hydrochloride acid solution, was used for back titrating excess alkali and an acid binding capacity (exchange capacity) of 0.5 milliequivalent per gram was found.

When the agar agar was placed in a 0.1% ferrous solution for the same time that was used in the polymerization, the gel washed, and the iron then displaced with acid, it was found that the sulphate group would combine with iron to about 95% of its capacity at the pH level used.

Sulphur was determined in the same lot of agar agar by means of Parr Bomb oxidation and turbidimetric determination of the sulphate formed in this way. The polymer was found to contain 0.64% sulphur, this accounting for about 0.4 milliequivalent per gram of the exchange.

In the above procedure, no polymerization occurred in the aqueous phase.

Polymer in the gel disks was determined by soaking the disks in methanol for one half hour, decanting and then drying overnight at 55° C. The disks were then placed in a vacuum desiccator over phosphorous pentoxide at about 30° C. overnight.

*Example 15*

This example shows the deposition of p-chlorostyrene into regenerated cellulose.

Five ml. of p-chlorostyrene, freed of inhibitor by high vacuum distillation, were added to 100 ml. of 0.006% hydrogen peroxide in boiling water in a glass ground neck flask. One gram of regenerated cellulose film which had been steeped for one minute in 0.7% ferrous ammonium sulfate at pH 5.4, and washed, was added to the flask and the contents refluxed for twenty minutes.

The cellulose film was slightly hydrophobic and had gained in weight by 10% after drying. The initial cellulose had about 0.020 milliequivalent of carboxyl per gram cellulose. The film was a slightly yellowish color.

Example 16

This example and Example 15 show that use of the method of this invention makes it possible to deposit the same monomer in a sheath or throughout the cellulose film at will.

The procedure of Example 15 was repeated except that the cellulose film was dipped for only three seconds in the ferrous solution.

The very slightly yellow films obtained had gained in weight by a little less than 0.5% but were quite hydrophobic. A drop of water placed upon them did not spread and had a high contact angle with the film. In the case of a closed cellulose tube subjected to the above procedure, the tube could be wet from one side and not from the other.

Example 17

The use of a large molecule, hydrophobic percompound to deposit a polymer into a hydrophilic film is shown in this example. Use of a nonaqueous medium is also illustrated.

The procedure of Example 15 was repeated except that xylene was used in place of water as the solvent, and 0.05% benzoyl peroxide was used in place of hydrogen peroxide as the second component of the catalyst in xylene.

In this instance, the cellulose tube increased in weight by 0.7% and had a somewhat non-uniform deposition.

Example 18

This example discloses the use of a deposited polymer containing a high percentage of chlorine for flame retardency.

Example 15 was repeated except that 2,5-dichlorostyrene monomer was used.

In this case, the film weight increased by 15% and the film became somewhat stiff, a darker yellow in color and showed somewhat more hydrophobicity.

Example 19

This example shows controlled sheath deposition in order to achieve hydrophobicity.

Example 16 was repeated except that 2,5-dichlorostyrene was used.

The surface of the film became completely water repellent. The film became a light yellow and increased in weight by about 1.2%.

Example 20

Example 17 was repeated except that 2,5-dichlorostyrene was used as the monomer.

Polymer deposition amounted to about 1.4%.

Example 21

This example shows that both ion exchange and polymer deposition are possible from a substantially non-aqueous solvent.

Water was removed from a 1.9 mil thick regenerated cellulose film by boiling the film for ten minutes apiece with three 300 ml. portions of methanol. A methanol solution of ferrous iron was prepared (containing very little water) by dissolving enough ferrous sulfate heptahydrate to give the solution a concentration of 0.1% ferrous iron. The solution was a very light yellow color. Cellulose film dehydrated as described was added to the methanolic ferrous solution for five minutes with occasional stirring.

After rinsing once for five minutes in methanol, the cellulose was dropped into 300 ml. of boiling methanol, containing 0.03% hydrogen peroxide and also containing 5 ml. of styrene monomer dissolved in the solution. Polymerization was allowed to continue at the boil for thirty minutes.

After removal and drying overnight, the cellulose film was found to have increased in weight by 2.5%.

Example 22

It was found that anhydrous methanol would dissolve 77 p.p.m. of ferrous iron as ferrous ammonium sulfate (essentially anhydrous). Example 21 was repeated except that this anhydrous medium was used in the ion exchange.

The films resulting therefrom showed an increase in weight of 1.8%. They were a very faint yellow color and did not seem to differ appreciably in hygroscopicity from cellulose after they had been exposed to water to plasticize them.

Example 23

This example shows deposition into cellulose from a non-aqueous medium. The slower ion exchange in the alcoholic solution shown here facilitates controlled placement of the catalyst in a deposition region occupying less than the total volume of the host material.

Example 21 was repeated except that the cellulose film containing the ion exchange groups was steeped in the methanolic ferrous solution for only ten seconds before being subjected to styrene deposition. The films obtained in this manner showed an extremely hydrophobic surface as judged by the contact angle of water drops on the surface.

Example 24

This example shows the modification of a cellulose film by deposition of a basic polymer, the resulting polymer-modified film being capable of anion exchange as an anion exchange membrane. The example also shows a different order of steps in the method of this invention: the monomer and hydrogen peroxide are mixed in solution, and the ion-exchanged polymeric host material is then added to this solution.

N,N dimethyl aminoethyl acrylate was freed of inhibitor and the monomer acetate was made by dissolving 5 ml. of the monomer in acetone and precipitating the acetate salt with 5 ml. of glacial acetic acid. Excess of acid was removed by washing the salt with ether. The salt was then made up to about 50% in water.

One gm. of cellulose film containing 0.03 milli-equivalent of carboxyl per gram cellulose was steeped in 0.7% ferrous ammonium sulfate at room temperature and pH 5.5 for one minute and washed with deionized water to remove the salt not chemically combined.

Ten ml. of the above aqueous solution of the monomer acetate were added to 100 ml. of boiling 0.03% hydrogen peroxide. The treated cellulose film was added and refluxing allowed to proceed for fifteen minutes. The slightly yellow solution of the monomer remained clear during the polymer deposition.

After the film was removed and washed with hot water for several hours and dried overnight at 110° C., it was found to have increased in weight by 6.3%. The film remained flexible, and showed ability to be dyed with acid dyes.

Example 25

When the procedure of Example 24 was repeated except that the monomer base itself was used, polymer deposition was 3.8% and, as shown by addition of acetone to the aqueous solution of the monomer, no polymerization took place in the aqueous phase.

Example 26

This example shows that a basic monomer can be made to deposit as a polymer in a controlled portion of the host material.

The procedure of Example 24 was repeated except that the cellulose films were treated only three seconds with the ferrous catalyst solution before being subjected to polymer deposition. A polymerization time of one hour was used.

The films increased in weight by 1.4%. Cross sections of the film dyed with an acid dye showed that the polymer deposition was mainly limited to the surface layers of the cellulose film.

*Example 27*

This example shows that several monomers of low water solubility can be deposited in a controlled manner into the surface layers of cellulose film.

In an effort to modify the surface layers of cellulose film so that it could be heat sealed to other films and so that it could be printed with some printing inks which do not stick to cellulose, the effect of deposition of n-butyl acrylate, n-butyl methacrylate, and n-octyl acrylate as thin layers into the surface layers of cellulose and onto the surface was investigated.

Cellulose film containing 0.025 milliequivalent of carboxyl per gram cellulose was steeped for five seconds in a 0.1% ferrous ammonium sulfate solution and washed free of uncombined iron. The film was dropped into 400 ml. of 0.03% hydrogen peroxide which contained 10 ml. of the monomer in question. Polymer formation and deposition were allowed to take place for thirty minutes at reflux. The films were removed, washed thirty minutes in hot water and dried as tubes which had been blown up.

The polybutyl acrylate and methacrylate modified films were somewhat dry to the touch with a small amount of tackiness in some areas of the film. The films into which polyoctylacrylate had been deposited were quite tacky.

About 5.7% polymer had been deposited into the films containing polybutylacrylate, and 3.4% into those containing the methacrylate. About 2% polyoctyl acrylate had been desposited.

The films showed an increasing degree of hydrophobicity as the length of the carbon chain of the monomer increased.

Heat seals of Pliofilm (rubber hydrochloride) to the cellulose film modified by deposition of butyl acrylate and methacrylate into and onto its surface were excellent for a short time. That is, the strength of the seal was greater than the thin Pliofilm for a period of about one hour, but decreased in strength with time. The initial strength of the heat seal between cellulose modified with polyoctyl acrylate on its surface and Pliofilm was excellent and it lost but little strength with time.

*Example 28*

This example shows that the three "insoluble" monomers used in Example 27 can also be deposited in a uniform manner throughout the cross section of cellulose film. It also reaffirms the use of butyl acrylate polymer as a plasticizer.

The method of Example 27 was repeated except that the cellulose was treated with the ferrous iron for one minute to impregnate it completely.

The known weights of cellulose increased in weight by 30%, 23%, and 11% for the butyl acrylate, methacrylate and octyl acrylate, respectively. The oven dry film containing the poly n-butylacrylate was more flexible than the dry cellulose control film.

*Example 29*

This example shows deposition of a polymer that retains some unsaturation in it. Also, the guest polymer was brominated after deposition in the host cellulose, which illustrates chemical modification of the guest polymer after it has been deposited in the host of starting material.

Hydroquinone inhibitor was removed from allyl acrylate monomer by extraction with concentrated, cold sodium carbonate solution and the excess alkalinity removed with sodium bicarbonate solution. Cellulose filmed was steeped for one minute in 0.1% ferrous iron solution at pH 4.5 and washed. Two ml. of monomer were added to 50 ml. of boiling 0.06% hydrogen peroxide. The treated film was added and allowed to react for one hour at the reflux temperature.

After removing the film and washing with hot water, the film was found to contain unsaturation as shown by bromination experiments. The film had gained in weight by 5.4%. After the film was left for several days exposed to air and ultraviolet light, the amount of unsaturation had decreased to 20% of former values. The film had also become less flexible than formerly.

*Example 30*

Localized deposition of allyl acrylate is shown in this example.

The procedure of Example 29 was repeated except that the cellulose film was steeped for only five seconds in the catalyst solution.

The film gained in weight by only 1%.

*Example 31*

This example shows some effects of deposition of an unsaturated polymer of the physical properties of cellulose film.

Allylacrylate monomer was distilled under 80 millimeters mercury pressure at 70° C. to free the monomer from inhibitor.

Four 3" pieces of regenerated cellulose film were dried, weighed, and then steeped in a solution of 0.1% ferrous solution at a pH of 5.4 for two minutes. The pieces of film were then freed of uncombined iron by washing, and were then placed in 200 ml. of boiling water containing 2 ml. of allylacrylate; the solution was made to 0.03% hydrogen peroxide immediately. The deposition was allowed to progress for one hour. After refluxing the films in the solution for one hour, they were removed and washed for thirty minutes in hot water.

Two of the films were dried for determination of the extent of polymer deposition while the other two were reserved for strength measurements. The films were found to have increased in weight by approximately 36%; there was no marked difference in the appearance of the films compared to the controls. The treated films appeared to have much less stretch before breaking than the normal unmodified cellulose films.

*Example 32*

This example shows that the rate of polymer deposition decreases with decreased concentration of one component of the redox couple.

Ten regenerated cellulose films were subjected to the conditions of Example 31 except that only 0.003% hydrogen peroxide was used.

The films gave no evidence of surface deposition of polymer. Three of the films dried at 110° C. for three hours showed 11.4% increase in weight.

*Example 33*

This example shows localization of polymer deposition to the outer portions of the cellulose film and a staining technique to demonstrate it.

In this procedure a regenerated cellulose film was steeped in 0.1% ferrous solution at a pH of 5.4 for three seconds. The film was in the form of a tube about 4' long which had been tied at both ends. The tube was rinsed and placed in 400 ml. of 1% by volume boiling allylacrylate. Sufficient hydrogen peroxide was added to make the solution 0.03%, and deposition was continued for one hour. The film was then washed in the usual way.

By way of illustration of the localization of the deposition of the polyallylacrylate to one side, the film was placed in 0.02 N potassium permanganate solution for thirty minutes at room temperature. The film began to discolor and turn brown resulting from the oxidation of the unsaturated bond by the permanganate, and the consequent precipitation of manganese dioxide. Sections of the colored film were washed thoroughly in hot water and dehydrated in acetone. Pieces were cast in wax and cross-sections made for purposes of microscopic study. It was found that the orange-brown color was only slightly on the side of the film representing the inside of the tube.

*Example 34*

This example shows localization at relatively high polyallylacrylate add-on.

Regenerated cellulose film was washed free of glycerol, and the free sulfur therein was removed by extraction with sodium sulfide followed by washing. Ten portions of this film were then dipped in ferrous solution, as in the foregoing examples, for three seconds, washed, and allylacrylate polymer was deposited from 1% monomer solution and 0.003% hydrogen peroxide solution under reflux, for thirty minutes.

After drying, the sections of film were found to have increased in weight by 18%.

Immersion of the films in 0.02 N potassium permanganate for thirty minutes, washing, dehydrating and cross-sectioning in wax as in the foregoing Example 33 gave microscopic cross-sections which indicated clearly that the yellow color due to precipitaed manganese dioxide was restricted to the outer layers of the cellulose gel.

*Example 35*

This example illustrates the presence of unsaturation in the cellulose film which has been modified in accordance with the present invention, and some results of that unsaturation.

Two equal portions of about 1.00 gram of regenerated cellulose film which had been modified by treating it in accordance with the procedure of Example 31, and an unmodified control film were placed in 50 ml. of water. Saturated bromine water was added to the films in the dark. The unmodified film absorbed about 5 drops of bromine water while the modified film continued to absorb 5 times that amount.

The tables below illustrate the physical characteristics of treated and untreated film as indicated by the Scott and Mullen tests;

TABLE 3—MULLEN TESTS OF CELLULOSE FILMS MODIFIED WITH VARIOUS AMOUNTS OF POLYALLYLACRYLATE

| Film | Mullen test, lb./sq. in./mil | | |
|---|---|---|---|
| | High | Low | Average |
| (1) 36 percent polymer made in 0.03 percent peroxide | 8.14 | 7.08 | 7.46 |
| (2) 13 percent polymer made in 0.03 percent peroxide | 8.19 | 7.50 | 7.73 |
| (3) 11 percent polymer made in 0.003 percent peroxide | 8.38 | 7.65 | 8.05 |
| (4) 11 percent localized to outer portions of film 0.03 percent peroxide | 8.03 | 5.57 | 6.85 |
| (5) 11 percent localized to outer portions of film 0.003 percent peroxide | 9.00 | 7.35 | 8.55 |
| (6) Control film | 8.43 | 7.71 | 8.03 |

TABLE 4—SCOTT TESTS OF FILMS INTO WHICH HAVE BEEN DEPOSITED VARIOUS AMOUNTS OF POLYALLYLACRYLATE

| Film | Elongation, percent | | | Tensile strength | | |
|---|---|---|---|---|---|---|
| | High | Low | Average | High | Low | Average |
| Longitudinal: | | | | | | |
| (1) 36 percent polymer | 30 | 20 | 25 | 3.7 | 2.6 | 3.2 |
| (2) 13 percent polymer | 40 | 20 | 31 | 3.12 | 2.08 | 2.60 |
| (3) 11 percent polymer | 42 | 28 | 37 | 3.75 | 2.10 | 2.92 |
| (4) Control | 55 | 45 | 50 | 3.2 | 2.6 | 2.92 |
| Transverse: | | | | | | |
| Control film | 115 | 60 | 90 | 2.75 | 1.26 | 2.20 |
| 11 percent polymer | 85 | 50 | 73 | 2.30 | 1.37 | 1.87 |

It is seen from the above that there appears to be no great difference in the burst and tensile strengths of the modified and control films.

The effect of polymer deposition on elongation is clear; it can be seen for example that with a 36% deposition of polyallylacrylate into the cellulose, the longitudinal elongation is about half that of the normal control film. It is also to be noted that the deposition of polyallylacrylate into the cellulose is much more effective in reducing the elongation at the break point than is the introduction of polymethyl methacrylate.

Besides allyl acrylate, other unsaturated monomers which can be polymerized and deposited into cellulose and used in a manner similar to allyl acrylate are as follows:

Allyl methacrylate
N,N-diallylacrylamide
Diallyl adipate
Diallylamine
Diallyl benzenephosphonate
Diallyl diglycolate
Diallyl fumarate
Diallyl homophthalate
Diallyl itaconate
Diallyl maleate
Diallyl malonate
Diallyl melamine
N,N-diallylmethacrylamide
Diallyl oxalate
Diallyl phthalate
Diallyl iso-phthalate
Diallyl tere-phthalate
Diallyl sebacate
Diallyl succinate
Divinylbenzene
Ethylene diacrylate
Ethylene dimethacrylate
Glyceryl trimethacrylate
Methallyl acrylate
Methallyl methacrylate
N,N-methylene-bis-acrylamide
Tetraethylene glycol dimethacrylate
Tetramethylene diacrylate
Tetramethylene dimethacrylate
Triallyl aconitate
Triallyl cyanurate
Vinyl acrylate
Vinyl methacrylate Those of the above compounds which have two or more unsaturated groups of similar reactivity can frequently be copolymerized and leave one group still unsaturated. This could be, for example, allyl methacrylate; additional unsaturated bifunctional or polyfunctional monomers which could be used are trimethallyl phosphate, diallyl benzene phosphonate, eptylidene dimethacrylate, methylene dimethacrylate, tetrallylpentaerythritol, crotyl methacrylate, acetylene tetramethacrylate, resorcinol dimethacrylate, chlorallyl methacrylate and ethylene glycol dichloroacrylate, to mention a few.

Deposition of a polyfunctional monomer into cellulose or other plastic or gel phase may be carried out in several different ways with various results.

Copolymers of acrylates methacrylates with an acid or basic polymer such as acrylic acid or vinyl pyridine could be made. Ion exchange of a catalytic cation on to the outer layers of an object formed from such a resin permits, for example, rapid deposition of a polyfunctional cross-linking monomer into the surface layers for hardening them.

Flame resistance can be secured by the deposition of diallylbenzene phosphonate or similar compounds into the surface layers of cellulose or other polymer phase or into the interior. Copolymerization of this monomer with another may be used in order to speed the reaction and to secure a cross-linking.

An unsaturated surface may be obtained by the deposition of an unsaturated polymer like polyallylacrylate into the surface layers of cellulose or other polymer. The resulting unsaturation may be used in order to secure, for example, adhesion of an ink to the cellulose or other polymer surface by an oxidative cross-linking reaction. Unsaturated polymers deposited into the surface of an object to be printed leave unsaturation available for cross-linking, with the unsaturation present in the ink vehicle. Thus a chemical bond instead of a physical one is present between the ink or other coating and the cellulose or other film to which has been deposited the unsaturated polymer.

Any one of a number of several rubber compounds or rubber elastomers can be coated onto cellulose or other film containing an unsaturated polymer deposited into the outer layers of the object in question. The elastomers in solvents can be used to secure good contact between the elastomer and the unsaturated polymer treated surface.

*Example 35a*

This example illustrates the technique of securing adhesion of rubber to a surface treated rayon tire cord by deposition of polyallylacrylate into the tire cord. It also shows that regenerated cellulose films and regenerated cellulose fibers can behave similarly as "hosts" for polymer deposition.

Several portions of 70/30/2.5Z rayon yarn which weighed 0.2 to 0.5 gram were steeped in 0.7% ferrous ammonium sulfate solution at pH 5.4 for three seconds, washed and the pure deinhibited monomer used for polyallylacrylate deposition.

The treated yarns were added to an aqueous 1% monomer solution which was also 0.003% in hydrogen peroxide. The mixture was heated under reflux for thirty minutes.

When each yarn was washed and dried, the average gain in weight was 18%; the treated yarn was characterized by its adhesion to rubber.

Unsaturated guest polymer deposited as just described may be used after deposition for obtaining cross-linking with the phase into which it has been uniformly deposited. In spite of the fact that the cross-linkage may be only between the molecules of the polymer deposited, it results in a more brittle composition than the starting material. An example of this is polyallyl methacrylate deposited into acetone-swollen cellulose acetate films and then exposed to air and ultraviolet light. Cross-linking of the unsaturated polymer within the given phase can be achieved by thermal or oxidative cross-linkage.

Furthermore, unusual decorative effect can be achieved by means of deposition of unsaturated polymers. For example, a solvent-swollen gel containing ion exchange groups can be printed with a printing roller dipped in catalyst cation or anion solution, and the unsaturated polymer then deposited by conventional means. The unsaturated polymer may itself be colored, or may be reacted subsequently with a reagent giving a color with the unsaturation. This can be achieved for example, by the above described reaction using potassium permanganate in neutral solution; in this manner one can even make a three dimensional effect in an essentially homogeneous gel phase.

After deposition of an unsaturated polymer in a pattern into a gel phase, the subsequent cross-linkage of the unsaturation gives rise to unusual surface effects, i.e., a matte appearance caused by the unequal swelling of the treated and untreated areas.

Chemical treatment of the unsaturation thus obtained is not, of course, limited to thermal or oxidative cross-linking, and chemical additions to the double bond can be used to further modify the host-guest polymer composition. Reactions with dienes, addition reactions with active hydrogen compounds like amines, ammonia, alcohols, phenols, mercaptans, hydrazine and phenyl hydrazine acids and so on will occur to those skilled in the art.

Furthermore, adhesion to other film to achieve laminates can be effected by cross-linking with the use of addition reagents or by oxidative polymerization reactions.

*Example 36*

This example illustrates the deposition of a highly water soluble polymer into cellulose film. It also discloses the use of a redox couple containing both anion and cation.

Five percent acrylamide solution was made up in water containing a cellulose film which had been steeped in a chromium potassium sulfate solution containing 0.1% chromous ion, and washed. The mixture was made up at 50° C. and then made 1% in potassium persulfate. Reaction was allowed to continue for two hours at 50° C.

When the film was washed with water and dried overnight at 110° C, it was found to have increased in weight by 10%, and the undried film was flexible and hydrophilic.

*Example 37*

This example, like Example 36, discloses the use of a redox couple containing both anion and cation.

The procedure of Example 36 was followed except that the cellulose was steeped in 0.1% manganous, instead of chromous, solution. The manganous solution was present as manganous sulfate.

The films were found to have increased in weight by 12%.

*Example 38*

This example shows that localization of polymer deposition is possible even when the monomer and polymer are both water soluble.

The procedures of Examples 36 and 37 were repeated except that the cellulose film was contacted with the respective cation solution for only five seconds before washing and placing in the aqueous monomer solution.

With the chromous ion, the cellulose increased in weight by 1.3% and with the manganous ion by 1.8%. Observation of cross sections of the films under polarized light indicated localization of the polymer deposition to the surface layers of the film.

*Example 39*

This example illustrates the deposition of a tetrafunctional monomer that is structurally capable of forming cross linkages to form a three dimensional network.

Cellulose film which had been soaked in 0.7% ferrous ammonium sulfate at 25° C. for one minute and washed, was dropped into a solution of 2% bismethyleneacrylamide in 50:50 v./v. acetone-water which was 0.03% in hydrogen peroxide. The solution was at the boil when the film was added. Polymerization was allowed to continue for thirty minutes. About seven minutes after the start of the polymer deposition, the aqueous phase became cloudy and an appreciable amount of a white jelly had formed when the polymer deposition had ended. The jelly was wiped off the cellulose film and the film extracted for several hours in hot acetone.

After drying, the film was found to have increased in weight by 5.3%. It was less flexible at a given equilibrium moisture content than cellulose control films. The Mullen strength was about 10% above that of the control films.

*Example 40*

This example indicates partial localization of deposition of a polymer.

The procedure of Example 39 was repeated except that the film was steeped for only six seconds in the ferrous iron.

In this instance, the weight increased by only 1.4%. The films when wet after drying showed a puckered surface.

Example 41

This example illustrates the making of a strong modified cellulose film that is capable of anion exchange and can serve as an anion exchange membrane.

Beta amino ethyl acrylate was made by direct esterification of acrylic acid. The monomer was used to deposit into cellulose film by a procedure similar to that employed for Example 25.

It was found that the films had increased in weight by 18%. The films could be fast dyed with dyes such as Orange 1 free acid, and acid solutions of Orange 11, F.D. and C. Red No. 3 and common wool dyes. The amino group in the cellulose was capable of acid adsorption and of ion exchange after conversion to a salt.

Example 42

The anion exchange membranes of this example have a controlled sheath location of the basic polymer guest in the cellulose film.

The procedure of Example 41 was followed except that the cellulose films soaked for only five seconds in the ferrous solution.

About 2.1% polymer was deposited. The concentration of the polymer deposition near the surface was shown by dyeing the film with F.D. and C. Red No. 3, washing, dehydrating, making cross sections and examining the cross sections under the microscope. The red color was localized near the outer one fifth of the thickness of the cellulose film.

Example 43

This example illustrates the use of the monomer salt in polymer deposition. More concentrated solutions of the monomer may be used in this manner.

Polyaminoethylacrylate was deposited into cellulose film using the procedure of Example 24.

About 14% of polymer was deposited into the film.

Example 44

This example illustrates that even when the host material is a gel, controlled limitation of the locus of polymer deposition is possible.

A 5% solution of agar agar was prepared by dissolving the pure substance in hot water. The solution was poured into a cylindrical mold and allowed to cool to a stiff gel. Disks of about 1 mm. thick were cut from the cylinder and weighed to establish the bone dry weight of the agar agar in the increment of gel.

The disks of gel were steeped for fifteen seconds in 0.1% ferrous solution as ferrous ammonium sulfate, and washed. The gel disks were then added to 400 ml. of 0.003% hydrogen peroxide containing 20 ml. of methylmethacrylate monomer. The gels which weighed about 0.7–0.9 gm. were then allowed to remain in the monomer solution at room temperature for six hours.

When they were washed and dried for several hours under vacuum at 50° C., they were found to have increased in weight by 32%. The gels were of an agar agar which contained about 0.5 milliequivalent of sulfate exchange group per gram of agar agar. When the disks were split with a microtome, it was found that polymer deposition was not present in the interior of the gels. No indication of polymerization in the aqueous phase could be seen. The polymer modified agar gels were a light greenish yellow color and were rather brittle.

Example 45

This example illustrates that when the ion exchange group attached to the host phase is a salt of a strong acid the cation exchange can occur at low pH because the hydronium ion has no special preference in exchange.

The procedure of Example 44 was repeated except that the saturation of the gel with ferrous iron was done from a solution containing 0.5% ferrous iron as ferrous ammonium sulfate and the pH was adjusted to a pH of about 2 with hydrochloric acid.

Results similar to those of Example 44 were obtained.

Example 46

This example illustrates permanent plasticization of a sponge by use of the method of this invention.

A cellulose sponge whose bone dry weight was about 18 grams was taken and steeped for five minutes in one liter of 0.1% ferrous solution at pH 5. The sponge was washed several times in deionized water by squeezing it several times in several batches of clean water. The last wash showed no test for iron.

The ferrous iron impregnated sponge was placed in a two liter container of 0.03% hydrogen peroxide and 20 ml. of n-butyl acrylate. Polymerization was allowed to proceed for ten minutes at reflux. The supernatant solution remained clear.

After drying, the sponge had increased in weight by 20%. The sponge had a light rubbery feel. The dry sponge equilibrated with air was more flexible than a similar dry sponge.

Example 47

This example and Example 48 illustrate the conversion of a cellulose sponge to an acid resistant, rubbery mass.

The procedure of Example 46 was repeated using n-butyl methacrylate.

In this instance, the sponge increased in weight by 15.4% and the air equilibrated sponge did not seem to be quite as "tacky" as the sponge above.

Example 48

The procedure of Example 46 was repeated except that n-octyl acrylate monomer was used. A time of polymerization of forty minutes was also used.

The sponge increased in weight by 40%. It was quite tacky to the touch and water had a larger than normal contact angle with the surface. The air dry sponges were more flexible than control sponges.

Example 49

This example illustrates the deposition of a polymer into solid wood.

Thin sheets of balsa wood about one mm. in thickness were steeped for one hour in 0.1% ferrous iron solution. They were washed free of uncombined iron and dropped into a 400 ml. solution of 0.03% hydrogen peroxide containing 10 ml. of methylmethacrylate and allowed to remain at room temperature for twelve hours. In the morning the sheets were washed for several hours and then dried for twelve hours at 80° C. under vacuum.

They were found to have increased in weight by an average of 86%. The sheets were covered with a smooth, seemingly nonporous layer of the polymethyl methacrylate. Stained cross section showed that the entire thickness of the wood had been impregnated with the polymer.

Example 50

This example illustrates the introduction of a high-chlorine-content polymer into wood.

The procedure of Example 49 was repeated except that the pentachlorophenol ester of acrylic acid was used. Vigorous stirring was also employed to keep the ester suspended.

After drying, the wood had increased in weight by 3.4%. It was a slightly yellowish color, probably due to the oxidized iron. This, as well as the example above, was performed on known weight of water extracted wood to avoid the error in the determination of the increase in weight due to water soluble constituents of the wood.

Example 51

This example illustrates that the ion-binding groups that bind addition-type catalysts need not extend beneath the surface layers of the host material.

Polyethylene film about three mils thick was oxidized on its surface by steeping the film for ten seconds in concentrated sulfuric acid saturated with potassium dichromate. Reaction was at room temperature.

After washing, the film was found to dye a light blue with the basic dye methylene blue which indicated the presence of at least some carboxyl or other cation binding groups on the surface or within the surface layers.

The oxidized polyethylene was steeped in 0.1% ferrous iron solution at pH 5 for thirty seconds. The excess of solution was wiped off and the treated sheet let stand overnight in 100 ml. of 0.03% hydrogen peroxide and 5 ml. of methyl methacrylate monomer (some of which still floated on the surface of the liquid).

When the equal weight increments of film were then dried under a low vacuum and weighed, they were found to have increased in weight by 3.4%. The surfaces were much more hydrophilic than before. In addition, the polyethylene was attached much less readily by such normal solvents as warm mineral oil.

*Example 52*

Polyethylene sheet was oxidized and stepped in ferrous solution as in Example 51. This time, the sheet was placed in 200 ml. of boiling 0.03% hydrogen peroxide containing 10 ml. of the methyl methacrylate monomer. Polymerization was continued for fifteen minutes.

After washing and drying under vacuum, the films were found to have increased in weight by 4.6%. The surface was wetted to some extent by water as shown by a somewhat lower contact angle and the resistance to attack by nonpolar polyethylene solvents had much increased. Grease penetrated the film much less readily than the control film.

*Example 53*

This example shows that vinyl acetate deposition into cellulose can be localized as desired to outer layers of the film.

Polyvinyl acetate was deposited into the surface layers of cellulose film by the procedure of Example 9 except that the film was steeped in the ferrous solution for only five seconds and polymerization was continued for thirty minutes.

The films increased in weight by 1.8%. The surface was less hydrophilic than that of the films of Example 9 as shown by the contact angle of a drop of water.

*Example 54*

This example illustrates the use of the ion exchange bound catalyst deposition of a polymer acid to create a cation exchange membrane of medium ion exchange capacity from cellulose film.

Cellulose film containing 0.032 milliequivalent of carboxyl per gram of dry cellulose was steeped 0.1% ferrous solution as ferrous chloride for one minute and the excess uncombined iron removed by washing.

This film was dropped into 200 ml. of 0.003% hydrogen peroxide solution containing 10 ml. of glacial methacrylic acid. The polymer deposition was allowed to continue for fifteen minutes and the contents of the refluxing solution were dropped into cold water to stop the reaction.

No turbidity arose in the aqueous phase when acetone was added to the cooled solution after the polymerization. This, plus salting out tests, showed that no appreciable polymerization took place in the aqueous phase. The equal increments of cellulose film had increased in weight by about 9.2%.

*Example 55*

This example shows localization of methacrylic acid polymer deposition.

The experiment of Example 54 was repeated except that the film was soaked in the ferrous solution for only five seconds.

The film increased in weight by only 1.4%. The polymer deposition had been localized to the surface layers of the cellulose film as was shown by dyeing the film with basic dyes and microscopically examining cross sections.

*Example 56*

This example discloses the use of a host material that contains substantial amounts of both anion and cation exchange capacity. The catalyst system was selected so that the anion exchange capacity was used. The steeping time was short enough so that the catalyst anion could diffuse into and exchange only with structural groups in the outer layers of the wool fiber.

Wool cloth weighing 0.136 gm./sq. in. which contained no dyes or weighting agents was used for deposition of polymers. The wool was hygrostated at 76% R.H. for several weeks. The moisture content was determined by drying at 60° under vacuum for several hours. In this way, it was possible to take a weight of the wool from the hygrostate and know the bone dry weight of the wool protein that one actually had.

Persulfuric acid was made as in Example 6 and the wool was steeped in stirred persulfuric acid for thirty minutes. The wool was then washed for thirty minutes with deionized water to remove persulfuric acid not chemically combined with the basic groups of the wool. The wool was then added to 400 ml. of water saturated with methyl methacrylate monomer at 80 degrees. The wool was added to the solution and 0.3 gm. of sodium bisulfite also added. Polymer deposition was allowed to continue for twenty minutes. The fabric began to stiffen in about seven minutes. The 0.4–1.5 gm. pieces of modified fabric were washed in water, methanol, and for ten minutes in boiling acetone.

After drying for several hours at 115° under vacuum, the fabric pieces were found to have increased in weight by 240% on the average.

Microscopic examination showed that a large amount of polymer was on the surface and that the scales of the wool had been covered completely. Cross sections showed that the center 30% of the volume of the fiber had little polymer deposited into it.

*Example 57*

This example shows that lower add-on can be used while still accomplishing localization or sheath deposition.

The procedure of Example 56 was followed except that only a five minute polymerization was used.

After drying, the several sets of pieces of fabric had increased in weight by an average of 23%. In this case also, the scales were almost covered and the center 50% of the volume of the wool had relatively little polymer deposited into it.

*Example 58*

This example illustrates how a single component catalyst system may be employed with the method of this invention.

Several samples of wool fabric were treated as in Example 56 except that the sodium bisulfite was not added.

The wool became yellow and stiff, although not so stiff as those samples of Example 56. The wool had gained in weight by 112%.

*Example 59*

This example indicates that surface layer deposition into wool can be accomplished with little loss of monomer.

Hygrostated wool fabric was treated with 0.8% solution of persulfuric acid at 50° for ten minutes, washed three times for ten minutes each with demineralized water at 50° C. and heated for thirty minutes at 50° C. with a solution of 1% methyl methacrylate and 0.3 gram of ferrous ammonium sulfate.

The wool fibers gained in weight by 9%. There was little polymerization in the aqueous phase. Some polymer was present on the scales of the wool, but it had penetrated only about one fifth of the distance into the wool fiber.

*Example 60*

When the procedure of Example 59 was repeated without the ferrous iron reducing agent and the polymerization time extended to one hour, the wool lost weight.

*Example 61*

Hygrostated wool was treated at room temperature with 0.8% solution of persulfuric acid for thirty minutes and washed free of excess of reagent not chemically combined, with three ten minute washes with deionized water.

The wool was added to a 400 ml. of saturated water solution of methyl methacrylate containing 0.3 gram of ferrous ammonium sulfate. The wool was allowed to remain in the solution for nineteen and one half hours at 25° C.

After removal, washing, and drying, the average of the wool samples was a gain in weight of 111%. Microscopic cross section showed that the polymer had not penerated all the way into the wool fiber. The scales of the wool surface were largely covered with polymer.

*Example 62*

Wool fabric was treated as in Example 61 except that it was steeped in the persulfuric acid for only ten minutes at room temperature.

At the end of the reaction time it had increased in weight by about 14% and cross sections showed that most of the polymer had been restricted in deposition to the outer layers of the wool fiber.

*Example 63*

This example shows that highly water-soluble as well as slightly water soluble monomers may be deposited as localized polymers into wool.

Wool was treated by the method of Example 61 except that a 5% solution of acrylamide was used as the monomer.

The wool increased in weight by 4.5%.

*Example 64*

This example indicates that an acid polymer may be deposited into a host material that is amphoteric using an anionic-type catalyst.

Wool was treated by the method of Example 61 except that a 5% solution of acrylic acid was used.

The wool increased in weight by 13% and the polyacrylic acid was limited to the outer layers of the wool fiber.

*Example 65*

This example illustrates the use of deposition to deposit an easily cross linked polymer on a localized situs.

Wool was treated by the method of Example 61 except that a 5% solution of acrylonitrile was used.

The wool increased in weight by 6.7%, and polymer deposition was restricted largely to the outer layers of the wool fiber as shown by cross sections.

*Example 66*

This example illustrates that even a uniform deposition of a moderately hydrophobic polymer into cellulose film can take up space to lower rate of water molecule diffusion.

Polymethyl methacrylate was deposited into cellulose film by the method of Example 1 for a period of 25 minutes. The film was removed and samples of the equal weight cellulose increments dried to determine the amount of polymer deposited.

The film was found to have increased in weight by 130%. This film was stiff and showed a Mullen burst strength about 60% above a control film of the same cellulose film from which it had been made.

The moisture vapor permeability of the film was determined with the Payne permeability cups and using a constant humidity cabinet with moving, saturated air at 30 degrees. The rate of moisture vapor transfer was found to be one thirty-fifth of that of a control cellulose film of the same thickness under the same conditions.

*Example 67*

This example illustrates that as the amount of catalyst bound to a paper decreases the polymer deposition rate decreases and in addition shows localization.

A number of equal weight pieces of a pure manila paper were cut as in Example 3. This paper had no weighting agent in it. Several small sheets of this paper were dipped in 0.1% ferrous iron solution at pH 5.2 for five seconds. The papers were washed free of uncombined iron and added to a solution of 400 ml. of 0.003% hydrogen peroxide and 10 ml. of methyl methacrylate monomer at the boil. The polymerization was permitted to go for ten minutes and stopped. The dried paper was found to have increased in weight by 11.3%. Examination of cross sections by the staining procedure of Example 8 showed that deposition had been largely localized to the outer layers of the cellulose fibers.

*Example 68*

The procedure of Example 67 was used except that a reaction time of fifteen minutes was used and butyl acrylate was the monomer.

The dried films of paper had increased in weight by 8.1%. The paper was somewhat tacky. Diffusion studies of Victoria Blue dye into the fiber indicated localization of deposition near the outer surfaces of the fiber.

*Example 69*

The procedure of Example 67 was followed except that a twenty minute reaction period was used and butyl methacrylate was used as the monomer.

The paper increased in weight by 9%. The paper was somewhat tacky. Methylene blue dyeing was less on the outer layers than in the center of the fiber.

*Example 70*

This example shows that some localization of polymer can be achieved using a water-soluble monomer and using a fibrous mat as the host material.

The procedure of Example 69 was used except that the monomer was acrylonitrile.

In this example, the paper increased in weight by 7.1%. It did not seem to have changed in appearance. Cross sections of the fibers showed some localization of deposition.

*Example 71*

This example illustrates that hydrophobicity can arise with low polymer add-on when such add-on is surface-localized.

The procedure of Example 67 was followed except that vinyl acetate was used as the monomer and a reaction time of one hour was used.

The paper increased in weight by 2.4%, and had become more hydrophobic than normal paper.

*Example 72*

In this example and Example 73, two additional catalyst systems were used to achieve deposition of the same polymer into cellulose film.

Cellulose film containing 0.04 milliequivalent of cation exchange capacity per gram of cellulose was steeped for one minute in a freshly prepared 0.1% chromous solution made from chromium potassium sulfate. The pH was 4.1. The film was then washed free of excess chromous ion and immersed in 400 ml. of 0.03% hydrogen peroxide and 10 ml. of methyl methacrylate at the boil under reflux. Polymer was deposited for twenty minutes.

The films were found to have increased in weight by 51%, and were a very slight yellow green color, and were similar in physical properties to the ones prepared with the ferrous iron-hydrogen peroxide reductive activation system.

Example 73

The procedure of Example 72 was used except that a 0.1% manganous solution present as manganous sulfate was used.

The films increased in weight by 14.7%. They were somewhat less hydrophilic than normal and had a purplish color.

Example 74

This example illustrates that a protein like silk may easily be used as the host material because it contains both basic and acid groupings in its molecules.

A solution of 0.4% persulfuric acid was prepared by cation exchange using ammonium persulfate. Pure silk fabric weighing 6.67 grams per square foot was procured; the fabric had been hygrostated at 76% R.H. for several weeks. The fabric was dipped in the persulfuric acid for ten minutes and the uncombined acid washed out. The silk fabric was placed in 200 ml. of an 0.3% ferrous ammonium sulfate and 10 ml. of monomer methyl methacrylate. The solution and silk were held at 75° for thirty minutes and washed.

The dry silk had increased in weight by 23.5%. Cross sections of the silk, dyed and examined under the microscope, showed that polymer deposition had been confined to the outer sixth of the diameter of the silk fiber. Normal acid dyes were used in the cross section staining.

Example 75

This example shows that a vinyl ester type of monomer may be deposited into a host.

The procedure of Example 74 was repeated except that the monomer was vinyl acetate and the reaction time was extended for two hours.

In this time, the silk had increased in weight by 18%. Cross sections dyed with acid dyes showed lighter color near the edges and thus indicated the deposition of blocking polymer in the outer layers of the silk fiber.

Example 76

This example further illustrates that a gel may be the host material. The acetic acid is added to the coagulating bath to prevent complete substitution of the carboxyl groups of the alginate by calcium.

A medium viscosity sodium alginate was made up into a 4% solution in water and films cast into 30% calcium chloride solution containing a small amount of acetic acid. The insoluble calcium alginate films were washed free of excess calcium chloride.

Weights of film corresponding to known weights of calcium alginate were steeped in 0.1% ferrous solution for one minute, and washed. The film was then placed at room temperature in an aqueous solution of 0.003% hydrogen peroxide and 10 ml. of methyl methacrylate monomer. The solution was left at room temperature for twelve hours, and the film was removed and after washing and drying was weighed.

The gels were found to have increased in weight by 135%.

Example 77

This example illustrates controlled localization of polymer deposition.

The process of Example 76 was repeated except that the gel films were steeped for only four seconds in the ferrous catalyst solution.

Upon washing and drying, the films were found to have increased in weight by 29.4%. Microscopic cross sections treated with the silver deposition method showed the deposition to be localized to the outer portions of the film.

Example 78

This example and Example 79 show deposition of polyacrylonitrile into a gel of cross-linked molecules.

The process of Example 76 was repeated except that acrylonitrile was used as monomer.

The films increased in weight by 11.4%.

Example 79

The procedure of Example 77 was repeated except that acrylonitrile was used as monomer.

The film increments increased in weight by 4.3%. The surface was somewhat puckered when the film was dried.

PRODUCTION OF ROT-RESISTANT COTTON AND RAYON

This invention is particularly applicable to the production of rot-resistant cotton and rayon. Attempts have been made in the past to improve the rot-resistance of cotton by such techniques as converting cotton cellulose into the cyano ethyl ether having a low degree of substitution; acetylation has also been used. However such procedures, while improving the weathering qualities of cotton to some extent, are expensive, time-consuming, require various kinds of special equipment and are accordingly not entirely satisfactory.

In pursuing the solution to this problem, I have made the surprising discovery that the resistance of cotton or rayon to rot can be increased by a tremendous factor and without impairing "hand," by depositing a small amount of polyacrylonitrile into the cotton or rayon through use of the method of this invention.

Example 80

A cotton Osnaberg filter cloth was washed in deionized water to which had been added about 0.05% Duponal WA, a wetting agent. It was then rinsed carefully with more deionized water, and then air dried before being put into a hygrostat held at 76% relative humidity. After one week, it was analyzed and found to contain about 5.95% moisture.

Small pieces of the fabric were suitably identified, and then steeped in 0.1% ferrous ammonium sulfate solution at a pH of 5.2 for two minutes. They were then washed in deionized water to remove the ferrous iron which had not become chemically combined.

Five of the treated pieces of fabric were then added to a solution of 5% by volume of acrylonitrile in water at 85° C. Sufficient hydrogen peroxide was added to the solution to bring the concentration thereof to 0.03% hydrogen peroxide by weight, and the solution was then refluxed for 20 minutes. It was observed that the solution did not become even slightly turbid until 15 minutes after the polymer deposition started.

After washing and drying in an oven, the fabrics were found to have increased in weight by an average of 5.41%.

Two pieces of the above treated filter cloth about 1½" by 5" (which now contained 5.4% polyacrylonitrile) were placed together with two untreated control pieces in about 2 kilograms of a slurry made of a mixture of 1 part of soil and 1 part of distilled water. The soil was taken from a vacant lot, and glass and other debris was screened from the soil before use.

The samples of treated and untreated cloth were left in the soil slurry at room temperature for thirty days, the room temperature varying between about 26° and 31° C. The container in which the soil slurry was kept was large enough to have a 500 ml. air space and was sealed to prevent evaporation of water and also to prevent contamination with microorganisms other than those originally present. After one month, the container was opened and it was found that the untreated cotton was rotted and would almost fall apart in the hands. The strength and appearance of the treated fabric, on the other hand, did not appear to be adversely affected at all.

*Example 81*

This example shows that some trivalent cations may be used in the catalyst system to avoid the residual color associated with the ferrous —$H_2O_2$ system.

The conditions of Example 80 were followed except that 0.1% chromous ion solution as potassium chromium sulfate was used for the impregnation of the fabric. The fabric showed a very slight green color after it was subject to deposition; turbidity in the aqueous phase arose after about 10 minutes of deposition.

After the fabric was washed and dried, it was found to have increased in weight by an average of 4.87% and exhibited outstanding rot resistance compared to a control sample.

*Example 82*

This example shows the approximate lower limit at which the acrylonitrile polymer-cellulose material shows rot resistance.

Twenty-four pieces of Osnaberg cotton cloth were cut to a size of about 1½" by 5". The pieces were steeped in 0.1% ferrous ammonium sulfate, washed and then dropped in a 4 liter flask containing 2 liters of 4% by volume acrylonitrile-water mixture, the mixture being at boiling temperature. Sufficient hydrogen peroxide was added to the solution to bring the concentration thereof to 0.03% by weight, and deposition of the polymer was then allowed to proceed for twenty minutes.

Representative samples were dried and found to contain an average of 2% polyacrylonitrile. The samples did not seem to have undergone a change in "hand" and were a very faint yellow in color.

The remaining pieces were air dried and on being subjected to the soil burial test previously described were found to have somewhat better resistance to rot than did the control.

*Example 83*

This example illustrates the use of a catalyst system for polyacrylonitrile deposition that leaves the cotton almost white.

Four small pieces of cotton filter cloth were steeped for two minutes in 0.1% manganous ion solution present as manganous sulfate. Excess material which was not chemically combined was washed out and the fabric immediately immersed in a 5% by volume solution of acrylonitrile and water at reflux temperature. Enough ammonium persulfate was added to correspond to the stoichiometric equivalent of the 0.03% hydrogen peroxide concentration previously used, and polymerization was continued for 20 minutes.

When the cloths were removed from the solution, washed and dried, they were found to have increased in weight by an average of 8.2% and exhibited excellent rot resistance.

The protection against rot which the aforesaid treatments offer was completely unexpected because the commercial processes for treatment of cotton for rot resistance involve cyanoethylation and acetylation of cellulose or treatment of the cotton with potent fungicides or bactericides such as are represented by copper-8-hydroxyquinolate.

*Example 84*

This example shows approximately the maximum amount of polymer that can be deposited into cotton without excessive stiffness of hand developing in the fabric.

Cotton cloth was treated by the method of Example 83 except that a 40 minute polymer deposition period was used. The cotton increased in weight by 22%. The particular cotton which was used had an ion exchange capacity of about 0.013 milliequivalent per gram. Twenty pieces varying in weight from about 0.4 to 1 gram and in various shapes were subjected to the aforesaid procedure.

A soil burial test showed complete resistance to rotting for up to two months. The control rotted after twenty days.

The amount of polyacrylonitrile necessary to produce effective resistance against rot is unexplainably much smaller than is required where treatments requiring ether formation are used.

A further advantage of the aforesaid treatment lies in the fact that the techniques used results in an introduction of the polymer into the cotton in about 20 minutes while rot proofing cotton with other processes which involve, say, etherification with acrylonitrile, require conventionally one hour or more of treatment in alkaline solutions to obtain any really significant rot-proofing effect.

A further advantage of my technique is that both catalyst and hydrogen peroxide are used in extremely low concentration and the cost of materials is thus less than the cost of those employed in conventional processes.

While this rot proofing process works quite well with unbleached cotton, the speed of polymerization could be even further increased by bleaching the cotton under conditions which introduces additional carboxyl groups into the cotton. As has been stated above, the process is also applicable for rot proofing rayon and similar materials.

A raw cotton which has been dewaxed with organic solvents and not kier boiled contains pectin material of polymeric nature so that it shows ion exchange capacity of 0.03–0.06 milliequivalent per gram of dry cotton. Deposition of polyacrylonitrile by the foregoing processes into such cotton goes much faster than with normal cotton cloth. The speed is over twice that above described.

The present treatment of cotton does not involve an appreciable decrease in strength of the cloth, and gives rise to only a slight difference, if any, in "hand."

Both ferrous and chromous ions can be used as the reducing agents in the present technique and both hydrogen peroxide and ammonium persulfate can be used as the oxidizing members. Furthermore, manganous ion may be used as one component of the redox couple when ammonium persulfate is the other member.

While the deposition of even a small amount of polyacrylonitrile on and in the cotton or rayon has a beneficial effect in imparting rot resistance, it has been found that an optimum range of polyacrylonitrile based on the weight of the cloth treated is about 2% to 30% (as measured by the increase in weight of cotton due to polymer deposition). Larger amounts may of course be used, but generally speaking, they result in a harsher texture, and a poorer "hand" than when the smaller amounts are used.

The aforesaid rot proofing technique likewise includes the use of, in lieu of acrylonitrile, copolymers of acrylonitrile with styrene or alkyl acrylates.

*Example 85*

This example shows the deposition of acrylonitrile copolymers into cotton and the rot resistance of the resulting product.

Three ounce cotton muslin was steeped in 0.2% chromous chloride solution at pH 3.7 for five minutes and washed in deionized water three times. The five grams of muslin was dropped into a mixture of 350 ml. of water, 20 ml. of methylmethacrylate, and 20 ml. of acrylonitrile at 72° C. Enough hydrogen peroxide was added to the solution to make its concentration 0.02% and the mixture was refluxed for one hour. After about 35 minutes the aqueous phase became somewhat cloudy. The fabric was extracted for ten hours at reflux with benzene and 18 hours with methyl ethyl ketone.

When dried, the cotton contained 28% copolymer.

The fabric contained 1.25% nitrogen and the copolymer thus contained about 12% polyacrylonitrile.

Example 86

A procedure similar to Example 85 was used in this example to deposit styrene-acrylonitrile copolymer into cotton muslin. In this case 20.3% copolymer was deposited and this copolymer contained 24% acrylonitrile monomer units.

The two tables below give the rot resistance of the two above copolymer-modified and other copolymer-modified cottons and also their water float times as the yarns.

The soil burial bed would destroy unmodified cotton in 5–6 days.

TABLE 5.—PERCENTAGE OF STRENGTH LOSS [1] OF COPOLYMER-MODIFIED COTTON MUSLIN AFTER 21 DAYS OF SOIL BURIAL AT 25°–30° C.

| Sample | Copolymer, percent | Copolymer composition,[2] percent | Strength loss, percent warp-fill average |
|---|---|---|---|
| 1 | 2.44 | 14 AN:86 MM | Essentially 100. |
| 2 | 28.0 | 14 AN:86 MM | 28. |
| 3 | 20.3 | 23 AN:77 ST | 60. |
| 4 | 18.6 | 21 AN:79 ST | 68. |
| 5 | 1.3 | 21 AN:79 ST | Essentially 100. |
| 6 | 4.3 | 11 AN:89 ST | 90. |
| 7 | 10.5 | Polystyrene | Completely disintegrated (7 to 8 days). |

[1] ⅜ inch strips were used at one inch length.
[2] AN=acrylonitrile; MM=methylmethacrylate; ST=styrene.

TABLE 6.—DISTILLED WATER FLOTATION TIMES FOR COPOLYMER-MODIFIED COTTON FIBERS

| Sample | Composition, percent | Flotation times |
|---|---|---|
| 1 | 2.4 (14 AN:86 MM) | 2 minutes. |
| 2 | 28.0 (14 AN:86 MM) | 12 minutes. |
| 3 | 20.3 (24 AN:76 ST) | More than 3 weeks. |
| 4 | 18.6 (21 AN:79 ST) | Do. |
| 5 | 1.3 (21 AN:79 ST) | 30 seconds. |
| 6 | 4.3 (11 AN:89 ST) | 4 minutes. |
| 7 | 10.5 polystyrene | More than 3 weeks. |

FORMATION OF ANCHOR COATINGS

The principles of this invention may also be used in the production of articles having other new and useful properties, by the technique of applying a surface layer deposition of a polymer thereby changing the nature of the surface thereof to adhere to other types of coatings such as for example the saran type coatings. Polymers which can be deposited in this manner, and preferably in high concentrations into the surface layers are illustrated by polyethyl acrylate, polymethyl methacrylate, polyethyl methacrylate, polyacrylates whose alkyl group contains up to 6 carbon atoms and polymethacrylates with the alkyl group containing up to 6 carbon atoms.

The concept involved here, as can be seen, is for the use of hydrophobic polymers for achieving adhesion of hydrophobic coatings thereto. In other words, the polymer to be treated can be provided by the method of this invention with an "anchor coating."

The useable concentrations of deposited polymers are represented by a very wide range as for example from 2 to 300% or more. Localized deposition into the surface or outer layers of the cellulose gel may be in the range from about 0.1% to 100% or more, based on the total weight of the cellulosic film.

DEPOSITION INTO FIBROUS CASINGS

Example 87

This example illustrates the deposition of polymers into a composite casing film wherein polymer deposition was desired in the outer layers of the regenerated cellulose coating the paper. Some paper fibers were noted to extend through the regenerated cellulose layer, indicating that some catalyst was bound on paper on the inside surface of the casing tube even though the inside surface was not in direct contact with the solution of the cations used.

Fibrous casing film composed of cellulose fibers impregnated with regenerated cellulose was steeped for 0.5 seconds in 0.1% chromous ion aqueous solution present as chromous potassium sulfate. It was then placed in a reaction medium consisting of 6 liters of 0.02% hydrogen peroxide containing 100 ml. of pure ethylacrylate, for 15 minutes and removed therefrom. There resulted a deposition of 4.7% polyethyl acrylate into the surface layers of the film. The resulting treated film was then wetted with a dope having the following composition:

375 ml. of tetrahydro furane
125 ml. of acetone
32 grams of Dow Saran F-120, 1000 cps. grade powder (this being a copolymer of about 85% vinylidene chloride and 15% acrylonitrile)

The treated film was wetted in this dope for about 20 seconds, drained and the coated films allowed to air dry at room temperature for about 20 minutes. The films were then further dried in the open air under infrared bulbs for 30 minutes at about 80 C., and then at room temperature over night.

Excellent adhesion of the Saran F-120 to the modified fibrous film was achieved, and in particular adhesion after a contact with boiling water for three hours was excellent.

The above experiment was repeated using film to which had been applied 10.5% polyethyl acrylate partially localized to the outer portion of the regenerated cellulose of the film.

Fibrous film to which was applied from 12 to 38% of polymethyl methacrylate, partially localized to the surface of the film showed excellent hydrophobicity, and excellent adhesion to Saran F-120 coating.

The above experiment was repeated using butyl acrylate as the monomer, and 0.1% ferrous solution (as ferrous ammonium sulfate) instead of chromous potassium sulfate. An excellent adhesion of Saran to the polybutylacrylate coated fibrous film was obtained.

Example 87a

This example shows that where the host material has a microscopically observable non-uniform distribution of ion binding groups and the host material is completely impregnated with catalyst, both the catalyst binding and the polymer deposition follow the distribution of ion exchange groupings.

A commercial fibrous casing was freed of glycerol by washing in soft water and was then cut into a number of pieces of four inch length, desulfured in 1% sodium sulfide at 80° C. for 15 minutes and washed to neutrality.

The films were steeped for two minutes in 0.1% ferrous ion solution, washed to remove free iron and dropped into two liters of boiling 1% methylmethacrylate solution. Deposition was allowed to take place for five minutes after sufficient hydrogen peroxide had been added to the solution to bring the concentration thereof to 0.003% by weight. Samples of the films were removed, washed, dried and weighed. They were found to have increased in weight by 15.3%.

The deposited polymer was converted to the acid hydrazide as previously described and then the modified casing was immersed in 0.02 normal potassium permanganate at 25° C. for ten minutes and then washed in six separate washes of distilled water to remove the excess reagent.

When cross sections of the film were made, the orange-brown color due to manganese dioxide from the polymer hydrazide and permanganate was about three times as dark in the paper as in the regenerated cellulose layer. A control casing without polymer but containing ion exchange bound iron when steeped in permanganate was only slightly discolored when visually observed and when microscopically observed at the same section thickness as the polymer modified film showed the same distribution of staining but at about one-fifth the color intensity.

*Example 87b*

This example shows low color catalyst systems.

A fibrous casing which had been freed of sulfur and glycerol was steeped in 0.1% chromous ion for two minutes, the chromous ion being present as chromium potassium sulfate.

The film was washed in deionized water to remove the catalyst not chemically combined and a number of pieces placed in 500 ml. of boiling water containing 15 ml. of methylmethacrylate monomer. Sufficient hydrogen peroxide was added to the solution to bring the concentration thereof to 0.003% by weight and polymer deposition was allowed to proceed for six minutes. The films were removed and washed free of excess monomer for two hours in hot tap water.

These films were found to be almost colorless, having a very faint green cast, and had increased in weight by 11.3%.

*Example 87c*

Five sixteen-inch pieces of fibrous casing which had been freed of glycerol were steeped in 0.1% of ferrous ion solution (pH 5.4) for five minutes.

The excess uncombined catalyst was removed by washing and the films were then dropped into a boiling solution of 3 liters of water and 75 ml. of pure n-butylacrylate monomer. Sufficient hydrogen peroxide was added to the solution to make the concentration thereof 0.003% by weight, and polymer deposition was allowed to continue for one hour. At the end of this time the film were washed for two hours in hot tap water and plasticized in 14% glycerol at 60° C. for twenty minutes.

The film increased in weight by about 20%.

*Example 87d*

This example illustrates the production of essentially colorless fibrous film containing polyethylacrylate deposited therein, and obtained by polymerization of the ethylacrylate into the fibrous casing using chromous ion-hydrogen peroxide reductive activation initiator system.

A commercial ethylacrylate monomer was freed of inhibitor by four extractions with one-fifth the volume of 5% sodium hydroxide solution saturated with sodium chloride. The residual alkalinity was removed by two extractions with saturated sodium bicarbonate solution. The resulting monomer was clear and colorless, and was immediately stored in a refrigerator.

Commercial fibrous cellulose casing was freed of glycerol and the free-sulfur content of the film was reduced by extraction with approximately 1% sodium sulfide solution for twenty minutes at 75° C. Alkalinity was removed by washing first with soft water, then with deionized water for the last few washes.

A six foot length of casing and an accurately measured four inch piece of casing were soaked in 0.1% chromous ion solution present as chromous potassium sulfate for two seconds. The films were wiped by passage between glass wiping rods as they left the bath. The casing was not rinsed.

Four liters of water was heated to boiling and 50 ml. of ethylacrylate monomer was added. The casing treated in the chromous solution was added, and sufficient hydrogen peroxide was introduced into the solution to bring the concentration thereof to 0.007% by weight. Polymerization was allowed to take place for thirty minutes under reflux, after which the casing was removed and the material washed for three hours in hot water to remove excess monomer. The four inch piece was washed similarly and was dried for three hours at 110° C. This was done as a measure of the amount of polymer deposited into the six foot piece.

The small piece increased by 20.1% in weight; the wet film was flexible as was the plasticized film. The film was dried in a Hurricane oven for seven minutes at 78° C. after plasticizing in 14% glycerol at 60° C. for twenty minutes.

*Example 87e*

The conditions of Example 87d were followed except that a three second immersion time was allowed in catalyst solution.

The four inch pilot film increased in weight by about 46%.

*Example 87f*

The conditions of Example 87d were followed except that the film was washed in deionized water after immersion in the catalyst solution and the polymer deposition was continued for one hour.

The pilot film increased in weight by about 50%. In this example and in the other examples involving the use of the chromous ion-hydrogen peroxide system, very little polymerization occurred in the aqueous phase so that little monomer waste occurred. In the instances where the film was not washed after immersion in the catalyst solution, the aqueous phase became slightly cloudy after about twenty minutes, but the cloudiness increased very little in intensity in the ensuing ten minutes. In the case of the washed film in this experiment the solution did not become turbid for thirty minutes and only faintly so even then.

LOCALIZED DEPOSITION OF ACRYLONITRILE INTO COTTON AND RAYON

The following examples will serve to illustrate the localized deposition of acrylonitrile into rayon and cotton in accordance with the present invention:

*Example 88*

This example illustrates the controlled polyacrylonitrile deposition into only the outer portions of the fibers of a rayon with large diameter fibers.

Rayon continuous yarn, which contained no treating agents and had an ion exchange capacity of about 0.026 milliequivalent per gram was pressed flat so that all the filaments were visible and then wound on a rotating drum which was partially immersed in a ferrous ammonium sulfate solution containing 0.1% ferrous ammonium sulfate at pH 5.2. The drum was rotated at such speed that the yarn was exposed to the catalyst solution for about 0.2 second and was washed immediately after removal from the solution.

The treated fiber was dropped into a solution of 5% acrylonitrile in water at the boil. The solution was made 0.03% in hydrogen peroxide and the mixture refluxed for ten minutes.

After the yarn was dried, it was found to have increased in weight by 2%. Its hand did not seem to have been changed appreciably.

The deposition made above was made with a 50:1 solution to yarn ratio.

When the fiber was dyed with an acid dye using the reduced copper technique, it was found that the deposition of the polymer had been limited to the outer third of the "radius" of the fiber.

*Example 89*

The procedure of Example 88 was repeated except that 0.1% chromous ion salt present as potassium chromium sulfate was used as catalyst.

In this case, only a 1.1% increase in weight was noted and the dyed section showing the location of the deposited polymer was limited to the outer one-fourth of the "radius" of the fiber or filament. No polymerization was noted in the aqueous phase in this and the above experiment.

Example 90

The procedure of Example 88 was repeated except that manganous ion present as manganous sulfate was used as the cation bound to the cellulose and ammonium persulfate in an amount equivalent to the hydrogen peroxide previously used was the other member of the redox team.

In this case, the yarn increased in weight by 3.1% and the polymer was localized to the outer one-third of the "radius" of the fiber.

The yarn from the three examples immediately above when buried in soil showed greater resistance to rot than the untreated regenerated cellulose yarn from which the modified samples had been made.

Example 91

This example shows that harshness in hand can arise at lower add-on of polyacrylonitrile when deposition is surface localized than when the deposition is uniform.

The procedure of Example 88 was repeated except that a polymer deposition period of thirty minutes was used. In this instance, the yarn increased in weight by 9.3%, showed some harshness to the touch, had the polymer deposition limited to the outer third of the filament, and showed outstanding resistance to rotting in moist soil.

The tensile strength, relative to the untreated fiber, was not affected by one month burial, while that of the control sample was greatly reduced.

Example 92

This example and Example 93 illustrate higher add-on of polymer that is still localized.

The procedure of Example 89 was repeated except that a period of deposition of thirty minutes was used.

About 7% increase in weight was noted with the polymer deposition largely restricted to the outer one-fourth of the fiber. The fibers were resistant to rot for one month in moist warm soil.

Example 93

Rayon yarn was treated by the process of Example 90 but the time was extended to thirty minutes.

In this instance the yarn gained in weight by 13% with the polymer largely restricted to the outer half of the "radius" of the fibers. The fiber was outstandingly resistant to rotting in moist, warm soil.

Example 94

This example covers the deposition in almost the total volume of the regenerated cellulose fiber.

An experiment similar to that in Example 88 was performed except that the immersion time of the yarn in the catalyst solution was increased to 0.3 second and the deposition time extended to thirty minutes.

In this instance, the yarn increased in weight by 24% with the deposition limited to the outer two-thirds of the volume of the fiber and the concentration highest near the surface of the fiber. This fiber, when buried in moist, warm soil resisted two months exposure with no loss in strength.

Example 95

This example shows that a raw cotton fiber yarn is wet slowly enough by the dilute cation solution so that restriction of the extent of cation diffusion into each fiber is possible.

A raw cotton yarn when subjected to the conditions of Examples 88, 89 and 90 showed increases in weight of 1.7%, 1%, and 2.3% respectively. The deposition of the polymer was confined to the outer half of the flat thickness of the cotton fiber. The treated yarn endured six weeks soil burial before loss of strength started. A control untreated sample began to lose strength in two to three weeks.

Example 96

Procedures analogous to Examples 91, 92 and 93 applied to the cotton yarn above gave rise to deposition of 7.1%, 5.6% and 11%, respectively. The polymer was localized to the outer half of the cross-sectional area of the cotton fiber and the resistance to rot compared to untreated cotton was outstanding.

Example 97

This example illustrates one method of making cotton hydrophobic.

Cotton yarn was immersed in 0.1% manganous ion salt present as manganous sulfate for 0.2 second using the immersion technique of Example 88. The treated fibers were placed in water containing 5 ml. of vinyl acetate monomer per 100 ml. of solution at the boil. The solution was saturated and had some excess monomer. The solution was made to 0.21% in ammonium persulfate and polymer deposition continued for thirty minutes.

The yarn had increased in weight by 12% with the deposition restricted to the outer one-third of the volume of the fiber.

ANCHORING OF POLYMERIZATION CATALYSTS BY USE OF STRONG ACID OR BASE ION EXCHANGE

Strong acid or base ion exchangers into which a guest polymer has been deposited are another embodiment in accordance with my invention. Such ion exchangers can be used for controlling the accessibility of ions of varying sizes to the exchange groups, and thus permitting separation of like-charged ions on the basis of size.

Example 98

This example and Example 99 show use of a strong base group for binding a catalyst. They also show a general method of changing the "pore size" of an ion exchange resin substance. The resin may be shaped as bead, film, fabric, etc.

A sample of chemically pure Amberlite IRA–400 anion exchange resin (a strong base anion exchanger) was regenerated with 4% sodium hydroxide, then washed to neutrality with deionized water and dried to constant weight under vacuum at 80° C.

Increments of the dry anion exchange resin were weighed out and steeped for 2 minutes in 1% ammonium persulfate in water at 25° C. The increments were thoroughly washed on a fritted glass filter to remove the persulfate which was not chemically combined with the tetraalkyl-ammonium type strong base group in the resin structure.

Each increment of resin was placed in 100 ml. of a solution of 1% butylacrylate monomer at 52° C. Enough cation was then added so that the solution was 0.01% with respect to the cation. The solution was then held at 50° C. for thirty minutes; at the end of this time the resin was poured from the beakers to a fritted glass filter and washed with water and acetone. The resin modified by deposition of polymer was dried at 110° C. to constant weight. The salts whose cations were used as reducing agents in this reductive activation polymer deposition were as follows:

Manganous as manganous sulfate monohydrate,
Ferrous as ferrous ammonium sulfate hexahydrate,
Chromous as potassium chromium sulfate.

The average increases in weight noted for the various systems of resins plus polymer were as follows:

| Initiator system: | Increase in weight, percent |
|---|---|
| Persulfate-ferrous ion | 18.6 |
| Persulfate-manganous ion | 17.1 |
| Persulfate-chromous ion | 16.5 |

Example 99

The work described in this example, in which nuclear substituted sulfonic acid cation exchange groups were employed, relates to the anchoring of the catalyst by strong acid anion exchange.

The work was done in a manner similar to that described in Example 98 except that the reducing cation was bound to the resin phase and the oxidation agent of the redox system was in the phase surrounding the ion exchange resin.

Amberlite IR-120 cation exchange resin was regenerated with 4% hydrochloric acid, then washed to neutrality with deionized water and dried to constant weight under vacuum at 80° C. Two samples of the resulting resin were steeped in 0.01% ferrous and in 0.1% manganous ion solutions, respectively, present as the sulfates. The resins were washed on a fritted glass filter to remove the uncombined cation and then placed in the 1% monomer solution in water at 50° C. Sufficient hydrogen peroxide was added to the solution to bring the concentration thereof to 0.03% by weight, and polymer deposition was allowed to continue for 30 minutes at 50° C. At the end of this time the resin was filtered from the beaker with a fritted glass tared crucible and dried to constant weight after washing with water and acetone.

The increases in weight were, respectively, 8.5% for the ferrous ion-hydrogen peroxide system and 2.2% for the manganous ion-hydrogen peroxide system.

The importance of the foregoing examples is more readily apparent when it is realized that strong acid and strong base groups are present in a number of natural and synthetic products which are capable of modification according to my invention. For example, with respect to the strong acid group, it may be pointed out that sulfonic acid groups are present in lignin sulfonic acids, sulfate esters in various polysaccharides, and phosphate groups in the phosphoprotein present in such common materials as casein, egg yolk and milk.

Examples of naturally occurring materials which contain strong base groups are proteins of sperm which contain reasonably strong guanidiano-type groups; also any natural or other protein which contain appreciable amounts of Arginine would have a strong basic group. Other strong basic groups are the epsilon-ammonium groups of lysine and the alpha-ammonium group of cystine. Furthermore, there are synthetic polymers and copolymers existing which contain the guanido group as part of the structure.

The use of a group like the sulfonic or phosphoric acid group attached to a polymeric material is of importance because it permits the anchoring by ion exchange of many cations in acid solution. An example of the utility of such is the anchoring of so strong a reducing agent as the titanous ion, this ion being otherwise rapidly hydrolyzable in solution.

A strong base group permits anchoring a catalyst anion to a polymeric material containing such group even in alkaline solution. This is useful in connection with certain type anions which decompose in acid solution or are oxidized. Examples of reducing anions attachable to a polymeric material in basic medium are sulfide, sulfite, thiosulfate, the anion of hydroquinone, trithio-carbonate and the like.

Oxidizing anions are hypochlorite, hypobromite, peroxy and the like.

POLYMERIC HOST OR STARTING MATERIALS WHICH MAY BE USED WITH THE METHOD OF THIS INVENTION

Among the polymer materials which can be treated in accordance with this invention, so long as they possess ion exchange capacity, are the following:

Cellulose in pure form and combined with impurities, such as cotton, cotton linters, wool, wood, wood fibers, wood pulp, wood powder, wood flour, ramie, hemp, silk, sisal, linen, jute, cocoanut shell flour, cottonseed hulls, walnut shell flour, and the like; as well as hemicelluloses, brown algae, alginic acids, kenaf, bagasse, new and used paper and paper products, bacterial cellulose, peat, lignite, tunicin, and the like; various forms of regenerated cellulose; and asbestos, gelatin, carbon black having carboxyl or other ion exchange groups, and the like. Peanut shells, straw, bamboo fibers, and other materials may also be used.

Others are lichenin, lignin and lignocelluloses, and derivatives thereof in which the ion exchange capacity has not been destroyed.

Additional materials are represented by cellulose derivatives in which the ion exchange capacity is not removed. These include inorganic esters like nitrocellulose, cellulose sulfate, phosphate, and the like. Organic esters like the acetate, formate, acetate butyrate, acetate propionate, and other fatty acid esters may be used. Unsaturated, halogenated, aromatic and other types of esters may also be used. These include the cellulose crotonate, methacrylate-acetate, and the like, as well as hydroxy, keto, and amino esters. Cellulose benzoate, phenylacetyl, and the like may also be used.

Other polymeric starting materials useful with the method of this invention are condensation polymers which contain an ion exchange group or which can be made to contain one by hydrolysis or saponification and include nylons, polyesters, phenol-aldehyde, melamine-aldehyde, and urea-aldehyde and the like, and other condensation polymers containing ion exchange groups.

Also included are addition type polymers which contain ion exchange groups including sulfonated polystyrenes, vinyl, acryl, methacryl, and allyl ethers, esters, nitriles, amides, acids, acetals, alcohols, alkyl amines, sulfide sulfone, sulfonates, halides, lactams, lactones, carbamates, imides, ketones, mercaptans, and the like. Copolymers of monomers containing ion exchange groups with those which do not may also be employed.

Examples of casing materials which may be used in the process of the invention include regenerated cellulose from the cuprammonium and viscose processes as well as the nitrate, acetate and other processes; alginates, including divalent metal alginates, esters, partial esters, metal salt-ester combinations and other derivatives which do not use up all the carboxyl groups; natural animal casings, including specifically sheep gut casing, beef, hog, and other animal casings, fibrous casings; regenerated protein casings, including "Naturin," "Brechtin," "Cutecin" and the like; low methoxy pectin in which some ion exchange groups are available; parchment or other paper casings cemented at the edges; casein and chemically modified insolubilized casein; polyester films in which not all the acid groups have been esterified; amylose casings; and addition type polymers or copolymers containing acid or basic groups which have been previously classified.

Insofar as the polymer coated cellulose films are concerned the present invention is by no means limited to cellulose films coated with Saran F-120 and F-242. Thus, cellulose films containing the polymers listed in the next sentence either throughout the film or surface-layer localized and deposited so that the contact angle of the water five seconds after placement is at least 30° will improve adhesion to several important bases. Among such polymers are styrene, vinylacetate, p-chlorostyrene, 2,5-dichlorostyrene, methylmethacrylate, ethylacrylate, butylacrylate, butylmethacrylate, octylacrylate, allylacrylate, ethylallylacrylate, allylmethacrylate and vinylmethacrylate. Such modified cellulose films will adhere well to coatings whose base is polyethylene as well as such other well known materials as Saran F-120, Saran F-242, Pliofilm, Parlon, cellulose nitrate, cellulose acetate, ethyl cellulose, Vinyon N, as well as Bakelite vinyl chloride-acetate resins such as Vinylite VYHH-1, VYDR, VACH and VMCH.

Cellulose film containing deposited polymers of acrylonitrile, acrylamide, methylene bis acrylamide, and dimethyl aminoethyl acrylate in concentrations where the water contact angle is below 30° shows particularly good adhesion to the foregoing, excepting possibly the polyethylene and nitrocellulose base coatings.

Other materials containing ion exchange groups which may be processed in accordance with the method of this invention are illustrated by the following:

Protein and proteinaceous materials which may be used in the process of my invention include such materials as wool, silk, animal meat casing, skin, leather, gelatin, zein, casein, egg albumin, feathers, peanut protein, regenerated protein, animal hairs, soya, fish protein, and the like.

Protein derivatives may include, for example, acetylated, alkylated, reduced, esterified, cross-linked materials in which some ion exchange groups are left and formylated, chlorinated salts, isocyanate derivatives and the like.

Starch and starch derivatives (i.e., amylaceous materials) useful with the method of this invention include potato and corn-starch, and like materials, starch derivatives similar to those of the cellulose and particularly those derivatives which can act as ion exchange groups in addition to the normal exchange.

Silicone polymers which contain groups capable of ion exchange may be used with the method of this invention.

Rubbers, both synthetic and natural, when they contain groups capable of ion exchange, are also useful with this method. These include, for example, butadiene copolymers with acid or basic monomers, chloroprene, copolymers similarly, partially saponified ester rubbers, urethanes, and the like.

TREATMENT OF WOOD AND COMPONENTS THEREOF BY METHOD OF THIS INVENTION

Wood fibers and components of wood may be used as the polymeric host or starting material in the method of this invention, so long as they possess ion exchange capacity.

The components of which wood is commonly made up include cellulose, lignins, hemicelluloses, xylans, mannans, and resins. The method of this invention may be used with any of these or other components of wood that have ion exchange capacity. The material treated may take any of several forms. The material may be, for example, in the form of pieces of solid wood, or may be wood powder or wood fibers. Wood fibers used with the method may be in the form of mechanical pulp, which has been subjected to no chemical purification step. They may also be in the form of chemical pulp, including sulfate pulp, sulfite pulp, soda pulp, groundwood, peroxide pulp, sodium chlorite pulp, chlorine dioxide pulp, and pulp comprised of cellulose fibers from which substantially all the lignin has been removed.

Whatever type fibers are employed as the starting material, the fibers may be either in slurry or web form. The method of this invention is also useful with webs or sheets formed of fibers derived from wood between which hydration bonds exist, such as, for example, various types of paper and paper products.

Use of solid wood as the starting material may, of course, present special problems of processing. As is well known, the difficulty of uniform impregnation of a wood chip or other wooden article varies with various wood species and with whether the wood is summer wood or spring wood. Thus, well known techniques of achieving uniform impregnation of any such materials may be employed with the various steps of the method of this invention when necessary.

The method of this invention may be applied to a blend of wood fibers and other cellulosic fibers such as, for example, sisal, cotton, bagasse, hemp, bamboo, straw, etc. Or, if desired, one or more of these various types of fibers may be first treated by the method of the invention and then combined with other treated or untreated fibers of any type, whether wood fibers or not, before being formed into the final article for which the final mixture of fibers is intended.

The method of this invention may also be used to modify wood fibers or other starting material by the deposition of a given polymer in one treatment, followed by deposition of a second polymer thereafter.

The wood pulp may if desired be impregnated with a material such as benzoic acid, which is capable of binding ions and this material used to assist in binding the catalyst within the wood fiber.

Depending upon the type of starting material, the monomer used for polymerization, the temperature and time period for the process, the polymerization catalyst used, and other things, the polymer-modified wood fibers or other material resulting from use of this method display many chemical and physical characteristics which are different from those of the corresponding untreated material.

Generally speaking, the treated fibers or other material display markedly reduced solubility in ordinary cellulose solvents, increased rot resistance, increased acid resistance and a reduced rate of moisture regain. In contrast to the last mentioned result, it is interesting to note that deposition of certain polymers produces an opposite result, making the treated fibers or other material more hydrophilic instead of more hydrophobic.

Under some conditions, the method of this invention makes the treated material flame retardant. Variations in the hand and extensibility of sheets formed of fibers treated by the method of this invention may also be observed.

Some of the treated wood fibers resulting from use of this invention are thermally moldable. Such fibers may, if desired, be ground or otherwise reduced in particle size to produce a molding powder.

Many of the polymer-modified wood pulps resulting from the method of this invention will be suitable for use as improved reinforcing agents in plastics, tile, nonwoven textiles, wall boards, specialty papers, etc. The slower moisture regain of many of the treated fibers makes them less sensitive to transient changes in relative humidity than unmodified wood fiber. In many cases the resistance to flame, acid attack, and microbiological attack or rot will suggest other applications in batts, insulation, shock absorbers, etc.

Examples 100 through 138 below illustrate the use of the method of this invention with wood fibers and components of wood:

Example 100

This example illustrates that a high add-on of polymer interiorly deposited into wood fibers is possible.

The wood fiber starting material in this example was a pre-hydrolyzed sulfate chemical dissolving pulp of high alpha cellulose content. It was used as sheets of known moisture content cut into small pieces.

2.96 grams of dry cellulose wood fibers were steeped with gentle stirring for one hour in 250 parts of a one percent aqueous solution of ferrous ammonium sulfate containing 0.01 percent sodium lauryl sulfate wetting agent. The steeping was performed at 25° C. and at pH 5.3. The ferrous iron not combined with the ion exchange groups of the wood pulp fibers was washed out by two 20-minute washes with 200 parts of distilled water.

The wet wood pulp was placed in 300 parts of de-aerated distilled water and 15 parts of inhibitor-free methyl methacrylate monomer was added and shaken with the water. Air was displaced by nitrogen from above the monomer solution and enough hydrogen peroxide was added to the monomer solution to make its concentration in the solution 0.025% by weight. The pulp was left in the monomer solution at 25° C. for 18 hours with occasional shaking. At the end of this time a slight turbidity was observed in the aqueous solution. The pulp was removed from the slurry by filtration, washed with methanol and water and dried to constant weight under vacuum at 95° C.

Microscopic examination disclosed very little latex coating of the fibers. They now weighed 5.69 grams and contained about 48 percent interior deposited poly methyl methacrylate. The dried pulp sheets were somewhat hydrophobic, with a water drop remaining on the surface of the sheet for over 180 minutes. The dried pulp sheets were a very light tan color from the bound iron catalyst residue. The polymer-modified wood pulp was not soluble in cellulose solvents like cuprammonium hydroxide, cupriethylene diamine or the new ferric tartrate complex solution of Jayme, G. and Bergmann, W., Das Papier II, 280–7 (1957).

The moisture regain of the poly methyl metharcrylate-modified wood pulp was about the same as that of the initial wood pulp expressed on the basis of the cellulose content at 65% relative humidity and 70° F.

The rate at which moisture was taken up by the oven-dry modified wood pulp, whether or not in the presence of a wetting agent, was lower than that of unmodified wood pulp.

*Example 101*

This example shows the deposition of a polymer that can easily cross-link and that imparts rot-resistance to the cellulose fiber into which it is deposited.

The method of Example 100 was followed in this example, except that 15 grams of acrylonitrile monomer was used.

2.95 grams of dry wood pulp gave 4.40 grams of polyacrylonitrile-modified wood pulp. In this case no turbidity at all was noted in the monomer solution after interior deposition into the wood fiber.

Microscopic examination showed no evidence of appreciable polymer coating of the wood fibers. The resulting sheets were not so hydrophobic as were sheets of poly methyl methacrylate-cellulose pulp, and a water drop remained five seconds. The polymer-modified wood pulp was insoluble and only slightly swollen in the cellulose solvents. It was furthermore highly resistant to microbiological attack in soil burial tests compared to the initial wood pulp.

*Example 102*

This example shows deposition of a water-soluble polymer that can easily be cross-linked by chemical transformation.

The method of Example 100 was followed in this example, except that 15 grams of acrylamide monomer was used.

In this case also no turbidity was noted when the aqueous monomer solution was poured into 50 parts of methanol after the polymer deposition was finished. When 4.00 parts of cellulose pulp was used, 5.53 parts of poly acrylamide-modified wood pulp was obtained.

The pulp removed from the monomer solution was washed in hot water for several hours to remove any polymer coating. It was then washed in methanol and dried.

The resulting polymer-modified wood pulp was not hydrophobic. It was only slightly swollen in cellulose solvents and showed excellent rot resistance in a soil burial test.

*Example 103*

The method of Example 100 was followed in this example, except that 4-vinyl pyridine was used as the monomer.

About 5 percent polymer was interior-deposited. When the polymer-modified cellulose pulp was placed in the iron-tartrate cellulose solvent it swelled to six times the original volume but did not dissolve in two days at 5° C. The pulp containing the basic polymer could be dyed with acid dyes and could take part in anion exchange processes in its chloride salt form with thiosulfate, sulfate, hydroxyl, and ferricyanide ions and the like.

*Example 104*

This example shows that copolymers may be deposited into wood pulp so that more than one purpose can be accomplished with the same polymer.

The method of Example 100 was followed in this example, except that a mixture of 7.5 grams of methyl methacryllate and 7.5 grams of acrylonitrile was used.

When 1.88 grams of cellulose pulp were used, 3.57 grams of copolymer-modified wood pulp was obtained. On the basis of nitrogen analyses the deposited copolymer contained about 10% acrylonitrile and 90% methyl methacrylate monomer units in the chain. The polymer-modified pulp was insoluble in cellulose solvents and was more resistant to microbiological attack in soil burial than was a quantity of untreated control pulp. The pulp sheet was somewhat hydrophilic in that a drop of water wet it in 30 seconds.

*Example 105*

This example shows deposition of a polymer that can plasticize cellulose even when the cellulose is dry.

The method of Example 100 was followed in this example, except that 15 grams of ethyl acrylate was used and deionized tap water was used instead of distilled water.

When 3.27 grams of cellulose pulp fibers were used, 3.73 grams of interior deposited cellulose-polymer material was obtained. This material was hydrophobic in that a water drop required an hour to wet into a piece of the pulp sheet. The polymer-modified pulp was swollen slightly but was not dissolved in two days by cellulose solvents. It was noted that the slightly tan-colored pulp exhibited a plasticer action when oven-dry, as compared with the unmodified pulp.

*Example 106*

This example shows that polystyrene can be one of the more effective agents to impart water repellency to the fibers. It also shows that the solubility of cellulose can be radically changed at small polymer add-on.

The method of Example 100 was followed in this example, except that styrene was used as the monomer.

When 8.31 parts of cellulose were used, 8.71 parts of polystyrene-modified cellulose were obtained. Even with the 4.6% polystyrene deposited, the pulp sheets were hydrophobic and a drop of water required several hours to sink into the pulp sheet. The wood fibers were swollen but were not dissolved by the iron-tartrate complex.

*Example 107*

This example shows deposition into wood pulp of a polymer of high chlorine content to produce flame retardency.

3.22 parts of wood pulp of the type used in Example 100 were steeped in 1.0% aqueous ferrous chloride for one hour to ion exchange the ferrous iron with the carboxyl of the wood fiber. The pulp was washed in distilled water and added to 300 parts of deaerated distilled water containing 10.0 parts of vinylidene chloride monomer. Enough hydrogen peroxide solution was added to make its concentration in the aqueous phase 0.03%, the system was blanketed with pre-purified nitrogen and was left at 25° C. for 18 hours.

No polymer latex was observed in the aqueous phase. The polymer-modified pulp was washed with methanol and dried to give 4.96 grams of product.

The initial pulp was white but it became browned when heated several hours at 130° C. The polymer-modified pulp was not soluble in iron-tartrate cellulose solvent and was only slightly swollen. It was noted that it displayed considerable flame retardency. When the polymer-modified sheet was held one inch over a Bunsen flame and ignited, the flame was extinguished immediately when the sheet was withdrawn from the Bunsen flame and little glow remained. A sheet of the untreated pulp starting material similarly ignited continued to burn after withdrawal from the flame.

*Example 108*

This example illustrates that cation exchange can occur at low pH with weak acid groupings in wood cellulose if the cation is of high positive charge. It also shows an oxidant bound to the cellulose.

Numerous other free radical type vinyl polymerization initiating catalysts bound to the wood pulp substance may be used.

3.3 parts of wood pulp were steeped in 200 parts of 0.5 normal nitric acid containing 0.1% ammonium hexanitrato cerate for 30 minutes and then washed with distilled water.

The ceric-treated pulp was placed in 300 parts of deaerated distilled water containing 10.0 parts of vinylidine chloride monomer and enough hydrogen peroxide were added to make its concentration in the solution 0.03% by weight. The mixture was left at 25° C. under nitrogen for 16 hours, washed in methanol and dried.

About 3 percent polyvinylidine chloride had been deposited into the wood fibers.

*Example 109*

This example illustrates binding a strong reducing agent that is the nitrogen analogue of hydrogen peroxide. The cation exchange takes place in the basic medium provided by the bound species.

The hydrazine hydrate-ammonium persulfate redox couple was used for interior deposition of polyvinylidine chloride into wood fibers.

The method of Example 100 was followed in this example, except that the pulp was steeped in 0.1% hydrazine hydrate solution and after addition of the pulp to the monomer solution enough ammonium persulfate was added to make its concentration in the aqueous monomer solution about 0.1%.

2.55 grams of cellulose pulp gave 4.108 grams of polyvinylidine chloride-modified wood pulp. Very little polymer formed in the aqueous solution, although about 0.1 gram of polymer had formed by bulk polymerization in the monomer layer on the flask bottom.

It should be noted that although in the initial step in which the starting material is steeped in the catalyst the pH is adjusted to obtain appreciable ion exchange, the pH during the polymer deposition step need not be the same as during the deposition step; it may be adjusted either higher or lower, as desired, during deposition. In this example, the hydrazine hydrate solution had an alkaline pH while the ammonium persulfate used during deposition had a slightly acid pH.

In some cases, especially when metals are bound to the wood pulp as catalysts, it may be desired to secure part of the polymer deposition in the interior of the individual fibers and then to lower the pH to permit some of the cation to escape the cellulose and initiate polymerization in the space surrounding each cellulose fiber.

*Example 110*

This example illustrates the use of pressure in the polymer deposition of a volatile monomer.

A shorter time for polyvinylidine chloride deposition was secured by conducting the polymer deposition under pressure at 50° C.

For this purpose the pulp was steeped in 0.1% ferrous chloride solution to bind the catalyst by ion exchange, washed and placed in 100 parts of deaerated water contained in a magnesia bottle. After 1.0 ml. of 3.0% hydrogen peroxide and 1.0 ml. of vinylidine chloride monomer was added, the flask was capped and held at 50° C. for three hours. The pulp was washed with methanol and water and dried.

About 2.20 grams of pulp gave 2.47 grams of polymer-modified product. The pulp was white and microscopic examination showed no appreciable polymer coating. The polymer-modified pulp sheet could be fibrillated by heating in a water suspension in a Waring Blendor. The pulp sheets were not soluble in cellulose solvents and showed some flame retardancy. They were resistant to acid attack. They had a tendency to brown when heated several hours at 130° C.

*Example 111*

The method of Example 110 was followed in this example, except that 10.0 grams of vinylidine chloride were used as the monomer and the heating at 50° C. was extended to 15 hours.

The 2.44 grams of pulp gave 5.61 grams of polymer-modified product. The pulp sheets had swollen during polymer deposition and were white. They were resistant to flame, insoluble in cellulose solvents and more resistant to microbiological attack in soil burial than was a quantity of untreated control pulp.

*Example 112*

This example shows that wood fiber may bind cation and serve as host for deposited polymer from a fiber slurry.

In this example, an aqueous slurry of 0.5 gram or 100 parts of aspen sulfite pulp was diluted to 0.125% consistency by weight of oven dry pulp fibers, and was treated according to the method of this invention.

The wood fibers were first steeped in ferrous ammonium sulfate by adding to the slurry 140 parts of this compound expressed in terms of oven-dry pulp, and stirring the slurry gently for one hour. The steeping was performed at 25° C. and at pH 5.3. The ferrous ion not combined with the ion exchange groupings of the wood pulp fibers was washed out by two 20-minute washes with 200 parts of distilled water.

After being treated with the ferrous solution, the wet wood pulp was brought back to 0.125% consistency by addition of distilled water, and 920 parts (in terms of oven dry pulp fibers) of ethyl acrylate were added with shaking. Sufficient hydrogen peroxide was added to the solution to bring it to 0.12% by weight of oven dry pulp fibers. The pulp was left in the monomer solution for 20 minutes with continuous agitation at reflux.

The pulp fibers were removed and dried and found to have a weight increase of 150%. Analysis showed that 13% of the ethyl acrylate originally added to the solution had been converted to poly ethyl acrylate.

*Examples 113–120*

These examples show that sulfate as well as sulfite wood pulps are usable in the deposition process of this invention.

The method of Example 112 was followed in these examples for the treatment of softwood sulfate pulp, but with various quantities of ethyl acrylate and various reaction times employed as specified in Table 7 below.

In each case water was added to 4 grams or 100 parts of pulp to prepare a slurry having a consistency of 1.33% by weight of oven dry pulp fibers. The quantities of ferrous ammonium sulfate, ethyl acrylate, and hydrogen peroxide were 70, 115 and 2.25 parts, respectively, expressed as parts per 100 parts of oven dry pulp.

The resulting poly ethyl acrylate-modified wood pulp was dried and weighed. The following results were observed:

TABLE 7

| Reaction time, minutes | Percent weight increase of pulp | Percent of monomer converted to polymer |
|---|---|---|
| 5 | 24 | 21 |
| 10 | 65 | 57 |
| 15 | 77 | 67 |
| 30 | 82 | 71 |
| 5 | 45 | 39 |
| 5 | 25 | 22 |
| 5 | 48 | 42 |
| 5 | 57 | 50 |

*Examples 121–123*

These examples show a remarkably high rate of monomer conversion when a polymerization takes place in a host material to which the catalyst is bound.

The method of Example 112 was followed in these examples for the treatment of softwood sulfate pulp by deposition of poly butyl acrylate, with various reaction times for the deposition step, giving the results set forth in Table 8 below.

In each case 4 grams or 100 parts of pulp were slurried with water to produce a slurry having a consistency of 1.33% by weight of oven dry pulp fibers. The quantities of ferrous ammonium sulfate, butyl acryltae, and hydrogen peroxide employed were 70, 111 and 2.25 parts, respectively, expressed as parts per 100 parts of oven dry pulp.

The resulting poly butyl acrylate-modified wood pulp was dried and weighed. The following results were observed:

TABLE 8

| Reaction time, minutes | Percent weight increase of pulp | Percent of monomer conversion |
|---|---|---|
| 5 | 83 | 75 |
| 10 | 84 | 76 |
| 15 | 82 | 74 |

*Example 124*

The method of Example 112 was followed in this example for the treatment of softwood sulfate pulp by deposition of poly methyl methacrylate.

Six grams or 100 parts of pulp were slurried to produce a slurry having a consistency of 2% by weight of oven dry pulp fibers. The quantities of ferrous ammonium sulfate, methyl methacrylate, and hydrogen peroxide employed were 1, 100 and 2.25 parts, respectively, expressed as parts per 100 parts of oven dry pulp.

With a reaction time of 10 minutes, the weight increase of pulp and monomer conversion were each found to be 92%.

*Example 125*

This example shows how the rates of polymer deposition for the same monomer can differ in different host materials such as wood pulp and regenerated cellulose depending on catalyst concentration and presence of inhibitors.

The method of Example 112 was followed in this example for the treatment of softwood sulfate pulp by deposition of polyvinyl acetate.

Four grams or 100 parts of pulp were slurried in water to make a slurry having a consistency of 1.33% by weight of oven dry pulp fibers. The quantities of ferrous ammonium sulfate, vinyl acetate, and hydrogen peroxide employed were 70, 115 and 2.25 parts, respectively, expressed as parts per 100 parts of oven dry pulp.

With a reaction time of 30 minutes, the weight increase of pulp and monomer conversion were found to be 30% and 26%, respectively.

*Example 126*

The rate of moisture regain was measured on fluffed wood pulps containing interior deposited polymers at 25° C. and 70% relative humidity. The moisture regain was expressed on the basis of the cellulose content of the polymer-modified wood pulps. Moisture regain was started from the bone-dry pulp.

The control on these moisture regain experiments was done by using the same wood pulp that was used in the polymer deposition. This pulp was fluffed under the same conditions as those used in fluffing the polymer-modified pulps. The control pulp was dried bone dry and hygrostated along with the polymer-modified pulps in the same oven and in the same hygrostat.

TABLE 9

| Type of pulp | Moisture regain (percentage of polymer-modified wood fibers) | |
|---|---|---|
| | 8 hours | 70 hours |
| (1) Unmodified chemical pulp | 6.5 | 7.1 |
| (2) Wood pulp with 48% polymethyl methacrylate | 2.9 | 3.6 |
| (3) Wood pulp with 10.5% polyvinylidene chloride | 4.1 | 5.5 |
| (4) Wood pulp with 35% polyvinylidene chloride | 2.8 | 3.7 |
| (5) Wood pulp with 4.6% polystyrene | 4.6 | 5.7 |

*Example 127*

This example describes the use of an organic cation bound to the host material as one component of a catalyst system.

In this example, a guanidine hydrochloride-ammonium persulfate catalyst system was used for deposition of methyl acrylate into wood fibers. The deposition was performed under nitrogen at 25° C. for 18 hours. A sample of pulp was steeped in 1% solution of guanidine hydrochloride for 20 minutes at 25° C. and then washed three times for ten minutes each time in distilled water 200 times its weight. In each wash the pulp was filtered to remove the cation of guanidine hydrochloride not bound by cation exchange to the wood pulp. The treated pulp was then dropped into 300 ml. of deaerated distilled water and 20 ml. of methyl acryltae. Enough ammonium persulfate was added so that its concentration in solution was 0.1%.

Only small amounts of polymer formed in the equeous solution, but 3.217 grams of pulp had increased in weight after drying to 4.103 grams.

*Example 128*

In this example a part-organic catalyst system is shown to promote polymer deposition.

In this example, an ethanolamine-ammonium persulfate catalyst system was employed. Using the method of Example 127, a portion of pulp was steeped in 1% ethanolamine solution, washed, added to the monomer and persulfate, washed and dried.

The initial 1.38 grams of pulp increased to 2.45 grams of polymer-modified pulp. It was noted that a small amount of bulk polymerized polymer formed on the bottom of the flask.

*Example 129*

This example shows the modification of wood pulp by a polymer of low melting range to impart thermoplasticity to wood pulp masses. About 5% free polymer was present.

In this example, polymethylacrylate was deposited into chemical wood pulp at the reflux temperature of a 5% monomer solution in distilled water without the use of a nitrogen blanket. A sample of wood pulp was steeped for ion exchange bonding of ferrous iron in 1% aqueous ferrous chloride solution for 30 minutes and washed with distilled water to remove uncombined ferrous iron.

The treated pulp was placed in 5% monomer solution and enough hydrogen peroxide was added so that its concentration in solution was 0.03%. The pulp was left in the refluxing solution for 30 minutes.

After washing and drying, the pulp sample contained 34% polymer. The pulp was a slight tan color and was not noticeably tacky.

In a small press at 120° C. and a pressure of 2000 pounds per square inch the poly methyl acrylate-modified wood pulp could be molded into strong, translucent sheets.

*Example 130*

In this example, the method of Example 129 was repeated except that the pulp was left in the refluxing solution for one hour.

The resulting wood pulp product appeared substantially the same as the product of the preceding example, but contained 51% polymer. This polymer-modified product could be molded into strong, translucent sheets as could the product of the preceding example, with even greater translucence than the preceding product.

*Example 131*

This example shows the deliberate control of the locus of polymerization that is possible with the method of this invention. The composite articles differ from polymer-coated wood fiber in that polymer extends throughout the wood fiber and a polymer-cellulose mixture is present at the region between wood fiber and pure poly methyl acrylate.

In Examples 129 and 130 very little polymer formed in the aqueous solution. If, however one wishes to secure polymerization in the aqueous solution as well as interior deposited polymer, the pH of the aqueous monomer solution may be lowered during the polymer deposition and ferrous iron or other ion thus partially displaced from the wood fiber so that with the hydrogen peroxide it can initiate aqueous phase polymerization.

This pH gradient deposition will secure some interior deposited polymer and some polymer coating of wood fibers that is a graduation in amount of polymer from the interior of the fiber to the outside.

1.74 grams of wood pulp were ion-exchanged in ferrous solution, washed, and dropped into the 5% methyl acrylate solution as before. After polymer deposition took place for 10 minutes, 5 ml. of 0.1 N sulfuric acid were added to the 500 ml. of monomer solution and reflux of the suspended wood pulp was continued ten additional minutes.

The initially tan suspension became almost white. When the pulp was decanted onto ice it made a gummy mass that weighed 5.07 grams when dried at 80° C. under vacuum. This mass could be easily molded into wood fiber-reinforced sheets. The sheets were slightly tacky.

*Example 132*

This example shows that under a lower pH gradient in the fiber than that used in Example 131 the catalyst cations are lost less rapidly and in a given time less total polymer and less aqueous phase polymer can form.

When the method of Example 131 was repeated except that 1.0 ml. of .1 N acid was added in place of the sulfuric acid, 1.5 grams of pulp increased in weight to 3.1 grams and the pulp mass was much less tacky. It could be pressed to a translucent sheet under heat and pressure.

*Example 133*

This example illustrates the use of a single component catalyst system to initiate polymerization in the method of this invention.

A pre-hydrolyzed sulfate viscose dissolving pulp of known bone-dry weight is removed from a hygrostat. The pulp contains a cation-exchange capacity of 0.02 meq./gm. The pulp is steeped in 0.5% aqueous solution of uranyl nitrate at pH 5.0 with stirring for 20 minutes in the dark.

The pulp thus subjected to cation exchange is washed twice in 1:100 liquor ratio of distilled water for only five minutes each wash to avoid loss of bound uranyl ion by hydrolysis from the ion binding groups of the cellulose.

The pulp thus treated is placed in a 40% solution of acrylamide in water for 20 minutes. The monomer-impregnated pulp is then spread in a layer 1/32" thick in sunlight at 25,000 foot-candles and room temperatures for ten minutes.

When the wood pulp is washed in warm distilled water overnight and dried it is found to have increased in weight by 10 percent. The pulp pieces are stiffer than before the treatment.

When the polymer-modified pulp is placed in hydrazine hydrate for 50 hours, washed in distilled water for several hours and placed in neutral 0.02 N potassium permanganate, the wood fiber becomes brown-black and much darker than a control, unmodified wood fiber stained in the same way. The stain extends through the wood fiber substrate.

The polymer-modified wood fibers are swollen in cuprammonium hydroxide but do not dissolve appreciably.

*Example 134*

This example shows the deposition of allyl acrylate polymers into wood fibers.

Pre-hydrolyzed sulfate dissolving pulp is steeped in 1% ferrous chloride solution at 25° C. for one hour at a liquor ratio of 1:200, and the cation exchanged pulp is filtered and washed with distilled water until the pulp is substantially free of uncombined iron. The pulp is then slurried in distilled water. To the one gram of pulp in 200 ml. of water are added two grams of allyl acrylate monomer and the slurry is mixed to saturate the water. The temperature is raised to reflux, and after purging the flask contents with nitrogen, enough hydrogen peroxide is added so that its concentration in the solution is 0.03% and reflux is continued for 45 minutes.

When the pulp is washed and dried it is found to have increased in weight by about 5%. It is discovered that only about 20% of the initial unsaturation in the allyl part of the deposited polymer is present. The polymer-modified wood pulp has almost the same hydrophilicity as before.

The polymer-modified fibers are swelled and slowly dissolved in the Jayme iron-tartrate cellulose solvent. It is difficult to convert more than a trace of the deposited polymer to the acid hydrazide by refluxing the wood fibers with a 1:100 weight ratio of hydrazine hydrate.

*Example 135*

This example shows the deposition of vinyl methacrylate polymers into wood pulp.

Bleached sulfate pulp having an ion exchange capacity of 0.02 meq./gm. is steeped in 1% aqueous ferrous chloride solution at pH 5.0 and a liquor ratio of 1:200 for 30 minutes at 25° C. The pulp is present as a slurry and is stirred during ion exchange. The pulp with ferrous iron bound thereto is washed twice after filtration in the same volume of distilled water. The one gram of pulp is placed in a mixture of 200 ml. of water and 2 grams of vinyl methacrylate monomer at reflux, enough hydrogen peroxide is added to make its concentration in the solution 0.006%, and the solution is boiled at reflux for one hour.

When the pulp is filtered, washed, and dried under vacuum, it is found to have increased in weight by about 15% and to have about 30% unsaturation in the interior deposited polymer.

The unsaturation in the interior deposited polymer is shown by bromination determinations after the polymer-modified fibers have been swollen in acid.

The fact that the polymer is mixed with the actual wood substance and not merely a coating on the fibers is shown by reacting the fibers with 0.02 normal potassium permanganate solution for 20 minutes and then examining microscopically the wood fiber cross section. The entire wood fiber substance is stained dark brown.

It is noted that the polymer-modified wood fibers are more hydrophobic than normal.

*Example 136*

This example shows the deposition of 4-vinyl-cyclohexene into wood fibers.

One gram (dry basis) of sulfate wood pulp is slurried in water to make a 0.5% suspension and combined with ferrous iron by ion exchange at pH 5 from a 1% ferrous chloride solution. Then the treated pulp is washed to remove uncombined iron and added to a 1% suspension of the monomer at a 1:500 liquor ratio. When the solution is adjusted to 0.03% concentration of hydrogen peroxide and refluxed for 10 minutes, the pulp after washing increases in weight by about 2%.

Other samples of pulp when subjected to the above conditions for thirty minutes or more begin to be degraded.

The poly-4-vinylcyclohexene-modified pulp when stained with iodine or neutral, dilute potassium permanganate is stained more than the control fibers.

*Example 136a*

This example and the next example show the deposition of polymers into solid balsa wood.

Thin sheets of balsa wood of about one mm. thickness were steeped for one hour in 0.1% ferrous iron solution. They were washed free of uncombined iron and dropped into a 400 ml. solution of 0.03% hydrogen peroxide containing 10 ml. of methylmethacrylate and allowed to remain at room temperature for twelve hours. In the morning the sheets were washed for several hours and then dried for twelve hours at 80° C. under vacuum.

The sheets were found to have increased in weight by an average of 86%. They were covered with a smooth, seemingly nonporous layer of the polymethylmethacrylate. Cross section showed that the entire thickness of the wood had been impregnated with the polymer.

*Example 136b*

The procedure of Example 136a was repeated, except that the pentachlorophenol ester of acrylic acid was used. Vigorous stirring was also employed to keep the ester suspended.

After drying, the wood has increased in weight by 3.4%. It was a slightly yellowish color, probably due to the oxidized iron. This, as well as Example 136a, was performed on a known weight of water extracted wood to avoid the error in the determination of the increase in weight due to water soluble constituents of the wood.

*Example 137*

This example illustrates one manner of making a paper capable of engaging in anion exchange reactions.

Vinyl pyridine has been deposited into paper by employing the method of this invention. Steeping 0.3 gram samples of Whatman No. 42 filter paper having an ion exchange capacity of 0.013 m. eq. per gram in 0.5 percent $Fe^{++}$ solution (pH 4.4), followed by refluxing in a 10 percent solution of vinyl pyridine in water containing 0.1 percent $H_2O_2$ gave an increase in weight of 1.3 percent after 15 minutes and 3.1 percent after 180 minutes.

*Example 138*

This example illustrates the profound effect of a change in pH to promote more nearly complete use of the catalyst binding capacity of paper used as the starting material with the method of this invention.

The same procedure was followed as in Example 137, except that the pH of the ferrous ammonium sulfate solution was made 5.4.

An increase in weight of 3.2 percent was obtained in 15 minutes.

VARIOUS HOST POLYMERIC MATERIALS

*Example 139*

This example illustrates that an amphoteric material or one containing chemical groups for anion exchange and groups for cation exchange can bind either anion or cation components of redox initiator systems.

The method of the present invention was used to produce polymer deposition in nylon tire cord.

The nylon cord was prepared for testing by washing it with water containing a detergent and drying at 95–100° C. in a vacuum oven.

The cation or anion solutions were prepared by dissolving the proper amount of compound in deionized water (0.7% by weight of cation or anion or as in the case of potassium ferrocyanide, 0.7% by weight of Fe in the anion).

The nylon cord (0.2 gram) was steeped in 50 ml. of this solution for five minutes and subsequently washed in three 50 ml. portions of water. The treated nylon cord was placed in a 1000 ml. flask containing 500 ml. of deionized water. The appropriate amount of deinhibited monomer was added to the water (usually 0.5 to 5%) and the water solution heated to reaction temperature. Hydrogen peroxide (0.03%) was added and the reaction continued for 1 hour.

At this time the specimen was removed and washed three times in water or with acetone for methyl acrylate. Finally the nylon sample was dried in an oven at 95–100° C. under vacuum, placed in a dessicator to come to weight equilibrium and weighed.

Polyvinyl pyridine was successfully deposited into nylon cord using $Fe^{++}/H_2O_2$ or $HSO_3{-}/H_2O_2$ as catalyst systems. As shown in the table below, the increases in weight ranged from 84 to 430 percent:

TABLE 10

| Monomer weight, percent | Redox system | | Polym. conditions | | | Percent weight increase | Run No. | Item No. |
|---|---|---|---|---|---|---|---|---|
| | Catalyst, percent | pH | pH | Time, hr. | Temp., °C. | | | |
| 5 | Fe(0.7)/H₂O₂(0.03) | 4.7 | 5.3 | 1 | 75–80 | 305 | 24I | 32 |
| 5 | Fe(0.7)/H₂O₂(0.03) | 4.7 | 5.3 | 3 | 95–100 | 298 | 24III | 33 |
| 5 | Fe(0.7)/H₂O₂(0.03) | 4.7 | 5.3 | 3 | 95–100 | 400 | 24IV | 34 |
| 5 | Fe(0.7)/H₂O₂(0.03) | 4.7 | 5.3 | 1 | 95–100 | 430 | 24II | 35 |
| 0.8 | HSO₃(0.7)H₂O₂(0.03) | 4.9 | 5.1 | 1 | 95–100 | 84 | 25I | 36 |

Attempts to remove any excess polyvinyl pyridine with dilute HCl resulted in marked loss in strength. Washing of the fiber several times with water gave a satisfactory material. Greater polymer deposition was obtained at higher temperatures and the deposition was complete at the end of one hour. The concentration of monomer had an appreciable effect upon the amount of deposition.

*Example 140*

This example illustrates that a protein that has an isoelectric point of about pH 4.8 can bind an anion at pH 3.0 and this anion can serve as a site of polymerization initiation. Further, this polymer formation within the gelatin gel can insolubilize the gelatin.

U.S.P. gelatin that contained 11.70 percent water (7.5775 grams) was sifted into a mixture of 150 ml. of methanol and 50 ml. of water that had been saturated with ammonium persulfate. The pH of this solution was about 3.0. This pH was low enough so that the persulfate anion could be bound to the basic groups in the gelatin structure. The gelatin swelled but did not dissolve appreciably. The gelatin was left in the solution one hour and then washed twice in the persulfate-free water-alcohol mixture to remove uncombined persulfate.

The gelatin was then placed in 300 ml. of deaerated solvent mixture and 15 ml. of acrylonitrile monomer were added. Sufficient ferrous chloride was added to the solution to make it 0.01 percent ferrous iron, and the system was left under nitrogen for 24 hours. No clouding of the solvent solution took place.

The polymer-modified gelatin was washed three times for 20 minutes each time in 200 ml. of methanol at 40° C. and then dried to constant weight under vacuum at 70° C. The gelatin now weighed 8.0430 grams which represented a gain in weight over the bond-dry protein of 16.7 percent due to the polyacrylonitrile deposited within the gelatin.

The effect on protein solubility of the polymer deposition was ascertained by grinding a known weight of the gelatin and placing it in stirred hot water for several hours. An aliquot portion of the clear solution was taken and the dry matter content was determined by evaporation. Only about 15 percent of the gelatin had dissolved.

*Example 141*

This example illustrates the absorption of a cation by a protein above the isoelectric range of the protein. Further, the example shows that if the amount of cation is far below the exchange capacity of the protein, little unbound catalyst will be present in the gel.

A slurry was made by adding 18.48 grams air-dry gelatin (16.32 grams bone-dry) to 300 ml. of cold distilled water. The gelatin was of U.S.P. food quality. About 0.10 gram of ferrous chloride was added to the slurry directly and mixed about five minutes. Then 3.0 ml. of 3 percent hydrogen peroxide were added and the mixture was allowed to stand under nitrogen for 24 hours. After about 10 minutes, the slurry began to synerese as the gel.

The slurry was then washed twice by decantation with cold water to remove most of the monomer and residual peroxide.

When the gelatin was heated for several hours in water at 80° C. it was evident that most of the polymer-modified gelatin was insoluble. A determination of total solids in the extract indicated that 3.65 grams of gelatin had dissolved.

*Example 142*

This example and Example 143 illustrate that polymer deposition is possible into a cross-linked condensation resin.

Rohm & Haas Co. "Uformite" F-200 E. brand of urea-formaldehyde precondensate was used. This material is available as a high viscosity solution in 50:50 xylene: n-butanol solvent mixture that contains 50 percent solids. Films of urea-formaldehyde resin were made by pouring out 2 to 3 grams of the precondensate solution as a thin stream on weighed aluminum foil over half the surface. The foil was then folded against itself to spread the solution as a thin film. The weighed foil was then heated at 100° C. for four hours to remove the solvent and partially cure the resin. The coated foil was then left for 14 hours at 60–70° C., and became stiff. The film could be removed by soaking the reweighed film in water. This film was quite brittle and broke into pieces.

The hydroquinone-persulfate initiator system was used for deposition of polyacrylonitrile into the condensation resin. The resin film was steeped in 2 percent ammonium persulfate solution at pH 3.0 for one hour with stirring. About 200 ml. of solution were used for the 1.5155 gram resin film. The film was then washed twice for 30 minutes each time in 200 ml. of distilled water to remove uncombined persulfate anion.

The treated film was placed in 300 ml. of deaerated water and 15.0 ml. of acrylonitrile that contained 0.25 percent of hydroquinone was added. The flask was left with shaking for 24 hours under nitrogen.

No turbidity arose in the aqueous phase. The film was washed two hours in warm distilled water to remove the monomer absorbed in the resin and dried to constant weight at 120° C. It had gained in weight by 17 percent. The wet film was colorless but the dried film was yellow.

To ascertain that the weight given of the "Uformite" film was not due to retention of monomer, a film weighing 1.3568 gram was steeped in 5 percent acrylonitrile solution overnight and washed. The film gained 0.0071 gram.

The weight change due to a retention of catalyst was also estimated by steeping a known weight of resin in 2 percent ammonium persulfate, washing as above and weighing. The initial 1.2286 grams weight changed to 1.2443 grams.

*Example 143*

The pursulfate-hydrazine hydrate initiator system was used in a similar manner to Example 142.

The 1.1334 grams of "Uformite" resin was steeped in persulfate and washed as in Example 9. The treated film was added to a mixture of 300 ml. of deaerated water and 10 ml. of methyl methacrylate monomer and 1.0 ml. of hydrazine hydrate were added. The mixture was left under nitrogen at 25° C. for 24 hours. The aqueous solution had turbidity in it.

When the resin film was dried as before it had 40 percent polymethyl methacrylate deposited in the urea-formaldehyde film.

*Example 144*

This example illustrates that the deposition process is not limited to organic host materials. Thus asbestos has chemical groupings capable of ion exchange that may be used for binding a free radical initiated, polymerization reaction in its near locus.

Ignited, but not acid washed, short fiber asbestos was dried and 3.830 grams were sifted into 400 ml. of 1 percent ferrous chloride solution. The solution was stirred one hour, filtered, and washed continously for one hour with a slow stream of distilled water going into the glass filter funnel. The asbestos was added to 200 ml. of deaerated water plus 15 ml. of acrylonitrile monomer. About 3.0 ml. of 3 percent hydrogen peroxide were added to the solution and the mixture let stand under nitrogen for 18 hours at 25° C. Polymer formation had taken place so that no soluble inhibitor was present in large amounts in the asbestos.

The asbestos-polymer mixture was dried to constant weight at 70° C. under vacuum for 30 hours. The material weighed 9.084 grams.

Solvent extraction of free polymer was attempted by placing the dried asbestos-polyacrylonitrile in 250 ml. of dimethylformamide in a glass, stoppered bottle and shaking at one hour intervals during the day for five days. Some polymer went into solution but a thick gel remained on the flask bottom.

When 5.00 ml. of solution were removed, added to a petri dish and a film formed by the removal of the solvent under vacuum, the film weighed 0.0480 gram. Thus there were 2.40 grams of polyacrylonitrile that dissolved. Correcting the initial weight by this, 6.684 grams comprised asbestos plus polymer bound in some fashion, and about 42 percent polymer was present in the asbestos.

Example 145

This example illustrates modification of an asbestos that may be used in plastic reinforcement.

Polyvinylidene chloride was deposited into medium fiber, acid washed asbestos in a manner similar to that of Example 11. Only 10.0 ml. of vinylidene chloride were used and the system was allowed to stand under nitrogen at 25° C. for 64 hours.

Some bulk polymerization took place in the pure monomer layer on the flask bottom.

The asbestos was extracted with methanol to remove the monomer and then for six one-hour extractions with dioxane at the boil to remove surface polymer. The asbestos-polyvinylidene chloride was dried and weighed. The initial weight was 1.2100 grams, and the weight of the polymer-modified asbestos was 2.8254 grams.

It is seen from this example and the immediately preceding example that the polymeric host or starting material for use with the method of this invention does not have to be organic in nature. Inorganic host materials that have ion exchange capacity may be used in polymer deposition in accordance with the invention. Other examples of inorganic materials in addition to asbestos that can be polymer-modified by use of this invention are zeolites and analogous substances.

VARIOUS GUEST POLYMERS

Example 146

This example shows that monomers containing several different elements, including functional groups that may be modified in the deposited guest polymer, can be employed with the method of this invention.

A sample of cellulose film (0.2 gram) was stepped in 200 ml. of solution, containing 0.7 percent of $Fe^{++}$, for five minutes and subsequently washed three times with 200 ml. of deionized water.

The treated cellulose film was then placed in 500 ml. of deionized water or other solvent and sufficient bis-b-chloroethylvinyl phosphonate added to make the concentration about 5 percent with respect to that monomer. The temperature was raised to 100° C. and sufficient hydrogen peroxide was added to make the concentration 0.03 percent with respect to $H_2O_2$. The film was removed after 2 hours from the time of addition of hydrogen peroxide. The polymer-modified film was washed with water, then with acetone and dried under vacuum at 95–100° C. for one hour.

The cellulose film, with polychloroethylvinyl phosphonate deposited therein, showed a 4 percent weight increase. The film looked very much like the original but had improved elasticity.

When alcohol was used as the solvent in place of water in the same procedure, a 5 percent increase in weight was obtained in 2 hours. The reaction temperature was 78° C. The sample showed no flame-proofing qualities.

An increase in weight of 15 percent was obtained using toluene as a solvent instead of water in the same procedure, but the film was covered with yellow spots and was very brittle.

Example 147

In this example, acrylamide was polymerized and deposited into cellulose film through use of methanol as a solvent.

A 0.200 gram strip of cellulose film was steeped in 0.7 percent solution of ferrous ammonium sulfate at a pH of 5.4 for 5 minutes. The $Fe^{++}$ which was not bound to the film by the ion exchange process was removed by washing with three 50 ml. portions of water. The film was then placed into 500 ml. of methanol containing 10 percent of acrylamide and heated to reflux temperature (65° C.). Sufficient hydrogen peroxide was added to the solution to make it 0.03 percent by weight with respect to hydrogen peroxide, and refluxed for one hour. The film was then removed, washed with water, dried, permitted to come to equilibrium in a dessicator and weighed.

The increase in weight was 43.4 percent.

Example 148

This example illustrates the introduction into cotton of a guest polymer containing unsaturation and capable of subsequent reaction while remaining associated with the host polymer.

Bleached cotton 3 oz. muslin, was steeped in 1 percent aqueous solution of ferrous ammonium sulfate at pH 5.3 for ten minutes at 25° C. The 3.31 parts of dry muslin that had been steeped were washed free of uncombined iron and dropped wet into 300 ml. of water and 3.0 ml. of methallylacrylate monomer at 80° C. One minute later 3.0 ml. of 3 percent hydrogen peroxide were added and reflux was continued under steam for one hour.

After the cotton was washed and dried it weighed 3.542 parts. It was of a very light tan color.

Example 149

This example shows the deposition in a controlled, uniform manner of a polymer that can cross link by forming inside linkages or by formaldehyde reaction.

This example describes deposition of polyacrylamide into a cellulose film tube.

Ten equal lengths of cellulose tubing of about 2.3 mils wet thickness and each having a cellulose content of 0.6761 gram were steeped in 50 ml. of 1 percent aqueous solution of hydrazine hydrate for 20 minutes at 25° C. They were washed three times for ten minutes, each time in 500 ml. of warm distilled water at 40° C. to wash out uncombined hydrazine.

The hydrazine ion exchanged casing was dropped into 800 ml. of a 4 percent solution of acrylamide in water at 80° C. One minute later 8 ml. of 3 percent hydrogen peroxide solution were added and the mixture of casing and solution was heated at reflux for 40 minutes. The casing was then washed in hot water for one hour to remove any surface polymer. The polyacrylamide-modified casing was then dried at 95° C. under vacuum for four hours to determine polymer add-on with in the cellulose film.

The resulting cellulose contained 9.2 percent polymer.

The film could be stained by conversion of the acrylamide to the acid hydrazine by steeping the film in hydrazine hydrate for 50 hours at 25° C., washing in hot water, and reaction with Tollens reagent or neutral potassium permanganate. When it was then stained, the film was of uniform color throughout the cross section.

Example 150

This example relates to the deposition of poly N-vinyl carbazole into cellulose film in alkaline medium.

Two pieces of cellulose tubing of film about 2.3 mil thick were desulfured by heating them in 0.3% sodium sulfide solution at 60° C. for five minutes. The films were then washed in distilled water until the wash water pH reached 6.3.

The pieces were than dried under vacuum at 110° C. for four hours to constant weight. They then weighed 1.3792 grams.

Silver-ammonia complex was made in solution by adding 1:1 ammonia to a 1% silver nitrate solution until the precipitate first formed had redissolved. This solution was placed in a 250 ml. actinic-glass flask.

The dry, pure cellulose film was added to the flask containing the silver-ammonia complex and steeped in the solution for 20 minutes at 25° C. The solution in the flask was decanted and the cellulose that had been ion-exchanged with the silver complex was washed three times for five minutes each time in 200 ml. of distilled water while in the flask.

200 ml. of acetone were added to the flask and the cellulose swirled for two minutes in this acetone to remove most of the water. 100 grams of acetone containing 5 grams of vinyl carbazole monomer were then added to the cellulose in the flask and the contents were shaken at intervals of ten minutes for 90 minutes to permit the monomer to diffuse into the cellulose film. The solution remained clear. Three drops (0.15 ml.) of 15 normal ammonia and three drops of 30% hydrogen peroxide in water were added and mixed. The solution remained clear. The system was left standing at about 30° C. for 60 hours. It was noted that the cellulose film turned red-brown.

When one milliliter of the acetone solution of the monomer was added to 100 ml. of methanol no precipitate arose so that little or no polymer had formed in the acetone solution.

The cellulose casing was washed in six portions of 150 ml. of acetone at the boil for twenty minutes each time. It was then placed in 150 ml. of acetone for 20 hours at 25° C. to complete the removal of the vinyl carbazole monomer. The film was then washed in distilled water and dried at 110° C. under vacuum to constant weight. The final weight was found to be 1.4398 grams, a gain of 0.0606 gram polymer plus silver.

When the modified cellulose weight is corrected for 10 mg. of contained silver it was found to contain 3.5% poly-N-vinyl carbazole. The exchange capacity of the film was not appreciably changed by the polymer deposition.

ADDITIONAL VARIETIES OF PRODUCTS

Example 151

This example describes the properties of jute into which various amounts of polyacrylonitrile have been deposited.

Ludlow bright jute modified in accordance with this invention by the deposition of 1.7%, 8.5% and 13.8% polyacrylonitrile within the jute fiber was tested for rot-resistance by immersion in wet soil at 30° C. with control, unmodified jute yarn. The control yarn rotted in six days. The polyacrylonitrile-modified jute yarn was sampled at 18 and 28 days and the yarn strength was determined. The strength of the polymer-modified yarn before burial was also measured.

Yarn breaking load or "strength" was measured on conditioned yarns using a one-inch length that was twisted three turns between the clamps of the IP-4 Scott tester. The yarn breaking strength was tested using ten seconds for full carriage traverse.

The results are shown in the table below:

TABLE 11

[Breaking loads of jute yarns that have polyacrylonitrile deposited therein and have been soil buried 18 and 28 days]

| Jute yarn | Days buried | Breaking average | Load range gms. |
|---|---|---|---|
| Control | 18 | 0 | |
| 1.7% PAN deposited | 18 | 747 | 0-2,250 |
| 8.5% PAN deposited | 18 | 3,666 | 480-7,600 |
| 13.8% PAN deposited | 18 | 6,188 | 1,600-9,500 |
| 1.7% PAN deposited | 28 | 0 | |
| 8.5% PAN deposited | 28 | 1,800 | 360-4,500 |
| 13.8% PAN deposited | 28 | 3,300 | 1,460-5,340 |
| 1.7% PAN deposited | 0 | 9,240 | |
| 8.5% PAN deposited | 0 | 9,220 | |
| 13.8% PAN deposited | 0 | 8,900 | |

In all cases 20 yarn samples were taken for each type of sample and for each soil burial time.

Other tests were made with jute skeins with 24% and 30% poly-acrylonitrile interior deposited therein.

Two light yellow colored jute skeins were heated in water at 80° C. with 0.05% sodium lauryl sulfate added to remove the spinning oil and to remove easily dissolved water soluble substances. The jute skeins were dried. They weighed 65.4 grams and 60.65 grams respectively.

Ferrous iron was combined with the jute by cation exchange by steeping each sample in 1:50 liquor ratio of 1% ferrous ammonium sulfate in distilled water at 25° C. for one hour. The skeins were added to 3 l. of distilled water to wash out ferrous iron not exchanged. A second wash also of 20 minutes removed almost all uncombined iron.

One skein was dropped into a 5% (v./v.) solution of acrylonitrile in 3 l. of water at 65° C. After one minute 30.0 ml. of 30% hydrogen peroxide were added and the solution heated at 80° C. for 40 minutes. The solution remained completely clear and transparent. The jute skein was removed and washed in gently flowing hot tap water for one hour to remove monomer. When the skein had been dried 18 hours at 95° C. under vacuum it weighed 94.6 gm. or 30% polyacrylonitrile was deposited in the jute.

The jute skein had a slightly harsh hand and was slightly stiffer than the starting material after each had been conditioned.

The second skein was treated similarly to the above except that the polymer deposition period was only 20 minutes. In this case there was 24% polymer that was deposited within the jute. The resulting skein was less harsh in hand than the former.

Jute has thus been modified by the deposition of from 1.7% to 30% polymer within the fiber. The jute becomes insoluble in cellulose solvents and can be dyed by polyacrylonitrile dyes. The jute also acquires rot resistance that cannot be leached out.

Example 152

Jute, the world's second largest tonnage textile fiber, can be used more extensively if a non-extractable, rot-proofing process can be used on it. The jute bast fiber contains 0.08–0.16 meg./gm. exchange capacity for cations and so is of the class of article usable in the method of this invention.

Light colored jute yarn was water-extracted and scoured to remove water extractable material and spinning oil. The dry weight of jute yarn increments was known.

The half skein of jute was added to 1.5 liters of 0.1 percent ferrous solution that also contained about 0.1 gram of Duponol WA. The yarn wet out almost immediately. It was steeped 20 minutes, wrung out, washed once in deionized water to remove most of the uncombined iron and placed in the monomer solution that was contained in a three-neck glass flask. The monomer solution consisted of 1.5 liters of water and 150 milliliters of acrylonitrile. After yarn was added 20 milliliters of 0.05 M hydrogen peroxide were added and the polymer deposition was conducted at reflux for 35 minutes. After 25 minutes at reflux a slight turbidity was noted in the monomer solution.

The jute after drying was found to have increased in weight by 1.4 percent.

Example 153

Jute yarn was scoured, dried and divided into about 15 gram portions for deposition. The skeins were both steeped in ferrous ammonium sulfate solution containing 0.1% ferrous ion at pH 14.6 The acrylonitrile monomer solution was adjusted to pH 5.5 to obtain deposition of 13.8% and to 8.5 to obtain deposition of 8.8% in one hour at 25° C.

The complete jute skein containing 2.3 percent polyacrylonitrile was added to 1.5 liters of water at 10° C. The water contained 20 milliliters of glacial acetic acid and 0.05 gram Duponol WA. The skein was steeped with stirring for 30 minutes and then washed with deionized water until the wash water was pH 5.5 The yarn was then dried to constant weight at 95° C. under vacuum Portions of this yarn were used for polymer deposition trile and 1 milliliters of 0.1 M potassium persulfate.

About 15 grams of dry yarn was steeped in 200 milliliters of 0.1 percent ferrous iron solution as ferrous ammonium sulfate at pH 4.6 in the presence of a trace of Duponol WA. Steeping was continued for 20 minutes under repeatedly broken vacuum. The yarn was washed free of soluble iron and dropped into 350 milliliters of water in which was dissolved 25.0 milliliters of acrylonitrile and 1 milliliters of 0.1 M potassium persulfate.

Example 154

This example shows deposition of polymethylmethacrylate into sheep-gut casing.

Commercial sheep casing stored in salt was washed in deionized water for one hour at 40° C. The size-graded casing was then cut into four-inch pieces and alternate adjacent pieces were dried at 90° C. under vacuum to establish the bone-dry weight.

The undried pieces were then steeped for 20 minutes in 0.8% persulfuric acid solution and then washed twice for 15 minutes each time in 1:200 liquor ratio of demineralized water to remove the persulfate not combined with basic groups of proteins in the casing.

One group of casing pieces was dropped into a saturated aqueous solution of methylmethacrylate at 80° C. and enough ferrous ammonium sulfate was added to make the ferrous ion concentration 0.1% while the other group of pieces was treated similarly except that the ferrous iron concentration was 0.015%.

In both cases the casing pieces were heated in the monomer solution at 80° C. for ten minutes, washed in hot water, and dried under vacuum. The 0.1% ferrous iron group increased in weight by 185%. The other casing pieces increased in weight by 45%.

When the polymer-modified sheep casings were examined under the microscope it could be seen that the brown color of the iron was not uniformly distributed. Some portions of the casing were not stained at all.

The polymer-modified casing was stiffer than normal and more hydrophobic. The channels through the casing wall had not been closed by polymer deposition.

Example 155

This example shows the deposition into wet cellulose film of a polymer formed from an undiluted monomer. Such deposition from the pure monomer may be obtained with poly-methyl acrylate being deposited into cellulose, for example, with the polymerization occuring only within and on the surface of the film.

In the method of this example, the catalyst system used was $Fe^{++}/H_2O_2$. The ion-exchange process was controlled to that less than the maximum amount of $Fe^{++}$ was introduced into the film. The film was steeped in 0.07% solution of $Fe^{++}$ as ferrous ammonium sulfate for periods of one and five minutes. The excess salt washed out with deionized water and the film was then placed in pure methyl acrylate containing 0.125% hydrogen peroxide and heated at temperatures of 20 to 80° C. The film was then removed, washed with water and acetone, dried and weighed. The results are shown in Table 12 below:

TABLE 12—DEPOSITION OF POLYMER FROM PURE METHYL ACRYLATE

| Catalyst conc. | Cation conc., percent in $H_2O$ | Immersion in monomer | | Increase of weight in cellulose, percent (steeping period in cation solution) | | |
|---|---|---|---|---|---|---|
| | | Temp., °C. | Time, min. | 0 min. | 1 min. | 5 min. |
| $H_2O_2$, 0.125% | $Fe^{++}$, 0.07 | 20 | 1 | 1.93 | 9.75 | 6.2 |
| | | 20 | 60 | 1.09 | 11.7 | 12.5 |
| | | 80 | 1 | -0.8 | | 7.2 |
| | | 20 | 60 | 133 | | 3,200 |

Relatively little deposition occurred at 20° C. even after 30 minutes. At 80° C. deposition occurred even though no ferrous ion had been introduced into film. An increase in weight of more than 3000% occurred on a film treated first with a 0.07% ferrous ion solution for 5 minutes then heated in methyl acrylate containing 0.125% $H_2O_2$ for 60 minutes.

The most important observation to be made was that the polymerization occurred only on the film and not throughout the monomer. At the end of the run the excess monomer could be poured from the flask without any trace of a polymer film on the glass. The fact that polymerization occurred only on the film in the absence of ferrous ion suggests that the peroxide added to the monomer is selectively adsorbed on the cellulose film.

The polymerization started on the surface of the film and extended out into the liquid. Only part of this polymer on the film could be removed by treatment with acetone.

After removal of excess polymer and drying the films are clear and may be stretched 3 to 10 times the original length.

Example 156

The next two examples illustrate the production of hydrophobic materials by the method of this invention.

This example shows deposition of vinylmethacrylate polymer into rayon using a $Cu^+$—$H_2O_2$ initiator, and illustrates the hydrophobic nature of the resulting product. Unfinished 75/30/2.52 rayon was steeped in cuprous chloride solution containing 0.1% cuprous ion for five minutes and washed twice in distilled water for five minutes each time.

The 2.0 gram skein of yarn was placed in a mixture of one percent vinylmethacrylate in water at reflux (200 ml.) and enough hydrogen peroxide was added so that its concentration in solution was 0.003% and reflux of solution and rayon was continued one hour.

When the rayon had been water-washed and dried to constant weight it contained 20.3% polyvinylmethacrylate.

When the dry yarn was placed on the surface of distilled water at 25° C., it required almost two weeks to sink under its own weight.

The uniformity of deposition of the polymer throughout the volume of the rayon fiber was shown by immersing the fibers in 0.02 normal potassium permanganate at 25° C. for 20 minutes. Because of the unsaturated nature of the polymer deposited, the permanganate reacted to give manganese dioxide staining that was ten times darker than that of unmodified controls also stained in permanganate. Microscopic cross sections of the rayon fibers were dark brown stained uniformly all the way through each fiber of the yarn.

Example 157

This example also shows the hydrophobic nature of polymer-modified rayon yarns.

Rayon yarn contained 1.1 to 24 percent deposited polyvinylmethacrylate is hydrophobic with water flotation times up to three weeks. A marked increase in hydrophobicity occurs at seven percent polymer add-on. Rayon yarn containing 33 percent polyallylacrylate was also hydrophobic.

The hydrophobicity was permanent after conditioning the rewetting. The polymer-modified yarns were not stiff or boardy. The above contrasts with some prior art cellulose-polymer mixtures that do not have permanent hydrophobicity.

Rayon yarn modified by the process of this invention was conditioned at 25° C. and 65% R.H. and subjected to a water flotation test both as a yarn bundle and as individual yarns. When it had sunk, it was reconditioned and tested again. The results are shown in the tables below:

Table 13—FLOTATION TIMES FOR POLYMER-MODIFIED RAYON YARN BUNDLES ON WATER

| Rayon yarn | Flotation times | |
|---|---|---|
| | Initial wetting | Rewetting after hygrostating |
| (1) Control, 75/30/2.5 Z rayon | 30 sec | 30 sec. |
| (2) Tire cord rayon yarn with 1.1% polyvinylmethacrylate (R.N.-22, p. 87 Sample 3). | 2 min. | 2 min. |
| (3) Tire cord rayon yarn with 6.6% polyvinylmethacrylate (R.N.-22, p. 87 Sample 6). | 4 min. | 3.5 min. |
| (4) Tire cord rayon yarn with 13.1% polyvinylmethacrylate (R.N.-22, p. 87 Sample 5). | 15 min. | 15 min. |
| (5) Tire cord rayon yarn with 24% polyvinylmethacrylate (R.N.-22, p. 83 Sample VI). | 190 hrs. | 180 hrs. |
| (6) Tire cord rayon yarn with 33% polyallylacrylate (R.N.-21, p. 71 Sample B-1). | 25 min. | 15 min. |

TABLE 14.—TIME REQUIRED FOR COMPLETE WETTING OF SHORT LENGTHS OF POLYMER-MODIFIED RAYON YARN FLOATING ON WATER

| Rayon yarn | Complete wetting | |
|---|---|---|
| | 1st time | 2d time |
| (1) Control, 75/30/2.5 Z rayon | 5 min. | 5 min. |
| (2) Tire cord rayon yarn with 1.1% polyvinylmethacrylate (R.N.-22, p. 87 Sample 3). | 8 min. | 7 min. |
| (3) Tire cord rayon yarn with 6.6% polyvinylmethacrylate (R.N.-22, p. 87 Sample 6). | 265 hrs. | 270 hrs. |
| (4) Tire cord rayon yarn with 13.1% polyvinylmethacrylate (R.N.-22, p. 87 Sample 5). | 336 hrs. | 330 hrs. |
| (5) Tire cord rayon yarn with 15% polyvinylmethacrylate (R.N.-22, p. 87 Sample 8). | do | 340 hrs. |
| (6) Tire cord rayon yarn with 24% polyvinylmethacrylate (R.N.-22, p. 83 Sample VI). | 530 hrs. | 500 hrs. |
| (7) Tire cord rayon yarn with 33% polyallylacrylate (R.N.-21, p. 71 Sample B-1). | 350 hrs. | 361 hrs. |

*Example 158*

This example shows deposition of polymethallylacrylate into 1650/2T-258 rayon tire cord.

About 25 grams of conditioned rayon tire cord was taken from the conditioning hygrostat and wound in thin layers around three one-inch by four-inch glass cores. Two small pilot samples were also weighed accurately and wound on glass cores and polymer deposited in the same glass container with the main sample.

The small samples and large sample cores were impregnated under vacuum for 1.5 hours with 0.1 percent ferrous solution at pH 5.1. Vacuum was released six times to assist removal of air from the cord interstices. Treated and washed cord was dropped into two liters of water at 85° C. The water had been equilibrated with 50 milliliters of monomer. Twenty milliliters of 0.3 percent hydrogen peroxide were added and polymer deposition was continued under reflux for 45 minutes.

After washing and drying one of the small weighed samples had shown 12.4 percent polymer add-on. The other small sample was washed free of monomer with warm, de-ionized water and brominated while still moist. The polymer added was 43 percent unsaturated.

*Example 159*

The high add-on of this example illustrates the formation of a "reinforced" plastic mass in the form of a regenerated cellulose that contains interior deposited polymer.

A regenerated cellulose film (0.2 gram, free of glycerol and sulfur) was steeped in a 0.7 percent solution of $Fe^{++}$, as ferrous ammonium sulfate, for five minutes. The strip was removed and washed with three 50 ml. portions of water to remove any $Fe^{++}$ not bound to the film by ion exchange.

This film was then introduced into 500 ml. of deionized water containing 5 percent methyl acrylate and the mixture heated for one hour at 85° C. At the end of this time considerable polymerization had occurred.

Lumps of a rather porous polymer were hanging to the film. These could be pulled off and were found to be rubbery. This polymer was completely soluble in acetone and could be recovered as a film by evaporation of the solvent. The film was elastic and could be stretched.

The cellulose film after washing with acetone and drying was found to have increased in weight by 300–400 percent. This film was highly plasticized. It was very soft and could be stretched at least 50 percent of its original length and was very much tougher than the original film.

CATALYSTS WHICH MAY BE USED WITH THE METHOD OF THIS INVENTION

The ion exchange anchoring of catalysts that is the central feature of this invention may be used with any catalyst which is an anion or cation under the conditions of the impregnation. Organic or inorganic cations or anions may be used.

In addition, redox systems may be used in which one of the essential members of the redox couple is a cation or an anion. In addition, if the third component of the system is a "promoter" and is an anion or a cation, then polymerization may be preferentially secured in the phase in which the promoter is anchored. An example of such anchoring of a promoter would be cupric cation in the redox couple bisulfite-persulfate. Amines which act as "activators" of diene polymerizations would be included in this class if they are present as salts.

Catalysts which may be used if they contain other groups making them cations or anions include, but not exclusively highly substituted azo compounds, diazo amino, hydroperoxides, aryl substituted paraffins, aryl substituted nitriles, acyl or aryl peroxides, nitroso-acyl-arylamines, diazonium salts, etc.

Specific highly active systems described in the literature which may be used include the following redox systems:

An inorganic or organic per compound and some or all of the following reducing cations: ferrous, chromous, manganous, cuprous, titanous, silver ion, and the like. The other member of the couple may include such per compounds as hydrogen peroxide, persulfates, perborates, percarbonates, and the like.

Other powerful redox systems which may be used include: sulfite-persulfate; sulfate-persulfate; bromate-bromide, sulfite; iodide-cupric and iodide-ferrous with thiosulfate promotion; oxalate-permanganate; hydroquinone-persulfate; benzoyl peroxide-ferrous; cystein-persulfate; chlorate-bisulfite; copper, iron, and silver free metals-persulfate and the like.

Many other catalysts, both multiple component and single component systems, which may be used with the method of the present invention are disclosed in the various examples of this specification.

The mode of action of the bound catalyst to initiate in situ polymerization in this invention may be thermal, redox reaction, generalized acid-base reaction, photosensitization, radiation, or others well known in the art.

*Example 160*

This example and Example 161 show that reducing agents such as dextrose increase the extent of polymer deposition when the catalyst employed with the method of this invention is a so-called redox couple.

Two strips of cellulose film (0.2 g. each) were steeped in 50 ml. of 0.7 percent $Ni^{++}$, as nickel nitrate, for 5 minutes at a pH of 5.4. The strips were removed and washed with three 50 ml. portions of deionized water to remove any excess $Ni^{++}$ not bound to the film by ion exchange.

One of these strips was placed in a one percent solution of methyl acrylate which also contained 0.03% by weight of hydrogen peroxide, and the solution was refluxed for one hour. The strips of film were then removed, washed with water, dried, permitted to come to a weight equilibrium in a dessicator and weighed. The gain in weight was 19.0 percent.

The second strip of film was treated in the same way except that the solution contained one percent dextrose in addition to the methyl acrylate. The gain in weight was 34.2 percent.

*Example 161*

In this example three cellulose strips were treated with ferrous ammonium sulfate in the same manner as described in Example 160.

One of these strips was added to 500 ml. of deionized water containing one percent methyl acrylate and refluxed for 1½ hours. The strip was then removed, washed, dried and weighed. The increase in weight was 49.6 percent.

The second strip was similarly treated in 500 ml. of water containing one percent methyl acrylate and one percent dextrose. The gain in weight was 81.1 percent.

The third strip was similarly treated in 500 ml. of water containing one percent methyl acrylate and one percent $NaHSO_3$. Polymerization occurred but the film which was formed on the surface of the cellulose did not adhere and was readily peeled off. There was no net gain in weight.

It is believed that in this and the preceding example the reducing agent present acts as a "promoter" of the catalytic activity of the redox couple. When the reducing agent employed in the redox couple is ferrous iron, for example, these "promoters" (such as dextrose) will re-reduce the ferric iron produced by reaction with peroxide and make it available for further use.

*Example 162*

This example and Example 163 show deposition of polymers into cellulose using a sensitizer for photopolymerization that is within the host phase and allowing monomer to diffuse into the host phase during exposure to light. The sensitizer within the host phase is ion exchanged with the chemical groupings in the host material capable of ion exchange.

A glycerol-free piece of cellulose film whose dry weight was 0.454 gram was steeped in 100 ml. of an aqueous solution of 0.5% uranyl nitrate for ten minutes in absence of light. The uncombined cation was washed from the cellulose and the cellulose film was immersed for one hour in a 35% aqueous solution of acrylamide. The ample 162 and the wet film was covered with a 0.2 cm. layer of styrene monomer. The film was exposed to 24,800 foot candles for one hour from a medium beam General Electric photoflood lamp. The film was washed in hot methanol for several hours and dried under vacuum at 95° C. to constant weight to ascertain the polymer add-on.

About 3.0% polymer had been deposited within the cellulose film. Essentially no polymer had formed in the styrene monomer covering the sensitizer-treated cellulose film.

The styrene polymer-cellulose mixtures were wet by water drops at ⅕ the rate noted in the control.

The cellulose film used in Examples 162 and 163 had not been additionally desulfured after the viscose process and could contain traces of sulfur. It had a cation exchange capacity of about 0.018 meg./gm.

*Example 164*

This example and Example 165 show that hydrazine and amines may be used as part of redox systems for the deposition of polymethylacrylate and polyvinyl pyridine into cellulose film.

A 0.200 g. strip of cellulose film was steeped in 50 ml. of water containing 0.7 percent of hydrazine hydrate (pH 9.1) for 5 minutes. The film was then washed with deionized water to remove any excess hydrazine and placed in 500 ml. of water containing one percent methyl acrylate. The solution was heated to reflux temperatures, 0.03 percent hydrogen peroxide was added and heating was continued for one hour. The film was then removed, washed thoroughly with water, dried, brought to a weight equilibrium in a dessicator and weighed.

The increase in weight of the film was 98.7 percent.

Substituting tert-butyl hydroperoxide for hydrogen peroxide gave a weight increase of 17.4 percent and cumene hydroperoxide gave a weight increase of 1.1 percent.

An increase in weight of 103 percent was obtained when polyvinyl pyridine was deposited into cellulose film using a hydrazine-hydrogen peroxide catalyst.

*Example 165*

Other amines found to be effective catalysts for the deposition of polymethyl acrylate into cellulose film are diethylenetriamine, trimethyl amine, methyl aniline and hydroxyl amine. Results with these catalysts, following the method of Example 164, are summarized below:

TABLE 15

| Monomer (1%) | Amine | pH | Peroxide | Weight inc., percent |
|---|---|---|---|---|
| Methyl acrylate | Hydrazine | 9.1 | Hydrogen peroxide | 98.7 |
| Do | do | 9.1 | Tert-butyl hydroperoxide | 17.4 |
| Do | do | 9.1 | Cumene hydroperoxide | 1.1 |
| Vinyl pyridine | do | 9.2 | Hydrogen peroxide | 103 |
| Vinyl acetate | do | 8.9 | do | |
| Vinyl pyrrolidone | do | 9.2 | do | |
| Methyl acrylate | Diethylene triamine | 10.9 | do | 43.2 |
| Do | Trimethyl amine | 9.4 | do | 24.6 |
| Do | Methyl aniline | 10.6 | do | 18.0 |
| Do | Hydroxyl ammonium chloride | 3.9 | do | 11.9 | film impregnated with monomer was blotted and placed under a white fluorescent reading lamp at 40 foot-candles for 16 hours.

When the cellulose film was washed for several hours in hot water it had increased in weight by 3.5% corrected for the weight of the cation-exchanged uranyl ion.

When the cellulose-polyacrylamide composite was stained with manganese dioxide after conversions to the acid hydrazide the stain appeared uniformly throughout the cellulose film cross section.

*Example 163*

A 0.454 gram piece of cellulose film was used for cation exchange with uranyl nitrate solution as in Ex-

*Example 166*

This example shows that different cations can differ markedly in the rate at which polymer deposition is promoted with a given peroxide under identical conditions.

Methyl acrylate was deposited by use of the method of this invention in regenerated cellulose film.

The cellulose film was washed twice with hot water to remove the glycerol and treated with a sodium sulfide solution to remove sulfur. It had an ion exchange capacity of 0.011 m. eq. per gram.

A 0.2 g. sample of the resulting cellulose casing was steeped for five minutes in 40 ml. of a 0.7 percent solution of $Ni^{++}$ as $Ni(NO_3)_2$ at a pH of 5.4. The treated cellulose was then washed with three portions of deionized water (50 ml. each) to remove any excess nickel ion not bound by the ion exchange process. The cellulose film was then placed in 500 ml. of deionized water containing one percent methyl acrylate heated to reflux and made 0.03 percent with respect to hydrogen peroxide. This mixture was permitted to reflux for one hour after which time the film was removed, washed with water, dried and placed in a dessicator until it came to equilibrium.

The gain in weight of the cellulose film was found to be 19 percent.

The same procedure as just described was followed for other samples of the same regenerated cellulose film, except that various cations were used in place of $Ni^{++}$ in the redox couple employed as a catalyst, and except that the pH of the ion exchange reaction varied with these changes in the catalyst. The respective gains in weight of the cellulose film under the indicated conditions are shown in the table below:

TABLE 16

| Oxidant | Metal ion | pH | Temp. of polymerization, °C. | Percent weight increase |
|---|---|---|---|---|
| $H_2O_2$ | $Ni^{++}$ | 5.4 | 95–100 | 19.0 |
| $H_2O_2$ | $Co^{++}$ | 5.9 | 95–100 | 11.6 |
| $H_2O_2$ | $Sn^{++}$ | 1 to 2 | 95–100 | 36.7 |
| $H_2O_2$ | $Ag^+$ | 6.9 | 95–100 | 90.1 |
| $H_2O_2$ | $Pb^{++}$ | 5.5 | 95–100 | 46.7 |
| $H_2O_2$ | $Zn^{++}$ | 4.6 | 95–100 | 30.9 |

The metal ions listed in the table above were present as parts of the following compounds: $Co^{++}$ as cobaltous acetate, $Sn^{++}$ as stannous chloride, $Ag^+$ as silver nitrate, $Pb^{++}$ as lead acetate and $Zn^{++}$ as zinc chloride.

*Example 167*

This example shows that both organic and inorganic catalyst systems may be used for deposition.

In this example and Example 169, vinyl pyridine was deposited into cellulose film using a variety of metal ions and oxidants.

Strips of cellulose film were steeped in 50 ml. of 0.7 percent solution of $Ti^{+++}$ as $TiCl_3$ for 5 minutes. The pH of the solution was 1.3. The strips were then removed, washed with three 50 ml. portions of water to remove any excess of $Ti^{+++}$ not bound to the film by ion exchange. The strips were then placed into 500 ml. of water containing one percent of 2-vinyl pyridine, heated to reflux temperature and made 0.03 percent with respect to di-tert-butyl peroxide. The solution was refluxed for 1½ hours, after which the strips were removed, washed with water, dried and permitted to come to weight equilibrium in a dessicator. The increase in weight was 25.4 percent.

The same procedure was followed except silver nitrate was substituted for $TiCl_3$ and $H_2O_2$ was used as the peroxide. With a reflux time of ¾ hour the increase in weight was 43.9 percent.

The same procedure was followed except that $Zn^{++}$ as $ZnCl_2$ was substituted for $Ti^{+++}$. The pH of the solution was 4.6. Two peroxides were used. With tert-butylhydroperoxide a 134.2 percent increase in weight was obtained in ¾ hour, and with cumene hydroperoxide a 117.1 percent increase in weight was obtained in ½ hour.

VARIOUS ADDITIONAL MONOMERS

Besides the unsaturated monomers hereinbefore listed, it will be clear to those skilled in the art that other monomers may be used, as for example allyl, vinyl, acryl and methacryl monomers containing various functional groups, and including those having primary, secondary or tertiary alkyl groups.

*Example 168*

The following table summarizes the percent weight increase obtained with deposition of methyl acrylate into nylon cord with the same method as described in Example 167, for the various experimental conditions specified:

TABLE 17

| Monomer, percent weight | Cation | Redox system, pH | Anion | Pretreatment of nylon | Steeping period, min. | Reaction [1] conditions | | | Percent weight increase |
|---|---|---|---|---|---|---|---|---|---|
| | | | | | | pH | Time, hr. | Temp., °C. | |
| 1.0 | | 7.3 | $Fe(CN)_6^{4-}$, 0.7% Fe | | 5 | 4.4 | 1.5 | 85–95 | 0.3 |
| | | | $Fe(CN)_6^{4-}$ | 5% NaOH, 60–65° C., 30 min | | | | | 3.8 |
| | $Fe^{++}$, 0.7% Fe | 4.7 | | | | | | | 1.48 |
| | $Fe^{++}$ | 4.7 | | 5% NaOH, 60–65° C., 30 min | | | | | 0.80 |
| 5.0 | $Fe^{++}$ | 4.6 | | do | | 4.7 | 1 | 80–90 | 91.3 |
| | $Fe^{++}$ | 4.6 | | | | 4.7 | | | 53.8 |
| | | 8.4 | $Fe(CN)_6^{4-}$ | | | | | | 31.9 |
| | | 8.4 | $Fe(CN)_6^{4-}$ | 5% NaOH, 60–65° C., 30 min | | | | | 46.1 |
| 3.0 | | 3.8 | Levulinic acid (from Eastman Kodak), 0.7% acid. | | 5 | 5.1 | 1 | 80–90 | 16.5 |

[1] 0.03% $H_2O_2$.

*Example 169*

This example discloses the deposition of polymers of 2-vinyl pyridine into cellulose film with various catalysts and reaction conditions.

Strips of cellulose film weighing 0.2 gram were steeped in 0.1 percent $Fe^{++}$ solution (as ferrous ammonium sulfate) for 5 minutes at a pH of 5.4. The strips were removed and washed as previously described and placed in 500 ml. of water containing 1.7 percent 2-vinyl pyridine. After heating to reflux temperature sufficient $H_2O_2$ was added to the solution to make it 0.003 percent with respect to $H_2O_2$, and heating was continued. The cellulose strips were periodically withdrawn, washed, dried, and weighed as previously described.

The increases in weight after several time intervals are shown below:

Reflux time, min.:        Increase in weight percent
10 _____ 3.7
15 _____ 13.3
30 _____ 51.9
60 _____ 89.9
120 _____ 91.0

Substituting $Cu^+$ for $Ti^{+++}$ (as $Cu(NH_3)_2^+$) in the procedure described above (the pH of the solution was 12.1) and using 0.003 percent $H_2O_2$ as the oxidant, an increase in weight of 7.5 percent was noted after one hour and of 24.4 percent after two hours.

Substituting $Ni^{++}$ for $Ti^{+++}$ (the pH of the solution was 7.5) and using 0.003 percent $H_2O_2$ as the oxidant gave an increase in weight of 5.2 percent after 15 minutes, 22.8 percent after 30 minutes, 23.7 percent after one hour and 28.5 percent after two hours.

It is of interest to deposit polymers of 2-vinyl pyridine into cellulosic or other host phases because it is a basic polymer which cannot be extracted from the host phase.

Among the uses to which the resulting polymer-modified materials might be put are—

In the form of films:

(1) Weak base, strong anion exchange membranes that can have widely varying exchange capacities.

(2) The starting material for making a strong base anion exchange membrane, by partial or complete quaternization of the deposited polymer.

(3) Membranes for holding "insoluble" pyridine that can take part in many of the chemical reactions that poly 2-vinyl pyridine can take part in. Coordination complexing with cations is suggested.

(4) Insolubilizing cellulose beads, threads, bonds, and any shaped article.

(5) The deposited basic polymer can be used to achieve dyeing of the host phase with acid dyes.

In the form of fibers:

(1) Ion exchange fabrics, felts, bats, etc.

(2) Dye receptive group.

(3) Catalysts.—Films, beads, bands, threads, and any shaped object may find a similar application.

*Example 170*

This example illustrates the deposition of a polymer that is capable of forming coordinate complexes with a variety of substances. The film containing this polymer may be used as a reagent paper, a semipermeable membrane, an adsorbent, etc.

The same method as used in Examples 167 and 169 was employed in this example. Steeping the film in 0.1 percent $Fe^{++}$ solution (as ferrous ammonium sulfate) at a pH of 5.0 followed by polymerization in 1.5 percent aqueous solution of N-vinyl pyrrolidone containing 0.003 percent $H_2O_2$ gave an increase in weight of 1 percent after 15 minutes, 2.1 percent after 30 minutes, 3.2 percent after one hour and 4.6 percent after two hours.

Substituting $Ni^{++}$ for $Fe^{++}$ gave an increase in weight of 1.9 percent after one hour and 2.7 percent after two hours.

The deposited polymer is capable of complexing dyes and biologically important organic substances.

*Example 171*

This example shows deposition of polyvinylidine chloride into cellulose film from acetone and ethyl alcohol solutions.

In this example the method of Example 146 was used, except that a $Ni^{++}/H_2O_2$ catalyst, a 5 percent concentration of vinylidine chloride and a reaction time of one hour, at the reflux temperature of acetone, were employed.

The deposition of polymer amounted to about 2.5 percent. A $Fe^{++}/H_2O_2$ catalyst gave an increase in weight of only 1.5 percent under the same conditions.

Ethyl alcohol was a better solvent for the deposition of polyvinylidine chloride into cellulose film. A 7 percent weight increase was obtained using the same procedure as just described, except with either a $Fe^{++}/H_2O_2$ or a $Ni^{++}/H_2O_2$ catalyst, and a reaction time of one hour at 55–60° C.

*Example 172*

This example illustrates the deposition of a monomer as polymer when the monomer is a non-conjugated diene.

0.200 gram of sulfur-free regenerated cellulose film was steeped at 1:200 liquor ratio in 0.7% ferrous ammonium sulfate at 25° C. for five minutes and then washed three times for two minutes each time in distilled water to remove unbound iron. The film was placed in a 1% suspension of 4-vinyl cyclohexene at reflux and enough hydrogen peroxide was added so that its concentration in solution was 0.03%.

When the mixture was allowed to reflux for ten minutes, the cellulose removed, washed in methanol and dried to constant weight at 95° C. under vacuum, the cellulose film had increased in weight by 1.5%.

VARIATIONS IN STEPS OF METHOD OF THIS INVENTION

Variations in process steps are of course included in this invention.

Thus, for example, localization of the deposition of a guest polymer to the outer layers of a formed host polymeric structure can also be achieved in the case of a polymer which initially contains few or no ion exchange groups. Before ion exchange with an article composed of a material such as a nylon, a condensation polymer, an acrylate, methacrylate, or other polymeric ester, the surface of the article may be etched, to effect hydrolysis or saponification, so that ion exchange groups are released on the surface and in the surface layers. These groups may be used to anchor a catalyst and to deposit a different polymer in the surface layers, as where hardening of the surface is desired.

While my preferred technique of anchoring a catalyst to a polymeric material and subsequently depositing a guest polymer in the polymeric material has special advantages for deposition in the liquid phase, it is not of course limited thereto. Thus exposure to monomer vapor, or to monomer vapor plus the second member of the redox couple, of a material in which catalyst placement has been localized to the outer portions of the article can give rise to localized deposition.

Nor need the ion exchange bonding of catalyst be from a liquid phase. For example, the reducing or oxidizing or radical-producing material may be anchored from the gas phase as in the anchoring of ammonia, hydrogen sulfide or sulfurous acid into and/or onto strong acid or basic containing materials.

Though dilute solutions of monomers are generally used since their use entails less waste in washing, the invention is not limited to the use of dilute solutions only. Concentrated aqueous or organic solutions or dispersions may be used, as well as the pure monomer in which the catalyst members need be soluble only if a redox couple is used.

The number of successive treatments of the polymeric material by the process of my invention is not limited. Thus, a film or other article may have polymer "A" deposited into it by the process of this invention, and if the structure is still permeable to a medium which dissolves ions, the original catalyst may be removed and more new catalyst exchanged into the phase and the same or a different polymer "B" added. And it is clear of course that the same catalyst system need not be used in both cases.

One might not use up all the exchange capacity of the polymeric material in the first catalyst impregnation. In such a case one could then, in the second treatment, use the remaining ion exchange capacity to bind the same or another catalyst in order to deposit the same or another polymer. A gel or solid polymer containing ion exchange groups, particularly if it is a hollow article, may have a polymer deposited away from the outside of the object. For example, a cellulosic film tube may be thoroughly impregnated with the catalyst cation and the cation of the surface layer may be removed by washing for a controlled time with an acid or base solution, or by inactivation of the catalyst bound to the outer layers by processes such as oxidation or reduction. The active catalyst remaining in the interior of the gel is then used to deposit a guest polymer in the interior of the gel phase, in this instance near the inside surface of the cellulose tube.

With respect to the localizatio nof polymers by their deposition into cellulose or other films, a number of variations are possible. Thus, a catalyst cation may be permitted to diffuse in from one side of the film to only a limited extent. Printing with a catalyst solution can be used. The film is then placed in the monomer solution or the monomer solution plus another member of the redox couple, if redox catalyst is being used. After polymer deposition the procedure may be repeated from the other side of the film using a different monomer and the same or a different catalyst.

A variation of this technique of controlled localized deposition is further illustrated as follows: One starts with a flat film, allows diffusion of catalyst cations to take place all the way into the film and then washes out the catalyst from the outer layers of both sides with the free acid wash. Polymer deposition will then occur mainly near the center of the film where active catalyst still remains.

Alternatively, one can treat a cellulose tube and permit catalyst diffusion especially in the cellulose gel, and then wash out the catalyst near the outer layers before the polymer deposition step.

A further variation is illustrated as follows: A catalyst ion is deposited by control diffusion into a layer of cellulose film, polymer deposition occurring until all "free space" is used up, followed by catalyst diffusion into the opposite layer and polymer deposition until all of that space is used up.

Two different polymers can if desired be deposited more or less uniformly throughout the thickness of the cellulose film. The two different polymers can be introduced either by introducing the catalyst treated film into a mixture of monomers which would homopolymerize but which would not interpolymerize, or by doing the deposition in two steps. Either the residual catalyst could be used in the second step, or reimpregnation of the catalyst could be used.

While in most cases the ion that is bound to the host material is a polymerization catalyst or an essential member of a polymerization catalyst system that is a catalyst at the temperature or under the conditions of ion exchange, the method of this invention can be used to bind an ionic species that becomes a catalyst at a higher temperature, in a different solvent, at a different oxidation state, etc. It may be merely that its locus was determined by the ion exchange or ion neutralization step.

Other treatments either physical or chemical can come before, during, between, or after the essential steps of this invention. If these treatments on the average do not remove the bound ion from its site determined by a salt linkage or if they do not prevent the polymerization step they may be used.

Ion exchange for bonding of catalyst may take place during polymer deposition if some polymerization outside the host material is desired or permissible.

Successive depositions with the same or a different monomer may be made with the same host material with a storage period between the depositions. If unused bound catalyst in the host material is to be used for the next deposition the period of time that can intervene will depend on the stability of the residual catalyst cation or anion.

While most of the examples show the stoppage of polymer deposition by washing out the monomer from the host material, washing out catalyst, or lowering the temperature, other methods of stopping olefinic polymerization known in the art may be used.

Monomer may be present during ion exchange bonding of the catalyst or one component of the catalyst system.

In the case of deposition of polymer into a host material containing both cation and anion binding sites, deposition of one polymer may be made using one type of site and the same or a different polymer using the other type of site to bind a catalyst. Proteins constitute a major class of this type of host material.

If binding of the ionic catalyst with chemical groupings within the host material is desired, then the catalyst or solvated catalyst must be small enough to enter the host material and form a bond. The choice of caalyst may be made to permit this or the host material may be swollen to permit entrance both of the catalyst species and the monomer that is to be polymerized. Since the initiating species are produced near the catalyst binding site and are usually too reactive to diffuse far, the monomer must be able to diffuse near and orient itself with the initiating species.

A low or high molecular weight substance that contains groupings capable of ion exchange may be mixed with a potential host in any way known to the art. The mixture can then be used for polymer deposition of a guest polymer from monomer.

Other orders in the steps of the invention are to impregnate the host material with monomer, perform the ion exchange with catalyst ion, and then, if necessary add the remainder of the catalyst system. The monomer and the oxidant could be added to the host material at once, then the reducing agent. The oxidizing and reducing agents may both be added if not destroyed too fast, then the monomer host.

GENERAL CONDITIONS FOR ION EXCHANGE

While the conditions required to obtain ion exchange with ions attached to both weak and strong acid groupings, as well as both weak and strong base groupings, are well known in the art, the exact conditions required for the most efficient exchange in a particular case would have to be determined by simple routine tests.

Generally speaking, a weak acid will make it necessary to work in a weakly acid or a nearly neutral solution of the cation which it is desired to attach to the weak acid group (such as the carboxylic acid group in cellulose). For a dilute solution of the cation and a low exchange capacity of the gel phase, a pH range of about 3.5 to 7.0 is preferred; however, pH levels above 7 can be used providing the cation will remain in solution for an appreciable time at such a pH. As the concentration of cation in the solution becomes high, for example above 5%, the acid concentration which can be permitted, while still obtaining exchange, increases.

To obtain exchange of anion in the case of a weak base, like an amino group in aminoethyl cellulose (or the amino or other weak base groups in wool, silk or the like), it is generally necessary to work in an acid solution. Alternatively, if the rate of hydrolysis of the weak base salt is not too high, one could work at low temperatures, soon after the amine salt was formed. Normally, with an amine group of the strength which is found in wool, there is no appreciable anion exchange above a pH of 4.

It has been observed that as the strength of the acid group increases, the amount of acid which is permissible in the solution of the cation, while still getting exchange, also increases. Generally the pH can also be somewhat lower as the concentration of the exchanging cation solution increases. The catalyst cation and the hydronium cation are competing for exchange, so that the extent of exchange will depend upon both strength of the acid group and the amount of the foreign cation which is competing for exchange.

When the ion exchange group is a strong acid or a strong acid salt, ion exchange can occur in a relatively strong acid solution even with relatively low concentration of the catalysts cation. Thus, with a divalent catalyst cation, like ferrous iron or manganous ion, one could get some exchange at a pH of 1 or below; using a trivalent catalyst cation like titanous, the amount of acid allowable while still getting exchange would be still greater.

If there is a strong base group in the ion exchange material, one can get an appreciable anion exchange at a much higher pH than is possible with a weak base anion exchange. Thus with a group like tetra-alkyl group, one can obtain exchange in a pH of 10 or higher; in such a case, the exchange equilibrium is a competition between the anion in question and the hydroxyl anion. In the case of a divalent anion, like trithiocarbonate, it is possible to get a quantitative exchange with the strong base group even in the presence of as much as 7% sodium hydroxide. A trivalent anion would probably give an even more favorable exchange.

From the above, it is obvious that the pH condition necessary to achieve ion exchange bonding to the cellulose, or other polymer containing such groups of a catalyst cation or anion can be established by means of simple tests with the above described general principles in mind.

LOW FREE-SULFUR CONTENT IS DESIRABLE

With particular reference to the deposition of polymers into cellulose gels in accordance with this novel technique, it is desirable to use cellulose gels having a low free-sulfur content.

This is because the presence of relatively small amounts of free sulfur in the cellulose gel can inhibit the polymerization reaction and require an impractically lengthy induction period. The existence of an induction period would be particularly inadvisable in those situations where polymer is being deposited into the outer layers of a cellulose gel and it is desired to effect a deposition of a high concentration of polymer in a very short time, as in a continuous process.

If the concentration of free sulfur in the cellulose product which is to be treated in accordance with my invention is unduly high (for example, if it is about 200 p.p.m.), it may be removed by suitable treatment with sodium or ammonium sulfide, in accordance with techniques well known in the art. In this way, the free sulfur content of a regenerated cellulose film can be reduced to 10 p.p.m. and even lower, in which case the deposition of a polymer such as polymethyl methacrylate into the film shows no discernible induction period.

Different monomers will, of course, have different or perhaps no sensitivity to sulfur, and the amount of sulfur which can be tolerated in the cellulose film will depend upon the monomer used and the time which is allowable for the deposition process.

TEMPERATURE AND REACTION TIME FOR METHOD OF THIS INVENTION

The temperatures which can be used in practicing my invention will vary, of course, depending upon the speed of reaction desired, the catalyst concentration in the gel phase, the molecular weight desired in the polymer deposited into the exchange-group-containing-phase (the molecular weight being generally lower for an increase in temperature), upon the solubility of the monomer, the heat stability of the phase into which the polymer is being deposited, the oxidation ability of the phase into which the polymer is being deposited, and the rate of change of activity of the catalyst system with temperature.

Thus, a material such as wool which is a much denser gel phase than is regenerated cellulose, will require a longer steeping time at a given temperature because the rates of diffusion of ions into cellulose will be much higher than into the dense wool protein phase. The rate of exchange can of course be increased by increasing the speed of diffusion of ions into the gel by increasing the temperature of steeping.

The solvent which is being employed will also have an effect on the time of reaction; thus, at a given ionic concentration, the exchange rate in alcohol, generally, will be lower than when water is used.

If it is desired to limit deposition to an outer layer of the host material, then the diffusion is permitted for only the length of time which will permit ions to diffuse into, and exchange with, the groups in the outer layers of the gel. In the case of a cellulose gel film about 2.5 mils in thickness, exchange with the ferrous solution is usually complete in less than a minute. Generally speaking, in the case of cellulose it is easier to exchange a sodium ion attached to the carboxyl group for the ferrous ion, than it is to exchange it for the hydrogen ion attached to the carboxyl group.

The time of exposure will of course also depend upon the thickness of the article to be impregnated or the depth to which one desires polymer deposition to take place. Minimization of polymerization in the solvent phase can be effected by doing the steeping and the polymerization at the same temperature.

MARKEDLY LOW MONOMER WASTE WITH METHOD OF THIS INVENTION

The amount of monomer waste which occurs in the process of this invention is markedly less than in prior art attempts at deposition of polymers into a phase from solution or suspension.

Most of the time, in the present process, no wastage occurs at all. This is particularly true when the ion exchange group is a strong acid or base in which the loss of catalyst by hydrolysis is minimized. However, even in the case of weak acid or weak base groups, polymerization of polymer in the solution can be minimized and even completely eliminated by working at low temperatures.

CONCENTRATION OF VARIOUS REACTANTS

Obviously, no hard and fast limits can be placed upon the concentrations of catalyst solutions, ion exchange group concentration in the gel phase, or the monomer concentration in the solvent or vapor phase outside the phase into which deposition is desired. It is pointed out in this connection that the rate of polymer deposition can be controlled to some extent by controlling the concentration of ion exchange groups and therefore, the concentration of the catalyst in the gel phase. Concenration of the cation or anion to be used in the steeping liquor will depend upon the equilibrium constant in the exchange between the catalyst ion and that ion already attached to the ion exchange group in the gel phase.

Uusually, solution 0.1% or less in the catalyst anion or cation will be found effective. Such dilute solutions have several advantages: they show a selectivity for exchange with reference to the ion exchange group, and, in the case of divalent or trivalent cations, they can be kept in solution wtih lower concentrations of acid; also such solutions permit economy with reference to wastage in washing out the excess.

The restriction of deposition by ion exchange to a given phase in accordance with the method of this invention is not limited to aqueous systems, since ion exchange in non-aqueous systems can also occur.

Due to the large number of combination of concentration of catalysts, ion exchange group concentration in the gel phase, monomer concentration, time and temperature factors possible under the present invention and the wide variety of products which it is possible to produce in accordance therewith, it is not feasible to attempt to set forth the exact operating conditions for each product possible of being produced. The examples hereinbefore set forth will serve as a guide and those skilled in the art will have no difficulty in determining through suitable preliminary tests which particular conditions of treatment are best suited to obtain the products they desire.

VARIOUS TYPES OF PRODUCTS MADE BY THE METHOD OF THIS INVENTION

The technique of this invention is applicable to the production of and improvement of many articles and products such as those heretofore mentioned. For example, by the use of this invention I may produce a fibrous casing having deposited within the paper phase near the interior surface and on the interior surface thereof polymers such as methyl, ethyl, propyl, butyl, amyl, hexyl, heptyl, octyl, nonyl, and deca alkyl acrylates and the methacrylates. Such products are characterized by the fact that they have less adhesion to meat which may be encased therein.

The practice of this invention may also be used to produce, for example, a cellulose casing to whose outer layers has been deposited an amino acrylate or methacrylate and which is anchored to a polymer coating by means of a diisocyanate; the amino compound may include, as an example, beta-amino ethyl acrylate and methacrylate and the like. The plastic or rubber polymer coating includes those containing an active hydrogen atom capable of reacting with the isocyanate group. Regenerated cellulose films and fibrous films which have been made hydrophobic with the deposition of a hydrophobic polymer may be coated with polyethylene.

A laminate may be produced by depositing a polymer within a cellulose or cellulosic material and embedding the thus treated sheet or film in more of the same or similar polymer. Examples of the foregoing are the treatment of wood or plastic sheets with the monomers used in the practice of this invention, and embedding them in the pre-formed plastic material.

Cellulose films may be modified by deposition of a basic polymer throughout or within the surface layers and then dyed with an acid dye to make a fast dyeing. Likewise an acid polymer may be deposited into the cellulose and a basic dye used.

By the practice of this invention polymer films may be treated by depositing therein an appropriate polymer in order to adjust the gas permeability of the polymeric film to a desired value. Likewise I can produce plastic films whose dialysis permeability has been adjusted to a predetermined value by the controlled deposition of another polymer within the first.

Film which is suitable for use in the production of laminates of the type described, for example, in U.S. Patent No. 2,679,968 and U.S. No. 2,679,969 may be produced by depositing to the surface of a polymer film another polymer so that the electrostatic charge on the first said film is controlled in order to increase the cohesion between the films.

The technique of this invention may also be utilized in producing an electrically non-conducting polymer into which has been deposited, by means of printing on the polymer a deposit of catalyst in the form of a printed circuit, an electrically conducting polymer.

The method of this invention is useful in effecting a substantial improvement in cellulose and other plastic film with respect to such important characteristics as printability, adhesion to other materials, heat sealing, decrease in moisture vapor permeability and decrease in static charge. This process may be used with good results to improve the wet strength, dry flexibility and grease proofness of paper and the like. It will also be seen that fibers of many types can be improved with respect to their dyeing qualities, extensibility, tensile strength, elasticity and resistance to moisture or chemical attack, by treatment of the fibers as per my novel method. The process is likewise applicable in effecting improvements in certain characteristics of wood so as to effect an increase in its resistance to weathering, rot and the like.

In accordance with the process of this invention, I am able to produce a novel cellulose film which has deposited within the gel phase or localized at the surface layers, polymers of such compounds as ethyl acrylate; p-chlorostyrene; 2,5 dichlorostyrene; N,dimethyl amino ethyl acrylate; n-butyl acrylate; n-octyl acrylate; n-butyl methacrylate; allyl acrylate; beta-amino ethyl acrylate, and methylene bis acrylamide.

Application of polyethylene by "melt coating" techniques onto cellulose can be facilitated in accordance with this invention by first applying to the surface layers of cellulose gels, thin layers of a rather non-polar molecule like polybutylacrylate, methacrylate, or somewhat higher esters, which are mixed with the cellulose molecules and become a "primer" coating. The hydrocarbon chains of acrylic or methacrylic esters being miscible with the polyethylene above the melting range of the higher esters would permit good adhesion. This same technique is also applicable to the lamination of other materials, which are chemically dissimilar; good adhesion, which is otherwise not achievable, being obtainable with my technique.

Cellulose sponges may likewise be treated in accordance with this invention so as to contain a homogeneous dispersion of a material such as poly ethyl acrylate, poly n-butyl acrylate, poly n-octyl acrylate, poly n-butyl methacrylate, and the like.

A weather resistant and rot resistant wood can be prepared by depositing thereon in accordance with the technique of my invention a polymer derived from pentachlorophenyl acrylate.

Gels of various kinds can also be prepared containing depositions of various polymeric materials. Thus agar agar gels can be prepared having deposited on the surface thereof or in the gel phase, a deposit of a material such as polyacrylonitrile, polymethyl methacrylate and the like. Calcium alginate gels may be prepared having deposited in the gel phase or on the surface such materials as polymethyl methacrylate, polyacrylonitrile, polymethyl acrylate, polyethyl acrylate.

By use of the method of this invention host and guest polymers can be rendered mutually insoluble in their ordinary solvents throughout the volume of the host material or in only one portion of this volume.

A shaped gel structure containing ion binding groups may be used as a "mold" for the deposition of the guest polymeric material in accordance with the method of this invention. If the gel is a relatively dilute one, then the resulting host-guest composite may be mostly guest polymer so that this is a means of forming a structure without passing the bulk guest polymer through a molten or plastic state. For heat sensitive guest polymers or those that may be dissolved only in expensive solvents, this process may be of interest.

Since the method of this invention depends upon the chemical nature of the host material rather than its physical form, the deposition may be made into films, fibers, granules, papers, batts, molded structures or any formed article.

The uniform deposition or controlled localized deposition can lead to synthesis of films, membranes, papers, mats, fabrics, batts, beads, and the like that have various amounts of polymers deposited into them where the guest polymer is capable of ion or electron exchange. Thus the host formed structure can be modified by various amounts of polymer add-on so that the space remaining for diffusion of anions or cations into the ion exchange bead, membrane, or fabric is limited so that only those below a certain size will exchange.

Examples of ion exchange membranes that are strong are cellulose fibers with polyacrylic acid or polyvinyl pyridine deposited into them.

The localization aspect of the process of this invention permits the manufacture of novel films or fibers where an acid polymer is deposited at one site and a basic polymer at another site in a host film or fiber. Alternatively, sheath deposition of two different polymers into the two sides of a film is possible.

The films with both anion and cation exchange sites will have use in chemical separation, synthesis, analysis, differential dyeing, and so forth.

Films into which acid or basic polymers have been deposited in accordance with this invention may be used for catalysis. Since a wide range of polymers can be deposited into a host film or bead, a wide range of acid or basic strengths in the film is available. Also, since the steric factors can be controlled, the possibility of catalyzing the reaction of only one of a mixture of molecules where some cannot enter the resin is present.

The guest polymer may itself contain chemical groupings capable of ion exchange, oxidation-reduction, complex formation, or other chemical reactions. Thus the guest polymer deposited into the host in relatively low concentration by the method of this invention (*a*) may serve as the locus for binding catalysts for a subsequent deposition of a second polymer alternatively, or (*b*) may contain chemical groupings that can participate directly in catalyst systems.

Dialysis beads, membranes, fibers and the like can be made using the method of the present invention by insolubilizing the surface or surface layers of gels of low solids content.

The guest polymer deposited in accordance with this invention may be used in additional reactions after deposition into the host article. Thus a deposited polymer may make one component of a coupled dye. An unsaturated guest polymer may take part in reactions of its residual unsaturation of types well known in the art.

Thermoplastic host materials can be used for deposition of a guest polymer that can cross link physically or chemically to increase the softening point of the host article. Deposition of a guest polymer of high melting point can give rise to a rigid gel above the liquefaction temperature of the host material.

Polymer deposition in accordance with this invention may serve as a preliminary step before or as an intermediate step in other processing of articles. Thus, a fiber or yarn may have its surface modified to change its weaving characteristics. Polymer deposition may serve as an intermediate coating or surface modification of a film or fiber for coating with the same or a different separately formed polymer or resin coating.

Dialysis membranes, gas mixture resolving membranes, packaging films, and the like may be insolubilized by use of the method of the instant invention so that they may be used in media in which the host material would dissolve.

Sorbants may be modified by polymer deposition uniformly or in a controlled non-uniform manner in accordance with this invention to include or exclude solvents or other materials sorbed as in chromatographic sorption.

The surface-layer and interior-layer deposition of a polymer into a host film by use of the method of this invention permits the making of novel bases for photosensitive materials or even films that contain a localized deposition of a guest polymer that is itself photosensitive.

The deposition process of this invention permits the intimate "mixing" of two or more polymers that do not have a common solvent or dispersion medium. Thus a formed structure can be made of the polymer most easily formed and one or more additional polymers introduced as the monomer and polymerized in situ.

As heretofore mentioned, one of the distinguishing characteristic or features of this invention lies in the fact that it permits limiting the deposition of a polymer to the surface layers or gel phase of the materials being treated. By this method, I am therefore able to produce cellulose film, for example, having deposited in the gel phase or on the surface layer thereof, such materials as poly styrene, methyl methacrylate, polyvinyl acetate, polyacrylonitrile, poly acrylic acid, poly methacrylic acid, and poly acrylamide. Polyethylene film having a surface deposition of poly methacrylate can also be prepared in this way.

Animal fibers, particularly wool, can be treated so as to have deposited in the gel phase or at the surface thereof, a deposit of such materials as poly acrylic acid, poly methyl metharylate, and poly acrylonitrile.

Improvments in the characteristics of paper can be secured by treating the paper in accordance with my invention so as to secure thereon a localized deposition of a polymer such as polybutyl acrylate, polybutyl methacrylate, polymethyl methacrylate, polyvinyl acetate, and polyacrylonitrile.

Silk may also be advantageously treated in accordance with the method of my invention so as to secure a localized deposition, either in the gel phase or at the surface, of such polymeric materials as polyvinyl acetate, and polymethylmethacrylate.

Film materials which are to be used as wrappings or "casings" for food products such as cheese, meat, including sausage and the like, can be prepared by treating the film material, for example the regenerated cellulose casings of commerce, in accordance with the hereinbefore described methods to modify the moisture-proofness, printability and other characteristics of the base film.

It is to be understood, of course, that monomer mixtures can be used for polymer deposition. Examples of such copolymerizations encompassed within the present invention are those illustrated by, for example, acrylonitrile-styrene into cellulose; acrylonitrile-ethylacrylate into wool; vinylacetate-ethylacrylate into cellulose, to mention a few.

Examples 173 through 178 below illustrate additional types of products that may be made by use of the method of this invention.

*Example 173*

This example shows the use of polyacrylonitrile to insolubilize water-soluble polyvinyl alcohol that has one percent carboxymethyl cellulose mixed with it.

One hundred grams of Du Pont "Elvanol" grade 71–52 polyvinyl alcohol powder were sifted into 900 milliliters of rapidly stirred distilled water at 18° C. The Elvanol is a 99+ percent hydrolyzed high viscosity polyvinyl alcohol. One gram of Hercules Powder Company's high viscosity sodium carboxymethyl cellulose was also sifted into the rapidly stirred slurry. The beaker contents were heated under a low temperature gradient. A gray-green clear solution of high viscosity resulted.

The polyvinyl alcohol-carboxymethyl cellulose solution was left to deaerate.

A second smaller preparation was made similarly but without the carboxymethyl cellulose. This small sample of 50 grams was used to prepare films which were tested for ion exchange capacity and which also served as controls in the experiments.

Water soluble polyvinyl alcohol and polyvinyl alcohol-carboxymethyl cellulose films were made.

About one gram of film was cut into small pieces and placed in 300 milliliters of 0.7 percent ferrous ammonium sulfate at pH 5.4 and 26° C. The mixture was shaken frequently for twenty minutes. The solution was then decanted and the film pieces were batch-washed five times for twenty minutes each time with distilled water at pH 5.4. The films were extracted for thirty minutes with 0.05 normal nitric acid. Any ferrous iron present in the extract was oxidized to ferric iron with potassium permanganate and ten percent ammonium thiocyanate was added. Only a faint trace of pink ferric thiocyanate complex was noted. Since the thiocyanate test has a sensitivity of about 0.05 part per million the polyvinyl alcohol is substantially free of ion exchange capacity.

The ion exchange capacity of the carboxymethyl cellulose modified polyvinyl alcohol films was estimated by the Neale procedure. The films were found to have an exchange capacity of 0.047 milliequivalent per gram of dry film.

The films were placed in hygrostats at 65 percent relative humidity for three days. At this time they contained 8.72 percent water. By knowing the water content it was possible to use each film for polymer deposition without predrying to establish basis weight. Drying each film for complete removal of water at high temperatures risks partial or complete insolubilization of the film.

The polymer deposition procedure was as follows. A small pilot piece of CMC-polyvinylalcohol weighing about 0.5 gm. and a large piece of CMC-polyvinylalcohol film were placed in 1.0% ferrous chloride solution for cation binding and washed. They were then placed in a mixture of 10 ml. of acrylonitrile, 150 ml. distilled water, and enough potassium persulfate was added so that its concentration in solution was 0.02%.

The two pieces were left in monomer under air at 25° C. for 48 hours. When they were washed and the pilot piece was dried it had increased in weight by 11.5%. It was insoluble in water at 90° C. even after two hours immersion. The control CMC-polyvinyl alcohol film and the ferrous-iron-treated film were soluble in water at 60° C. within ten minutes.

It should be noted that the deposition of polyacrylonitrile into a mixture of polyvinyl alcohol and carboxymethyl cellulose will give rise to a fundamentally different composition than would arise had the catalyst binding groupings been attached to the polyvinyl alcohol backbone. This would be true even at equivalent ion exchange capacities in the two compositions. By mixing sodium carboxymethyl cellulose with polyvinyl alcohol a substance with a very high exchange capacity (ca. three milliequivalents per gram) is being mixed with a material possessing almost no exchange capacity.

This means that the potential catalyst anchoring sites are constrained to be in a specific and limited special relationship to each other that is not random at the molecular level. The distribution of anchoring sites in cellulose and in many other polymeric materials can be considered random especially if they have been regenerated from solution.

*Example 174*

This example and the next two examples show that the idea of mixing a cation binding polymer with a potential host material can also be applied to increase the ion exchange capacity of cellulose that already contains chemical groupings capable of cation exchange. This was achieved by mixing sodium carboxymethyl cellulose with viscose before films were cast to serve as host starting materials.

A one percent solution of Hercules high viscosity sodium carboxymethylcellulose in distilled water was made by sifting the powder into stirred water. The initial dispersion was allowed to stand overnight to complete solution. Fifty grams of this solution was mixed in a Waring Blendor with 450 grams of viscose for thirty minutes. The viscose was then deaerated for five hours as a layer two inches thick and then was placed in the refrigerator overnight. At the time films were cast the modified viscose had a maturity index of 10.8.

A drawbar was used to cast films on a glass plate and a coagulation bath was used to coagulate the films at 40° C. for one minute. The films were regenerated in cold five percent sulfuric acid and washed in hot tap water for one hour to remove most of the colloidal sulfur. The films were completely desulfured in 0.3 percent ammonium sulfide, washed once in tap water, twice in deionized water and once in distilled water. The carboxylmetal salt in the carboxymethylcellulose-cellulose (from tap water) was displaced in 0.1 normal acetic acid and the film was washed until the wash water pH was 6.5.

Equal weight increments of film were secured by cutting disks with a hardened steel die and grading the disks by thickness into uniform groups. Several disks in each group were dried under vacuum at 95° C. for six hours and weight variations among the disks were ±0.5 percent relative.

A few pieces of carboxymethylcellulose-cellulose film were dried to obtain the dry weight before polymer deposition. This procedure was avoided in most cases because the rewet gel film was of lower swelling volume than the film that had never been dried. This rewet film would also have smaller pore size than the undried disks whose basis weight was known. The disks used for polymer deposition were not heated so that chemical reactions between cellulose and the carboxymethylcellulose would be improbable.

The ion exchange capacities of the control cellulose films were estimated by two methods which checked. The control film capacity was 0.024 milliequivalent per gram while the carboxymethylcellulose-cellulose film capacity was 0.072 milliequivalent per gram.

Carboxymethylcellulose-cellulose films were steeped in ferrous ion solution and washed as usual. They were then dropped into a mixture of 200 milliliters of distilled water and 15.0 milliliters of pure styrene monomer at 90° C. The solution was adjusted to 0.01 percent hydrogen peroxide and reflux was continued under air for thirty minutes. The films were removed and washed in warm methanol to remove styrene monomer. After washing in water and drying the film contained 31 percent polystyrene.

*Example 175*

Carboxymethylcellulose-cellulose film disks in the acid form were steeped in one percent hydrazine hydrate solution for five minutes and washed three times in distilled water. The film was dropped into 200 milliliters of five percent (v./v.) methylmethacrylate in distilled water at 85° C. Enough hydrogen peroxide was added so that its concentration in the aqueous phase was 0.03 percent and reflux was continued for ten minutes.

The product when washed and dried contained 62 percent polymer.

*Example 176*

Carboxymethylcellulose-cellulose was dried at 95° C. under vacuum for fifteen hours and placed in a stoppered Erlenmeyer flask containing 200 milliliters of methanol (A.C.S. Reagent Grade) from a freshly opened bottle and was left to soak for four hours at 25° C. Then 5.0 milliliters of piperidine were added and the system was allowed to stand with shaking for thirty minutes. The two grams of carboxymethylcellulose-cellulose was then washed three times for ten minutes each time with 150-milliliter portions of methanol. The ion exchange, washing and polymer deposition were carried out in the same flask to minimize moisture pickup from the air.

To the flask was added 250 milliliters of methanol, 15.0 milliliters of styrene and 0.5 gram of recrystallized benzoyl peroxide. The mixture was heated to reflux for one hour under air. The carboxymethylcellulose-cellulose was washed in hot methanol, then in hot water and dried.

There was 9.0 percent polystyrene in the film.

*Example 177*

This example reports the deposition of poly 2-vinyl pyridine into cellulose film and the properties of the resulting anion exchange resin film.

Regenerated cellulose film about 4 mils thick and weighing 2.00 grams dry cellulose was immersed in 0.5% aqueous ferrous chloride solution for five minutes at a liquor ratio of 1:200 to bind ferrous iron by cation exchange. The film was washed in distilled water to remove the uncombined ferrous iron. The treated film was then dropped into 500 ml. of 2% mixture of the monomer in water at 80° C. In one minute five ml. of 0.3% hydrogen peroxide was added and the solution was refluxed for 60 minutes. Little polymer was formed in the aqueous solution.

The cellulose film was washed for one hour in warm distilled water and dried to determine interior polymer deposited. The film increased in weight 90%. The dry film was flexible, light yellow and slightly opalescent. The dried film was 4.5 mils thick.

When the dry film was placed in 200 ml. of distilled water at pH 6.8 and sluiced for 15 minutes the water pH fell to 2.8. When 10.0 ml. of 0.5 normal sodium hydroxide were added to the water the solution became alkaline but slowly returned to pH 4.6 in the presence of the polymer-modified cellulose film. Thus at least one-third of the polymer within the cellulose film had hydrolyzed.

The polymer-modified film of cellulose containing poly-2-vinyl pyridine was immersed in 200 ml. of 1.5 normal hydrochloric acid to convert the basic polymer of the film to the chloride. The film was then washed in distilled water until silver ion added to the wash water gave only a slight turbidity.

When the weak base anion exchange film was steeped in 100 ml. of 5% solution of sodium thiosulfate in water and washed, the polymer within the film combined with six milliequivalents of thiosulfate. The thiosulfate was displaced from the film for analysis by a 10% solution of sodium chloride.

The weak base anion exchange resin film was immersed in 200 ml. of 5% sodium hydroxide solution for twenty minutes with stirring and washed twice in 200 ml. of distilled water for ten minutes each time.

This film was immersed in 200 ml. of 5% aqueous solution of potassium ferricyanide for ten minutes. The film became intensely yellow. This yellow color could not be removed by washing in distilled water.

The ferricyanide was not appreciably displaced by immersion of the polymer-modified film in 200 ml. of a saturated solution of potassium nitrate. The ferricyanide ion could be slowly removed by batchwise treatment of the film with 100 ml. portions of 5 normal sodium hydroxide.

Example 178

This example described the use of a cellulose film containing poly-4-vinyl pyridine uniformly deposited in the interior as a weak base anion exchange membrane.

Reilly Tar and Chemical Corp. 4-vinyl pyridine was freed of inhibitor by distillation at reduced pressure under nitrogen.

Wet cellulose film about 2.3 mil thick and of known cellulose weight was steeped in 200 ml. of a solution of 1 percent hydrazine hydrate in water for 20 minutes. The cellulose weighed about 1.2 grams and had an ion exchange capacity of about 0.02 milliequivalent per gram. The cellulose was washed three times for five minutes each time in 200 ml. portions of distilled water at 25° C. The cellulose with bound hydrazine was dropped into 150 ml. of 3 percent 4-vinyl pyridine solution in water at 70° C. While nitrogen was passed through the solution 2.0 ml. of 3 percent hydrogen peroxide was added and the solution containing the cellulose was refluxed for one hour.

The polymer-modified cellulose film was steeped in three batches of 200 ml. of 0.5 normal hydrochloric acid for 20 minutes each time to remove a trace of surface polymer from the polymer-modified cellulose film. When the films of poly vinyl pyridine-cellulose were dried under vacuum at 90° C. to constant weight and weighed, there was 26 percent polymer within the cellulose film.

A few anion exchanges were carried out using the weak base anion exchange membrane of cellulose-polymer. The dry film was rewet in 200 ml. of 1.0 normal hydrochloric acid and washed with distilled water to constant pH.

The film was placed in 200 ml. of 10 percent potassium nitrate solution and stirred for ten minutes. The nitrate solution was decanted and the film was washed three times in 150 ml. portions of distilled water. The first washing was added to the decanted liquid for chloride analysis. About 0.9 milliequivalent of chloride had been displaced by the nitrate ion.

When the above treatment with acid was repeated and nitrate exchange took place almost the same amount (0.92) milliequivalent of chloride was released.

When the deposited polymer was in the free base form it hydrolyzed similarly to the cellulose film that contained poly-2,-vinyl pyridine so that when the film was washed for the next anion exchange some of the exchange groups were occupied by hydroxyl ion.

The weak base anion exchange membrane containing both nitrate and hydroxyl groups was steeped in saturated sodium acetate solution as above and nitrate determined, it was found that about 0.8 milliequivalent of nitrate ion had been bound. This figure is less than a third of the basic nitrogen content of the membrane on the basis of the vinyl polymer content.

When the polymer-modified cellulose film was converted to the chloride form and washed only once to minimize hydrolysis and steeped in 5 percent sodium sulfate solution, washed twice and the sulfate displaced with 5 normal sodium hydroxide it was found that about 1.8 milliequivalents of sulfate had combined with the resin. The membrane could be reconverted to the chloride form and displaced with oxalate and about 1.7 milliequivalents was combined.

The anion exchange membrane would combine with almost the equivalent amount of free acid when the polymer base was present as the free base. Thus cellulose with the poly-4-vinyl pyridine deposited and washed in water and immersion in acetic, hydrochloric, sulfuric, or phosphoric acid would combine with about 95 percent of the amount of acid that the nitrogen content of the membrane would correspond to.

Potassium ferricyanide colored the anion exchange resin intensely yellow.

The cellulose film containing this basic polymer could be dyed with ordinary acid dyes in relatively fast colors.

The cellulose films into which the 2-vinyl-and-4-vinyl pyridines had been deposited were insoluble in cellulose solvents tried.

Other cellulose materials such as rayon, cotton, linen, jute and the like can be modified by uniform or controlled non-uniform deposition of this basic polymer.

CONTROL OF LOCUS OF DEPOSITION

Examples 179 through 181 below show how the locus of deposition of polymer may be controlled with the method of this invention, and disclose methods of establishing the fact that this control has been achieved.

Example 179

This example illustrates that the catalyst solution may be of limited volume when it diffuses into the host material and that the catalyst binding may be limited to a portion of the volume of the host material.

Commercial regenerated cellulose film was freed of glycerol by washing, and was then cut into squares two inches on a side. A glass rod was dipped into 0.1% ferrous ammonium sulfate aqueous solution and wiped on the cellulose film. The treated film was immediately dropped into 100 ml. of boiling solution in water of 1% allyl acrylate and 0.03% hydrogen peroxide. Polymer deposition was allowed to continue thirty minutes before the square was washed in hot water and dried. The film was placed in neutral 0.02 N potassium permanganate at room temperature for twenty minutes and washed.

Manganese dioxide was deposited into the gel where unsaturation was oxidized to glycol. Microscopic cross sections showed orange color penetrating into the film about ⅕ the thickness of the film from the side upon which catalyst had been applied. Control films showed only a faint yellow color all through the film, including the catalyst impregnated side.

Example 180

Deposition of polyethylacrylate, polymethylmethacrylate, polystyrene, and polyacrylyonitrile into a host article that has a non-uniform distribution of cation binding groupings.

This experiment was carried out to gain further evidence on the manner in which cation binding groups determine the locus of polymer initiated by catalyst thus bound.

In this work "fibrous" cellulose casing film was used. This film is made by coating a special long fiber, high wet-strength paper with regenerated cellulose so that the paper is both impregnated and coated with the regenerated cellulose. Typically the paper layer makes up about one-third of the thickness of the casing. The paper is usually a bast fiber like sisal, hemp, abaca, etc.

A "fibrous" casing was used in which the cation exchange capacity of the paper was about 0.12 meq./gm. while the exchange capacity of the regenerated cellulose was about 0.02 meq./gm.

Polymers of ethylacrylate, methylmethacrylate, styrene, and acrylonitrile were deposited into the casing by the method of this invention after the casing had been steeped for ten minutes in 1.0% aqueous ferrous chloride at pH 5.0 and then washed in distilled water. The steeping period was long enough to secure essentially complete exchange with the cations attached to ion exchange groupings in the cellulosic host material.

About 20 percent of each of the polymers was deposited into the fibrous casing. The locus of the acrylate and the methacrylate polymers was determined by converting these polymers to the acid hydrozide and thereafter reacting this strong reducing group with Tollens reagent and neutral potassium permanganate. Two different samples of each polymer-modified cellulose were used.

The polystyrene and polyacrylonitrile-modified fibrous casings were stained by immersion in 5% iodine-10% potassium iodide solution at 25° C. for 48 hours with unmodified control fibrous casing. The samples were then washed with water until the control was colorless. The polymer-modified casing film was still darkly colored.

It was noted that the microscopic cross sections of all four polymer-modified stained materials showed the intensity of color in the paper over three times that in the regenerated cellulose layer. Furthermore, when the ferrous-ion-exchange casing was dropped in 1% sodium sulfide solution for 20 minutes, dried, and sectioned, the green color of the ferrous sulfide was much darker in the paper than in the regenerated cellulose layer.

*Example 181*

The experiments described in this example show the extent of control of locus of polymer deposition into regenerated cellulose films for several additional monomers when deposited by the process of this invention. They also show the differences in structure between these products and products of prior art.

Regenerated cellulose casing whose wet thickness was about seven mils was cut into a number of equal sized increments in the dry state. The glycerol was washed out and the casing desulfured by heating the pieces in 0.3% sodium sulfide solution at 65° C. for 20 minutes and washing out the alkali with distilled water until the wash water was at pH 6.0.

The sections of cellulose film were steeped in 1.0% ferrous chloride solution at pH 5 for two different time periods, five minutes with stirring and 0.5 second with an immediate wiper rods wipe and wash in distilled water. The two types of steeped film were each washed four times in 1:50 liquor ratio distilled water for two minutes each time to remove ferrous iron that had not combined with carboxyl groups of the cellulose film.

When the two sorts of cellulose film were steeped in sodium sulfide (1%) solution for ten minutes, washed, partially dried and cross-sectioned, the film steeped for five minutes in the ferrous solution was uniformly green all through its cross section. The film steeped for 0.5 second had green color only near the surfaces of the film.

Thus the ion binding could be controlled by control of ion diffusion and ion exchange.

Polymers of methylmethacrylate, methyl acrylate, styrene, p-chlorostyrene, 2,5-dichlorostyrene, allyl acrylate, vinyl acetate, 4-vinyl pyridine, acrylamide, acrylonitrile, acrylic acid, copolymers of styrene-acrylonitrile, methylmethacrylate-acrylonitrile, and styrene-methylmethacrylate were deposited by the method of this invention using hydrogen peroxide. Five cellulose increments were used for each monomer at the same liquor ratio (1:100). Three increments of each polymer-modified cellulose were dried at 95° C. under vacuum to constant weight to establish polymer-add-on while the other two were used for staining and sectioning.

About 1% to 10% polymer add-on was obtained for the cellulose film having ferrous iron ion exchanged in only the outer layers of the film while the film with complete catalyst impregnation increased in weight from 5% to 40% depending on the monomer polymerized. When the polymer-modified films were stained it was necessary to use film cross sections of from 20 microns to 100 microns depending upon the polymer concentration and the tinctorial power of the stain so that any difference in color across the cross section could be seen under the microscope.

Films of cellulose containing polymers of styrene, p-chlorostyrene, 2,5-dichlorostyrene, methyl methacrylate, methyl acrylate, acrylonitrile, acrylomide, vinyl acetate, and the copolymers were stained in 5% iodine-10% potassium iodide solution as the cross section for 24 hours with a control of unmodified cellulose film cross section of the same thickness. The cross sections were washed in water until the control was colorless and the cross sections observed immediately after air drying and mounting in Fisher "permount," an acrylic plastic mounting medium.

It was observed that the orange color of the stained polymer was uniform throughout the film cross section for the films steeped in catalyst cation for five minutes and the color was restricted to the outer layers of the film for the localized cation exchanged catalyst cation.

Since the iodine adsorption is a non-specific stain other samples of cellulose film that contained methyl methacrylate, methyl acrylate, and acrylamide and the methylmethacrylate copolymers were treated with hydrazine hydrate to convert at least part of the deposited polymers to the acid hydrazide. The procedure of Example 8 was used. When the films resulting were placed either in Tollens reagent in the dark or in neutral 0.02 normal potassium permanganate solution, the staining again followed the polymer locus and gave results similar to those obtained in the iodine staining. The cellulose starting material when placed in the Tollens reagent or in the permanganate solution was only slightly stained. Even cellulose film that had been treated to obtain ferrous iron ion exchange with chemical groupings within it was only slightly stained so that the color could hardly be seen in the cross sections of the same thickness as those used for polymer-modified cellulose films.

The cellulose film modified by polyallyl-acrylate deposition was stained by oxidizing the deposited polymer with neutral 0.02 N potassium permanganate with the resulting colloidal manganese dioxide providing the stain. The stain was localized where the catalyst was localized and uniform where complete impregnation of the cellulose film had taken place.

The cellulose films into which polyacrylic acid had been deposited were stained with an 0.5% solution of the basic dyestuff methylene blue at pH 8.0 with similar results.

The cellulose film containing poly-4-vinyl pyridine was stained with a wool green acid dye with similar results.

This application is a continuation-in-part of my copending applications Serial No. 445,451, filed July 23, 1954, Serial No. 466,218, filed November 1, 1954, and Serial No. 594,124, filed June 27, 1956; all of said applications being now abandoned, and claims certain subject matter disclosed in my copending application, Serial No. 718,996, filed March 4, 1958.

The above detailed description has been given for clearness of understanding only. No unnecessary limitations should be understood therefrom, as modifications will be obvious to those skilled in the art.

I claim:

1. A method of treating a host polymeric starting material of at least gelatinous solidity having ion exchange capacity resulting from ion exchange groups therein which comprises: chemically fixing a material, adapted to provide at least a part of a catalyst for effecting polymerization of an olefinically unsaturated monomer, within the host material by ion exchange reaction with at least part of said ion exchange groups, and treating said host material and chemically fixed material, in any order, with said olefinically unsaturated monomer and anything additional required to render said chemically fixed material catalytically active to polymerize said monomer and deposit the resulting guest polymer within said host material.

2. The method of claim 1 in which the material chemically fixed within said host material is catalytically inactive at the time it is thus fixed, and is converted to a catalytically active form by chemical treatment prior to contact with said monomer.

3. The method of claim 2 in which the material chemically fixed within the host material is an ion having a plurality of valence states, and in which said ion is chemically converted in situ from a catalytically inactive valence state to a catalytically active valence state.

4. The method of claim 2 in which the material chemically fixed within the host material is an ion of a catalytically active metal and in which said ion is converted in situ to metallic form.

5. The method of claim 1 in which the chemically fixed material, the olefinically unsaturated monomer and anything additional required to render said chemically fixed material catalytically active are brought into contact with each other only in a preselected region of said host polymeric starting material, said region occupying less than the whole of the interior of the host material, and the guest polymer is deposited only in said preselected region.

6. The method of claim 5 in which the material to be chemically fixed is reacted with ion exchange functional groups only in said preselected region of said host polymeric starting material, and the guest polymer is deposited only in said region.

7. The method of claim 6 in which the material to be chemically fixed is reacted with ion exchange groups only in the surface regions of said host polymeric starting material, and the guest polymer is deposited only in said surface regions.

8. The method of claim 5 in which the material to be chemically fixed is reacted with ion exchange groups throughout said host polymeric starting material and, before polymerization of said monomer is initiated, is rendered ineffective in the portion of said host material lying outside said preselected region, so that the guest polymer is deposited only in said region where the catalyst is effective.

9. The method of claim 8 in which the chemically fixed material is chemically converted to a catalytically inactive form in the portion of said host material lying outside said preselected region.

10. The method of claim 8 in which said preselected region in which the guest polymer is deposited is confined to the center portion of the mass of the host polymeric starting material.

11. A composite polymeric material produced by the method of claim 1.

12. A composite polymeric material produced by the method of claim 5.

13. A composite polymeric material produced by the method of claim 7.

14. A composite polymeric material produced by the method of claim 10.

15. A method of treating a host polymeric starting material of at least gelatinous solidity and having ion exchange capacity resulting from ion exchange groups in said material which comprises: chemically reacting said starting material with an ion constituting at least a part of a catalyst for effecting polymerization of an olefinically unsaturated monomer to form a salt compound by ion exchange between said ion and ion exchange groups in said host polymeric starting material, and contacting said salt compound, in any order, with said olefinically unsaturated monomer and any remaining part of said catalyst to polymerize said monomer and deposit the resulting guest polymer within said host starting material.

16. The method of claim 15 in which the monomer reactant is a vinyl monomer.

17. The method of claim 15 in which the monomer reactant is a vinylidene monomer.

18. The method of claim 15 in which the olefinic monomer reactant is a mixture of monomers.

19. The method of claim 15 in which the ion reacted with the host polymeric starting material constitutes at least one component, but less than all, of a multiple component catalyst system.

20. The method of claim 19 in which the salt compound comprising the host polymeric starting material having part of the catalyst bound thereto by ion exchange is first contacted with the monomer and then with the remainder of the polymerization catalyst.

21. The method of claim 19 in which the multiple component catalyst system is a free-radical producting catalyst system.

22. The method of claim 21 in which the monomer reactant is a vinyl monomer.

23. The method of claim 21 in which the monomer reactant is a vinylidene monomer.

24. The method of claim 21 in which the catalyst system is a redox catalyst system.

25. The method of claim 15 in which uncombined ions are removed from the host polymeric starting material prior to treatment with the monomer and any remaining part of the catalyst.

26. The method of claim 15 in which the host polymeric starting material containing chemically combined catalyst ion is swollen to facilitate diffusion of the monomer therein.

27. The method of claim 15 in which the host polymeric starting material is a condensation polymer.

28. The method of claim 27 in which the monomer reactant is a vinyl monomer.

29. The method of claim 27 in which the monomer reactant is a vinylidene monomer.

30. The method of claim 15 in which the host polymeric starting material is a cellulosic material.

31. The method of claim 30 in which the host polymeric material is a cellulosic fiber.

32. The method of claim 30 in which the host polymeric material is a cellulosic film.

33. The method of claim 30 in which the host polymeric material is a fibrous casing film comprising cellulosic fibers impregnated with regenerated cellulose.

34. The method of claim 30 in which the monomer reactant is selected from the group consisting of methyl acrylate, ethyl acrylate, butyl acrylate, octyl acrylate, N,N dimethyl aminoethyl acrylate, acetate of N,N dimethyl aminoethyl acrylate, allyl acrylate, beta amino ethyl acrylate, pentachlorophenol ester of acrylic acid, vinylidene chloride, 2-vinyl pyridine, styrene, p-chlorostyrene, 2,5-dichlorostyrene, acrylonitrile, bis-B-chloroethyl vinyl phosphonate, N-vinyl carbazole, N-vinyl pyrrolidone, methyl methacrylate, butyl methacrylate, vinyl methacrylate, methacrylic acid, 4-vinyl pyridine, 4-vinyl cyclohexene, vinyl acetate, acrylic acid, acrylamide, bismethylene acrylamide, methallyl acrylate and vinyl alcohol.

35. The method of claim 30 in which the host polymeric material is a bast fiber.

36. The method of claim 35 in which the host polymeric material is jute.

37. The method of claim 15 in which the host polymeric starting material is a proteinaceous material.

38. The method of claim 37 in which the host polymeric material is wool.

39. The method of claim 37 in which the host polymeric material is silk.

40. The method of claim 15 in which the host polymeric starting material is an addition polymer.

41. The method of claim 40 in which the host polymeric starting material is an amylaceous material.

42. The method of claim 41 in which the host polymeric material is starch.

43. The method of claim 40 in which the host polymeric starting material is a rubber.

44. The method of claim 40 in which the host polymeric material is polyethylene.

45. The method of claim 15 in which the host polymeric material has the form of finely divided particles of at least gelatinous solidity dispersed in a liquid medium.

46. The method of claim 24 in which the starting material is a cellulosic fiber and the monomer is acrylonitrile.

47. The method of claim 24 in which the starting material is a cellulosic fiber, unreacted catalyst ions are removed from the fibers, and the fibers are then contacted with an aqueous solution of acrylonitrile in the presence of the remainder of the catalyst.

48. The method of claim 47 in which the cellulosic fibers are cotton.

49. The method of claim 48 in which the ion reacted with the cotton fibers is a metal cation constituting a part of a free-radical producing redox couple catalyst system and the acrylonitrile solution is added in the presence of the oxidizing component of the redox catalyst system.

50. The method of claim 49 in which the metal cation is the reducing component of said redox system.

51. The method of claim 50 in which the metal cation is reacted with the cotton fibers in aqueous solution, unreacted ions are removed from the fibers, and the fibers are then treated with acrylonitrile and the oxidizing agent in aqueous medium.

52. The method of claim 51 in which the metal cation is selected from the group consisting of ferrous, manganous and chromous cations.

53. The method of claim 49 in which the metal cation is ferrous ion and the oxidizing component of said redox couple catalyst system is hydrogen peroxide.

54. The method of claim 51 in which the metal cation is manganous ion and the oxidizing component of said redox couple catalyst system is persulfate ion.

55. The method of claim 51 in which the metal cation is chromous ion and the oxidizing component of said redox couple catalyst system is hydrogen peroxide.

56. The method of claim 49 in which the reaction is carried out until 2–30% of polyacrylonitrile by dry weight is deposited in the cotton fibers.

57. The method of claim 15 in which the host polymeric starting material is wood.

58. The method of claim 57 in which the monomer reactant is a vinyl monomer.

59. The method of claim 15 in which the host polymeric starting material is wood fibers.

60. A composite polymeric material produced by the method of claim 46.

61. A composite polymeric material produced by the method of claim 48.

62. A composite polymeric material produced by the method of claim 56.

63. A composite polymeric material produced by the method of claim 16.

64. A composite polymeric material produced by the method of claim 17.

65. A composite polymeric material produced by the method of claim 27.

66. A composite polymeric material produced by the method of claim 28.

67. A composite polymeric material produced by the method of claim 29.

68. A composite polymeric material produced by the method of claim 30.

69. A composite polymeric material produced by the method of claim 34.

70. A composite polymeric material produced by the method of claim 35.

71. A composite polymeric material produced by the method of claim 37.

72. A composite polymeric material produced by the method of claim 38.

73. A composite polymeric material produced by the method of claim 40.

74. A composite polymeric material produced by the method of claim 41.

75. A composite polymeric material produced by the method of claim 43.

76. A composite polymeric material produced by the method of claim 44.

77. A composite polymeric material produced by the method of claim 45.

78. A composite polymeric material produced by the method of claim 57.

79. A composite polymeric material produced by the method of claim 58.

80. A composite polymeric material produced by the method of claim 59.

81. A method of treating a host polymeric starting material of at least gelatinous solidity having ion exchange capacity resulting from ion exchange groups in said material which comprises: chemically reacting said starting material with an ion constituting at least a part of a catalyst for effecting polymerization of an olefinically unsaturated monomer to form a salt compound by ion exchange between said ion and ion exchange groups in said host polymeric starting material, contacting said salt compound, in any order, with said olefinically unsaturated monomer and any remaining part of said catalyst to polymerize said monomer and deposit the resulting guest polymer within said host polymeric starting material, and thereafter chemically modifying said guest polymer to alter its composition while it remains associated with said host polymeric starting material.

82. The method of claim 81 in which said chemical modification is a cross-linking of the deposited guest polymer with the host polymeric starting material.

83. The method of claim 81 in which the deposited guest polymer is reacted to form an acid hydrazide.

84. The method of claim 81 in which the deposited guest polymer contains salt-forming groups and is reacted with a salt-forming reagent to produce a salt of the guest polymer.

85. The method of claim 81 in which the deposited guest polymer is reacted with a brominating agent to produce an organic bromide of the guest polymer.

86. The method of claim 81 in which the deposited guest polymer is treated with an oxidizing agent.

87. The method of claim 81 in which the deposited guest polymer is stained with a dye.

88. A composite polymeric material produced by the method of claim 81.

89. A composite polymeric material produced by the method of claim 82.

90. A composite polymeric material produced by the method of claim 83.

91. A composite polymeric material produced by the method of claim 84.

92. A composite polymeric material produced by the method of claim 85.

93. A composite polymeric material produced by the method of claim 86.

94. A composite polymeric material produced by the method of claim 87.

95. A method of depositing a polymer of olefinically unsaturated monomer within a host polymeric starting material of at least gelatinous solidity and having ion exchange capacity resulting from ion exchange groups in said material which comprises: contacting a salt compound of said host starting material, said salt compound comprising the reaction product of said starting material and an ion constituting at least a part of a catalyst for effecting polymerization of an olefinically unsaturated monomer, in any order, with said olefinically unsaturated monomer and any remaining part of said catalyst to polymerize said monomer and deposit the resulting guest polymer within said host polymeric starting material.

96. The method of claim 95 in which the polymerization is carried out in aqueous medium.

97. The method of claim 95 in which the host polymeric starting material is selected from the group consisting of cotton and regenerated cellulose rayon fibers, said salt compound comprises the reaction product of said fibers and a cation constituting one component of a free-radical producing redox polymerization catalyst, and said polymerization reaction is carried out in an aqueous medium containing acrylonitrile monomer in fluid form and a second component constituting the balance of said redox catalyst.

98. The method of claim 97 in which said salt compound comprises the reaction product of said fibers and a reducing metal cation constituting one component of a free-radical producing redox polymerization catalyst, the fibers forming said salt compound are substantially free of uncombined quantities of said cation, and the oxidizing component of said redox catalyst is added in an aqueous medium containing acryonitrile monomer.

References Cited in the file of this patent

UNITED STATES PATENTS

| 2,238,694 | Graves | Apr. 15, 1941 |
|---|---|---|
| 2,268,611 | Mitchell | Jan. 6, 1942 |
| 2,270,285 | Frolich | Jan. 20, 1942 |
| 2,343,095 | Smith | Feb. 29, 1944 |
| 2,346,417 | Cornwell | Apr. 11, 1944 |
| 2,404,910 | Keller | July 30, 1946 |
| 2,406,412 | Speakman et al. | Aug. 27, 1946 |
| 2,406,453 | Charlton et al. | Aug. 27, 1946 |
| 2,406,454 | Charlton et al. | Aug. 27, 1946 |
| 2,468,086 | Latham | Apr. 26, 1949 |
| 2,530,789 | Semegen | Nov. 21, 1950 |
| 2,684,305 | Quinlivan | July 20, 1954 |
| 2,693,427 | Kingsford | Nov. 2, 1954 |
| 2,715,078 | Cohen | Aug. 9, 1955 |
| 2,733,998 | Russell | Feb. 7, 1956 |
| 2,734,830 | Hogge | Feb. 14, 1956 |

FOREIGN PATENTS

| 572,959 | Great Britain | Oct. 31, 1945 |
|---|---|---|
| 578,404 | Great Britain | June 27, 1946 |
| 611,829 | Great Britain | Nov. 4, 1948 |
| 511,423 | Belgium | May 31, 1952 |

OTHER REFERENCES

Oehler et al.: J.A.L., C.A., March 1949, pp. 151, 153–157.

Landells et al.: "Preparation and Properties of Regenerated Cellulose Containing Vinyl Polymers," September 1951 (The Journal of The Society of Dyers and Colourists), vol. 67, pages 338 to 344.

Lipson et al.: "Formation of Polymers in Textile Fibers," noture, vol. 157, May 4, 1956, page 590.

UNITED STATES PATENT OFFICE
CERTIFICATE OF CORRECTION

Patent No. 3,083,118                               March 26, 1963

Douglas J. Bridgeford

It is hereby certified that error appears in the above numbered patent requiring correction and that the said Letters Patent should read as corrected below.

Column 4, lines 21 and 22, for "DISPOSITION" read -- DEPOSITION --; line 42, for "contracted" read -- contacted --; column 13, line 58, for "disk" read -- disks --; column 17, line 67, for "of" read -- or --; line 73, for "filmed" read -- film --; column 18, line 21, for "of", first occurrence, read -- on --; column 20, line 64, after "acrylates" insert -- or --; column 25, line 54, after "steeped" insert -- in --; column 32, line 11, for "techniques" read -- technique --; column 34, line 24, for "80 C." read -- 80° C. --; column 35, line 34, for "film" read -- films --; column 45, line 26, after "monomer" insert a comma; same line 26, for "were" read -- was --; column 48, line 47, for "acryltae" read -- acrylate --; line 50, for "equeous" read -- aqueous --; column 51, line 51, for "has" read -- had --; column 56, line 45, for "hydrazine" read -- hydrazide --; column 58, line 34, for "meg./gm." read -- meq./gm. --; line 60, for "14.6" read -- 4.6 --; line 72, for "trile and 1 milliliters of 0.1 M potassium persulfate" read -- at 1:20 liquor ratio at room temperature --; column 59, line 5, for "1 milliliters" read -- 18 milliliters --; column 63, line 69, for "conversions" read -- conversion --; column 68, line 72, for "localizatio nof" read -- localization of --; column 72, line 42, for "Uusually, solution" read -- Usually, solutions --; column 78, line 17, "After washing in" should appear as the beginning of a new paragraph; column 83, line 19, after "active" insert a comma; column 88, line 12, for "Cornwell" read -- Cornwell et al. --; line 39, for "noture" read -- Nature --; same column 88, same line 39, for "1956" read -- 1946 --.

Signed and sealed this 26th day of November 1963.

(SEAL)
Attest:
ERNEST W. SWIDER

Attesting Officer

EDWIN L. REYNOLDS
                          Acting Commissioner of Patents